US010024651B2

(12) United States Patent
Johnson et al.

(10) Patent No.: US 10,024,651 B2
(45) Date of Patent: Jul. 17, 2018

(54) CODED LOCALIZATION SYSTEMS, METHODS AND APPARATUS

(71) Applicant: ASCENTIA IMAGING, INC., Boulder, CO (US)

(72) Inventors: Gregory Johnson, Boulder, CO (US); Edward R. Dowski, Jr., Steamboat Springs, CO (US)

(73) Assignee: ASCENTIA IMAGING, INC., Boulder, CO (US)

( * ) Notice: Subject to any disclaimer, the term of this patent is extended or adjusted under 35 U.S.C. 154(b) by 0 days.

(21) Appl. No.: 15/394,573

(22) Filed: Dec. 29, 2016

(65) Prior Publication Data

US 2017/0108330 A1 Apr. 20, 2017

Related U.S. Application Data

(63) Continuation of application No. 14/365,498, filed as application No. PCT/US2013/020154 on Jan. 3, 2013, now Pat. No. 9,534,884.

(Continued)

(51) Int. Cl.
*G01B 11/00* (2006.01)
*G01S 19/42* (2010.01)
(Continued)

(52) U.S. Cl.
CPC ............. *G01B 11/002* (2013.01); *G01S 5/16* (2013.01); *G01S 19/42* (2013.01); *G05D 1/0251* (2013.01); *G05D 1/0278* (2013.01)

(58) Field of Classification Search
CPC ......... G01B 11/002; G01S 5/16; G01S 19/42; G05D 1/0251; G05D 1/0278

(Continued)

(56) References Cited

U.S. PATENT DOCUMENTS 4,830,485 A 5/1989 Penney et al.
5,552,883 A 9/1996 Busch-Vishniac
(Continued)

FOREIGN PATENT DOCUMENTS

WO WO/2009/148662 12/2009
WO WO/2011/159565 12/2011
(Continued)

OTHER PUBLICATIONS

Bruckner, A.. et al., "A Multi Aperture Approach to Wafer-Level Camera Lenses", "MOEMS and Miniaturized Systems X", Jan. 27, 2011, p. 10 vol. 7930, No. 79300B, Publisher: Proc. of SPIE Photonics W., Published in: US.

(Continued)

*Primary Examiner* — Anne M Antonucci
*Assistant Examiner* — James E Stroud
(74) *Attorney, Agent, or Firm* — Lathrop Gage LLP

(57) ABSTRACT

A coded localization system includes a plurality of optical channels arranged to cooperatively distribute electromagnetic energy from at least one object onto a plurality of detectors. Each of the channels includes a localization code that is different from any other localization code in other channels, to modify electromagnetic energy passing therethrough. Digital outputs from the detectors are processable to determine sub-pixel localization of the object onto the detectors, such that a location of the object is determined more accurately than by detector geometry alone. Another coded localization system includes a plurality of optical channels arranged to cooperatively distribute a partially polarized signal onto a plurality of pixels. Each of the channels includes a polarization code that is different from any other polarization code in other channels to uniquely polarize electromagnetic energy passing therethrough. Digi- (Continued)

tal outputs from the detectors are processable to determine a polarization pattern.

9 Claims, 50 Drawing Sheets

Related U.S. Application Data

(60) Provisional application No. 61/634,421, filed on Feb. 29, 2012, provisional application No. 61/686,728, filed on Apr. 11, 2012, provisional application No. 61/692,540, filed on Aug. 23, 2012, provisional application No. 61/685,866, filed on Mar. 23, 2012, provisional application No. 61/720,550, filed on Oct. 31, 2012, provisional application No. 61/631,389, filed on Jan. 3, 2012, provisional application No. 61/673,098, filed on Jul. 18, 2012, provisional application No. 61/729,045, filed on Nov. 21, 2012, provisional application No. 61/634,936, filed on Mar. 8, 2012, provisional application No. 61/687,885, filed on May 3, 2012, provisional application No. 61/655,740, filed on Jun. 5, 2012.

(51) Int. Cl.
   *G01S 5/16* (2006.01)
   *G05D 1/02* (2006.01)

(58) Field of Classification Search
   USPC .................................................. 701/1
   See application file for complete search history.

(56) References Cited

U.S. PATENT DOCUMENTS

| | | | |
|---|---|---|---|
| 5,816,477 A | 10/1998 | Shimizu | |
| 6,104,844 A | 8/2000 | Alger-Meunier | |
| 6,184,974 B1 | 2/2001 | Neal et al. | |
| 6,363,168 B1 | 3/2002 | Kakuma | |
| 6,653,030 B2 | 11/2003 | Mei et al. | |
| 7,046,934 B2* | 5/2006 | Badesha | B64B 1/50 |
| | | | 398/121 |
| 7,248,407 B2 | 7/2007 | Kwon et al. | |
| 7,256,895 B2 | 8/2007 | Castonguay | |
| 7,295,314 B1 | 11/2007 | Spady et al. | |
| 7,591,557 B2 | 9/2009 | Plummer | |
| 7,639,369 B2 | 12/2009 | Owner-Petersen et al. | |
| 7,769,419 B2 | 8/2010 | Daly | |
| 7,926,942 B2 | 4/2011 | Plummer | |
| 7,959,286 B2 | 6/2011 | Plummer | |
| 8,158,917 B2 | 4/2012 | Li et al. | |
| 8,274,031 B2 | 9/2012 | Nakai | |
| 8,296,096 B2 | 10/2012 | Kirby | |
| 8,451,452 B2 | 5/2013 | Podoleanu et al. | |
| 8,569,680 B2 | 10/2013 | Luke et al. | |
| 8,670,171 B2 | 3/2014 | Martin et al. | |
| 8,749,657 B2 | 6/2014 | Iwane | |
| 8,749,797 B1 | 6/2014 | Granade | |
| 8,822,894 B2 | 9/2014 | Zheng et al. | |
| 9,207,778 B2 | 12/2015 | Lee | |
| 9,212,899 B2 | 12/2015 | Johnson et al. | |
| 2002/0021467 A1* | 2/2002 | Ofek | H04L 12/6418 |
| | | | 398/87 |
| 2003/0193647 A1 | 10/2003 | Neal et al. | |
| 2004/0109059 A1* | 6/2004 | Kawakita | H04N 7/18 |
| | | | 348/143 |
| 2004/0233461 A1 | 11/2004 | Armstrong | |
| 2005/0007603 A1 | 1/2005 | Arieli et al. | |
| 2005/0182319 A1 | 8/2005 | Glossop | |
| 2005/0249487 A1 | 11/2005 | Gutierrez | |
| 2005/0278111 A1* | 12/2005 | Ujino | G01C 21/20 |
| | | | 701/440 |
| 2006/0160250 A1 | 5/2006 | Bonassar et al. | |
| 2007/0122049 A1 | 5/2007 | Dowski, Jr. et al. | |
| 2007/0177011 A1 | 8/2007 | Lewin et al. | |
| 2007/0194207 A1 | 8/2007 | Wirth | |
| 2007/0247638 A1 | 10/2007 | Owner-Petersen et al. | |
| 2008/0309762 A1* | 12/2008 | Howard | G07C 5/0891 |
| | | | 348/148 |
| 2009/0032511 A1 | 2/2009 | Adams | |
| 2009/0034088 A1 | 2/2009 | Delaney et al. | |
| 2009/0237092 A1 | 9/2009 | Zoughi et al. | |
| 2009/0254218 A1 | 10/2009 | Sandin et al. | |
| 2010/0008588 A1* | 1/2010 | Feldkhun | G01B 11/2518 |
| | | | 382/206 |
| 2010/0045934 A1 | 2/2010 | Neal et al. | |
| 2010/0165134 A1 | 7/2010 | Dowski, Jr. et al. | |
| 2010/0177277 A1 | 7/2010 | Kokonaski et al. | |
| 2010/0302159 A1 | 12/2010 | Findlay et al. | |
| 2010/0328142 A1 | 12/2010 | Zoughi et al. | |
| 2011/0050903 A1* | 3/2011 | Vorobiev | A01B 69/003 |
| | | | 348/148 |
| 2011/0128372 A1 | 6/2011 | Malecki et al. | |
| 2011/0173869 A1* | 7/2011 | Uhm | F41A 17/06 |
| | | | 42/111 |
| 2011/0211099 A1 | 9/2011 | Nayar et al. | |
| 2011/0249866 A1 | 10/2011 | Piestun et al. | |
| 2012/0022785 A1 | 1/2012 | DiBernado et al. | |
| 2012/0092543 A1 | 4/2012 | Afshari et al. | |
| 2012/0241009 A1 | 9/2012 | Reid | |
| 2012/0327287 A1 | 12/2012 | Meyers et al. | |
| 2014/0319076 A1* | 10/2014 | Galushko | B63G 8/001 |
| | | | 210/747.6 |
| 2015/0175161 A1 | 6/2015 | Breed | |
| 2015/0219437 A1* | 8/2015 | Dowski | G05D 1/02 |
| | | | 701/1 |
| 2015/0234385 A1 | 8/2015 | Sandin | |

FOREIGN PATENT DOCUMENTS

| | | |
|---|---|---|
| WO | WO/2013103275 | 7/2013 |
| WO | WO/2014175931 | 10/2014 |

OTHER PUBLICATIONS

Chen, F., et al., "Overview of Three-Dimensional Shape Measurement using Optical Methods", "Optical Engineering", Jan. 2000, pp. 10-22, vol. 39, No. 1, Publisher: Soc'y of Photo-Optical Instrumentation Engineers, Published in: US.

Donaldson, R.R., et al., "Design and Construction of a Large, Vertical Axis Diamond Turning Machine", "Proc. of the SPIE", 1983, pp. 62-67, vol. 433, Publisher: Int'l Soc'y for Optical Engineering, Published in: US.

Elbakary. Novel Pixel-Level and Subpixel-Level registration algorithms for multi-modal imagery data, University of Arizona, 2005. Retrieved from Proquest. Retrieved on [Feb. 28, 2013] <URL:http://search.proquest.com/docreview/305026176/13C880F48EB70A63B61/1?accountid=142944>; 160 pages.

Gill, D.D., et al., "Design and Manufacturing of Complex Optics: The Dragonfly Eye Optic", "Sandia Report", Jan. 2007, pp. 1-32, Publisher: Sandia Nat'l Laboratories, Published in: US.

Goodman, J.W., "Introduction to Fourier Optics", "Webpage downloaded from Amazon.com Dec. 13, 2011", 1968, Publisher: McGraw-Hill Book Co., New York, N.Y., Published in: US.

Krishnan, G., et al., "Towards a True Spherical Camera", "Human Vision and Electronic Imaging XIV", 2009, p. 1-13, vol. 7240, No. 724002, Publisher: Proc. of SPIE-IS&T Electronic Imaging Keynote Address, Published in: US.

Kurtz, R., et al., "Improving the Accuracy of Surface Metrology", "Optical Engineering", Jul. 2011, pp. 1-6, vol. 50, No. 7, Publisher: Soc'y of Photo-Optical Instrumentation Engineers, Published in: US.

Leroux, C., et al., "Estimation of Centroid Positions with a Matched-Filter Algorithm: Relevance for Aberromertry of the Eye", "Optics Express", Jan. 18, 2010, pp. 1197-1206, vol. 18, No. 2, Publisher: Optical Soc'y of Am., Published in: US.

(56) References Cited

OTHER PUBLICATIONS

Levin, A., et al., "Understanding Camera Trade-Offs through a Bayesian Analysis of Light Filed Projections", "Computer Sci. and Artificial Intelligence Laboratory Technical Rep.", Apr. 16, 2008, Publisher: Presented at European Conference on Computer Vision (ECCV) Oct. 2008, Published in: US.
McCall, B., et al., "Fabrication of Plastic Microlens Arrays for Array Microscopy by Diamond Milling Techniques", "Micromachining and Miocrofabrication Process Technology XV—Proc. of SPIE", 2010, pp. 1-10, vol. 7590, No. 75900A, PublisherA, Publisher: Soc'y of Photo-Optical Instrumentation Engineers, Published in: US.
Min, Z., et al., "Coordinate Measurement Method Based on Coding Target", "Sixth Int'l Symp. on Precision Engineering Measurement and Instrumentation", 2010, vol. 7544, No. 754412, Publisher: Proc. of SPIE, Published in: US.
Moylan, S., et al., "Development of a Metrology Frame to Improve the Positioning Accuracy of Micro/Meso-Scale Machine Tools", "Int. J. Mechatronics and Manufacturing Systems", 2009, pp. 600-619, vol. 2, No. 5/6, Publisher: Inderscience Enterprises Ltd., Publisher in: US.
Murata, J., "Pico-Precision Displacement Sensor Using Digital Image Analysis", "Nuclear Sci. Symp. Conf. Rec.", 2005, pp. 675-679, Publisher: IEEE, Publisher in: US.
Neal, David R., et al., "Shack-Hartmann Wavefront Sensor Precision and Accuracy", "Advanced Characterization Tech. for Optical, Semiconductor, and Data Storage Components", 2002, pp. 148-160, vol. 4779, Publisher: Proc. of SPIE.
Scheiding, S., et al., "Freeform Manufacturing of a Microoptical Lens Array on a Steep Curved Substrate by use of a Voice Coil Fast Tool Servo", "Optics Express—Presented at Proc. of Structured and Freeform Surfaces 2001 Spring Topical Meeting", Nov. 21, 2011, pp. 23938-23951, vol. 19, No. 24, Publisher: Optical Soc'y of Am., Published in: US.
Topa, D.M., et al., "Optimized Method for Focal Spot Location using Center of Mass Algorithms", "Proc. of SPIE", 2002, pp. 1-14, vol. 4769, No. 14, Publisher: Int'l Soc'y for Optical Engineering, Published in: US.
Vyas, A., et al., "Optimization of Existing Centroiding Algorithms for Shack Hartmann Sensor", "Proc. of the Nat'l Conf. on Innovative Computational Intelligence & Security System", Apr. 4, 2009, pp. 400-405, Published in: US.
Yin, X. et al., "Automatic Detection for Shack-Hartmann Wavefront Senor", "Int'l Conf. on Innovative Computational Intelligence & Security System", Jul. 17, 2009, pp. 1986-1991, Publisher: IEEE/ASME, Published in: SG.
"International Preliminary Report on Patentability re Application No. PCT/US11/51751", dated Feb. 13, 2012, p. 11 Published in: US.
"International Search Report and Written Opinion re Application No. PCT/US14/10562", dated Nov. 13, 2014, p. 12 Published in: US.
PCTUS2013/020154 International Search Report and Written Opinion, dated Mar. 19, 2013, 14 pages.
Japanese Patent Application No. 2014-550551, Office Action dated Sep. 15, 2016, 9 pp.
13733703.6 European Search Report and opinion dated Jan. 13, 2016, 11 pages.
Millioz et al., Short Time Fourier Transform Probability Distribution for Time-Frequency Segmentation. Francis Castanie. 2006, IEEE Signal Processing Society, pp. III-448-451, 2006. <hal-00085154>.
Lohmann, A., "Space-bandwidth product of optical signals and systems," J. Opt. Soc. Am., vol. 13, No. 3, 470-473 Mar. 1996.
Neifeld, M., "Information, resolution, and space-bandwidth product," Optics Letters, vol. 23, No. 18, 1477-1479, Sep. 15, 1998.
Dardari, D., "Ranging With Ultrawide Bandwidth Signals in Multipath Environments," Proceedings of the IEEE , vol. 97, No. 2, pp. 404-426, Feb. 2009.
Lange, R. "Demodulation pixels in CCD and CMOS technologies for time-of-flight ranging," Sensors, Camera Systems for Scientific, Industrial Applications II, vol. 3965, 2000.
Van Nieuwenhove, D., "Time-of-flight Optical Ranging Sensor Based on a Current Assisted Photonic Demodulator," Proceedings Symposium IEEE/LEOS Benelux Chapter, Eindhoven, 2006.
Khademi, S., "A Sub Pixel Resolution Method," World academy of science, engineering and technology (WASET), 70, pp. 578-581, 2010.
Barbarino, S., et al., "A review of morphing aircraft," Journal of Intelligent Material Systems and Structures, vol. 22, 823-877, Jun. 2011.
Popov, A.V., "Closed-Loop Control Simulations on a Morphing Wing" Journal of Aircraft, vol. 45, No. 5, 1794-1803, Oct. 2008.
Veerman, H.P.J., "Highly Accurate Aircraft In-Flight Wing Deformation Measurements Based on Image Correlation," Advanced In-Flight Measurement Techniques Research Topics in Aerospace, pp. 15-32, 2013.
Kirmse, T., "Development of a multi camera system for flap gap observation in flight testing," 17th SFTE (EC) Symposium, Amsterdam, The Netherlands, Jun. 12-14, 2006.
Valasek, J. et al. "Vision Based Sensor and Navigation System for Autonomous Aerial Refueling," 1st UAV Conference. Journal of Guidance, Control, and Dynamics vol. 28, No. 5, Sep.-Oct. 2005.
Nalpantidis, L. et al. "Stereovision-Based Algorithm for Obstacle Avoidance," Intelligent Robotics and Applications, Lecture Notes in Computer Science vol. 5928, 2009, pp. 195-204.
Non-Final Office Action dated Oct. 3, 2017 in U.S. Appl. No. 14/939,944, 49 pp.

\* cited by examiner

CODED LOCALIZATION SYSTEMS, METHODS AND APPARATUS

CROSS REFERENCE TO RELATED APPLICATIONS

This application is a continuation of U.S. nonprovisional application Ser. No. 14/365,498, filed Jun. 13, 2014, entitled "Coded Localization Systems, Methods and Apparatus," which is a national stage entry of PCT/US13/20154 filed Jan. 3, 2013, entitled "Coded Localization Systems, Methods and Apparatus." This application also claims priority to U.S. provisional application Ser. No. 61/631,389, filed Jan. 3, 2012, entitled "Angular Coding For 3D Object Localization"; U.S. provisional application Ser. No. 61/634,421, filed Feb. 29, 2012, entitled "Angular Coding For 3D Object Localization"; U.S. provisional application Ser. No. 61/634,936, filed Mar. 8, 2012, entitled "Systems And Methods For Motility and Motion Observation And Discrimination"; U.S. provisional application Ser. No. 61/685,866, filed Mar. 23, 2012, entitled "Angular Coding For 3D Object Localization"; U.S. provisional application Ser. No. 61/686,728, filed Apr. 11, 2012, entitled "Angular Coding For 3D Object Localization"; U.S. provisional application Ser. No. 61/687,885, filed May 3, 2012, entitled "Angular Coding For 3D Object Localization"; U.S. provisional application Ser. No. 61/655,740, filed Jun. 5, 2012, entitled "Angular Coding For 3D Object Localization and Motion Detection"; U.S. provisional application Ser. No. 61/673,098, filed Jul. 18, 2012, entitled "Angular Coding For 3D Object Localization"; U.S. provisional application Ser. No. 61/692,540, filed Aug. 23, 2012, entitled "Angular Coding For 3D Object Localization"; U.S. provisional application Ser. No. 61/720,550, filed Oct. 31, 2012, entitled "Polarization Coding"; and U.S. provisional application Ser. No. 61/729,045, filed Nov. 21, 2012, entitled "Polarization Coding." All of the above-identified patent applications are incorporated by reference herein, in their entireties.

U.S. GOVERNMENT RIGHTS

This invention was made with U.S. Government support under contract W911NF-11-C-0210 awarded by the U.S. Army, UCSD PO #10320848. The Government has certain rights in this invention.

BACKGROUND

Estimating and detecting the 3D location and orientation of objects is a classic problem. Numerous prior art systems have issues which negatively influence the achievable size, weight, and power, cost and precision of object 3D localization and orientation.

A fundamental issue with prior art optical digital imaging systems shown in FIG. 1 (upper drawing) that perform 3D localization is that resolution is related to the spatial density of image sensing pixels: specifically, pixels with fixed system geometries limit higher precision. In general prior art digital imaging systems, when the lens is at its maximum diameter, the image size formed behind the lens, for particular sized pixels, is a maximum; and put another way, the space-bandwidth product (SBP) at the image plane is a maximum. With smaller diameter lenses, but with a constant marginal ray angles or F/#, smaller images are captured and the system's SBP is reduced. But as the lens diameter decreases, the image size becomes so small that for general scenes, all object information is not captured in sufficient detail.

Similarly in prior art measurement systems as shown in FIG. 1 (upper drawing), the baseline B between sensors determines the SBP, and hence precision of estimating x, y, z values for object 105 in system 100. Optics 110a and 110b, with focal lengths fa and fb, respectively, form images of object 105 at distances ya and yb, respectively, from the optical axis on their respective sensors 120a and 120b. The estimates of distances ya and yb determine y location and ratios of fa/ya and fb/yb determine the range, thus a more dense sampling at sensors 120a and 120b increases the precision of the estimations—but at the cost of higher size, weight and power.

Like the two elements of a stereo imaging system shown in the upper drawing of FIG. 1, prior art radar systems (see lower drawing of FIG. 1) also use arrays of detectors to detect objects in 3D space. Radar systems code across each element of a multi-element antenna array in order to detect/localize/reject, etc. targets in a 3D space in the presence of unknown noise and clutter. The number of antenna elements does not theoretically limit the potential angular estimation accuracy, except through SNR.

The main differences between the radar system (lower drawing) of FIG. 1 and the optics system (upper drawing) of FIG. 1 is related to the fact that typical radar wavelengths can be temporally coherently sampled with antenna 102a, 102b, to 102n. In radar systems, the antenna elements are arranged so that the field patterns from each element overlap. Mathematical weights 104a, 104b, to 104n are applied across the array elements or channels and then summed 106 to determine the output signal squared 107. The weights can be deterministic, such as Fourier coefficients, or can be a function of the sampled data, such as used in Auto-Regressive (AR) modeling, and can have a representation on the complex unit circle 108 in FIG. 1 where both signal amplitude and object angle can be represented.

SUMMARY OF THE INVENTION

The limitations of prior art localization imaging systems are improved as disclosed herein, where an optical array of elements is arranged more similarly to a radar system, such that the field patterns from each element or channel overlap. Mathematical weights may also be applied across the array, through embodiments of coded localization optics or specialized coded localization sensors described hereinbelow. Decoding provides the information desired, enabling optical imaging systems to perform localization tasks in a manner superior in performance, size, weight, and power to traditional incoherent stereo-like imaging systems (FIG. 1). In contrast to the problems identified in the prior art above, with coded localization systems disclosed hereinbelow, spatial and angular resolution are determinable by signal-to-noise ratio and not by the spatial resolution of actual image pixels. Uncoupling resolution and pixel density or sampling provides for optical systems that reduce size, weight cost and power and yet perform localization, orientation, and image formation.

In an embodiment, coded localization systems may include optics, codes, sensors and processors where the localization precision is related to the joint design of at least two of optics, codes, and sensors.

In an embodiment, coded localization systems form N samples of a remote object with each sample being coded with a unique code.

In an embodiment, coded localization systems are designed so that the cross-information between channels sampling the same remote object is reduced compared to no coding.

In an embodiment, the channels consist of at least one of an image, aperture, wavelength, polarization, and field of view.

In an embodiment, coded localization systems where the codes in multiple measurements employ sinusoidal functions.

In an embodiment, coded localization systems where the unbiased codes sum to zero.

In an embodiment, coded localization systems where the N measurements form a measurement vector as a function of spatial position.

In an embodiment, coded localization systems where the N measurements form a measurement vector with a magnitude and phase as a function of spatial position.

In an embodiment, coded localization systems where the unbiased codes form an orthogonal set.

In an embodiment, coded localization systems where the sampled PSF of the imaging system is space-variant.

In an embodiment, coded localization systems the measured samples vary as a function of sub-pixel changes in the aerial image.

In an embodiment, coded localization systems where the measurement vector is compared to a stored or estimated object vector to detect the object and orientation and/or location.

In an embodiment, coded localization systems where the measurement vector is used with a mathematical model of the object to estimate object parameters.

In an embodiment, coded localization systems where measurements are made in at least one of spatial, temporal, spectral and/or polarization domains.

In an embodiment, coded localization systems where measurements are made in at least two of spatial, temporal, spectral and/or polarization domains.

In an embodiment, coded localization systems where multiple measurements of a remote object are made simultaneously in at least one domain of temporal, spectral, spatial and polarization.

In an embodiment, coded localization systems where multiple measurements of a remote object are made simultaneously in at least two domains of temporal, spectral, spatial and polarization.

In an embodiment, coded localization systems where measurements are made in the visible wavelengths.

In an embodiment, coded localization systems where measurements are made in IR wavelengths.

In an embodiment, coded localization systems where the N measurements are configured to be unbiased.

In an embodiment, coded localization systems where the N measurements are designed so that the sum of the squares of the N measurements is constant in the absence of noise.

In an embodiment, coded localization systems where the uncertainty in spatial localization is less than the area of a detector pixel.

In an embodiment, coded localization systems where the optics reduce the memory storage required compared to the FOV and localization uncertainty.

In an embodiment, coded localization systems where optics and data-dependent signal processing reduces the amount of data stored compared to classical imaging systems.

In an embodiment, coded localization systems where multiple systems are used for at least one of orientation and 3D localization.

In an embodiment, coded localization systems where multiple systems are used to estimate change in at least one of orientation and 3D location.

In an embodiment, coded localization systems where the estimated or detected change in orientation or location is finer than the pixel spacing.

In an embodiment, coded localization systems where complementary measurement vectors are used to estimate change in at least one of orientation and 3D location.

In an embodiment, coded localization systems provide measurement vectors that represent Fourier components beyond the spatial frequency limits of the detector pixels.

In an embodiment, coded localization systems where single pixel sensors and multiple measurements are formed through spatially displaced systems.

In an embodiment, coded localization systems where single pixel sensors and multiple measurements are formed through temporally displaced systems.

In an embodiment, coded localization systems where the coding is both spatial and temporal.

In an embodiment, coded localization systems where the complimentary channels are chosen in order to reduce the length of the overall optical system.

In an embodiment, coded localization systems provide complimentary measurements which are combined in digital processing to form a final image with resolution corresponding to the total number of measurements.

In an embodiment, a method and apparatus are provided for performing long range photo point measurements, with high precision compared to detector pixel spacing.

In an embodiment, a method and apparatus are provided for context-dependent optical data reduction and storage.

In an embodiment, a method and apparatus are provided for relative object location estimation with precision high compared to the number of pixels.

In an embodiment, a method and apparatus are provided for absolute orientation estimation.

In an embodiment, a method and apparatus are provided for absolute 3D location estimation.

In an embodiment, a method and apparatus are provided to transfer at least one of location and orientation reference information from a known point to a new point.

In an embodiment, a method and apparatus are provided for data collection and data reduction for highway information.

In an embodiment, a method and apparatus are provided to for orientation and 3D location estimation for machine control.

In an embodiment, an improvement is provided for orientation and 3D location estimation for positioning.

In an embodiment, a method and apparatus for performing at least one of orientation and 3D location estimation for indoor applications.

In an embodiment, a method and apparatus for performing at least one of orientation and 3D location estimation for applications with unreliable GPS coverage.

In an embodiment, a method and apparatus for performing at least one of distant object orientation and 3D location estimation for input to model building process.

In an embodiment for a two pixel sensor the measures of angle to the object are used to count the number of objects in the field of view.

In an embodiment for a two pixel sensor the measures of angle from multiple sensors are used to count the number of objects in the combined field of view.

In an embodiment by coding each channel differently more than one prior art pixel of information can be captured.

In an embodiment by coding each channel as a function of range a focusing can be achieved for objects not at infinity.

In an embodiment by coding each channel as a function of range an extended depth of field image can be achieved.

In an embodiment by coding each channel as a function of range an estimate of range for points in the image can be achieved.

In an embodiment an optical motion unit provides dead reckoning for navigation.

In an embodiment, a coded localization system includes a plurality of optical channels arranged to cooperatively image at least one object onto a plurality of detectors. Each of the optical channels includes a localization code to optically modify electromagnetic energy passing therethrough, and each localization code is different from any other localization code in other optical channels. Output digital images from the detectors are processable to determine sub-pixel localization of said object onto said detectors, and such that location of the object is determined more accurately than by detector geometry alone.

In an embodiment, a coded localization system includes a plurality of optical channels arranged to cooperatively image partially polarized data onto a plurality of pixels. Each of the optical channels includes a polarization code to uniquely polarize electromagnetic energy passing therethrough, each polarization code being different from any other polarization code in other optical channels. Output digital images from the detectors are processable, to determine polarization pattern for a user of the system.

In an embodiment, a coded localization system includes a plurality of optical channels arranged to cooperatively image a moving scene onto a plurality of pixels. Each of the optical channels uniquely determines its two dimensional change in motion of the scene. A rigid body model couples output from the channels to constrain a global change in location and orientation to a physical motion. A processing subsystem decomposes data from each channel into a global motion vector.

In an embodiment, a coded localization system includes a plurality of coded localization channels wherein the system has Fisher Information greater than an optical system without localization codes.

In an embodiment, a method of localizing optical data includes cooperatively imaging at least one object onto a plurality of detectors while implementing localization codes uniquely to each optical channel, and processing output digital images from the detectors to determine sub-pixel localization of said object onto said detectors such that location of the object is determined more accurately than by detector geometry alone.

BRIEF DESCRIPTION OF DRAWINGS

The upper drawing in FIG. 1 is an example of a prior art optical location estimation system; while the lower drawing of FIG. 1 is an example radar based prior art localization system.

The upper drawing of FIG. 2 shows an embodiment of one coded localization system for location estimation; while the lower drawing of FIG. 2 provides a radar analogy.

DETAILED DESCRIPTION OF EMBODIMENTS

Figure 2:
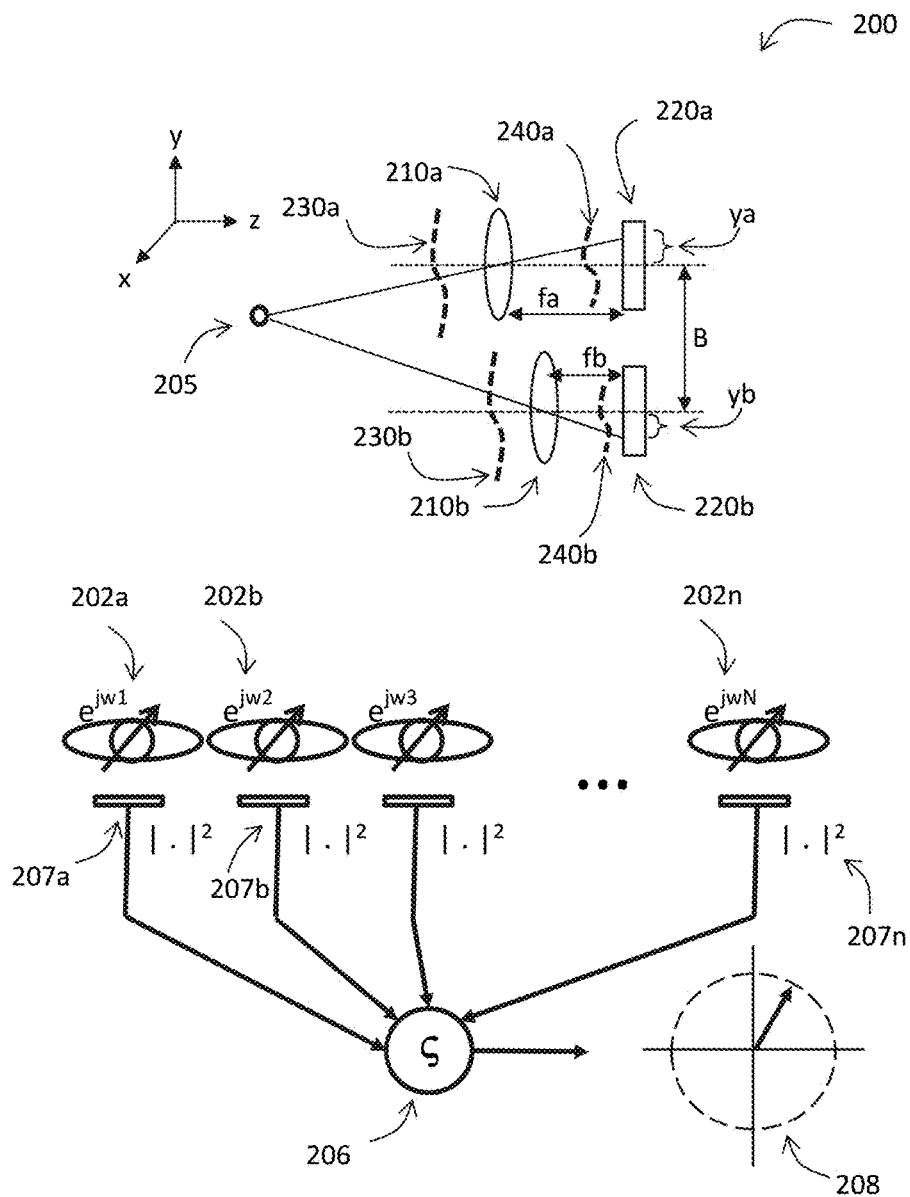
Figure 3:
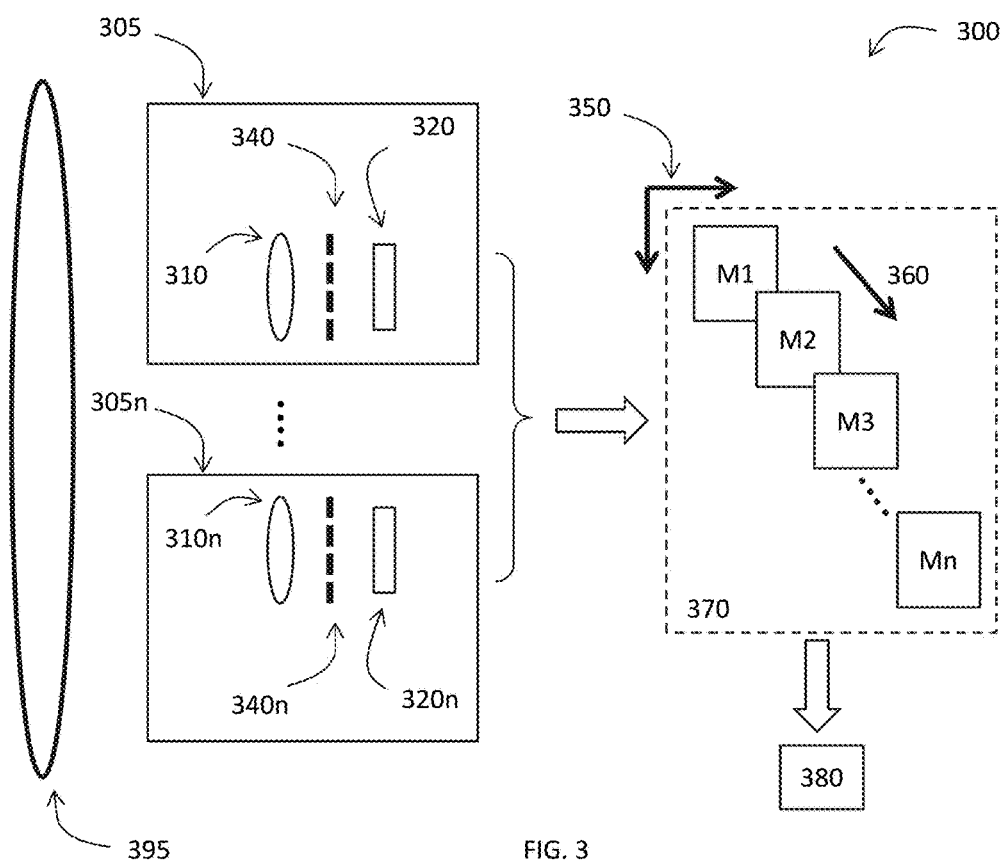
FIG. 3 shows an embodiment of a coded localization system, and a sensing and processing method in accord with another embodiment.
Figure 4:
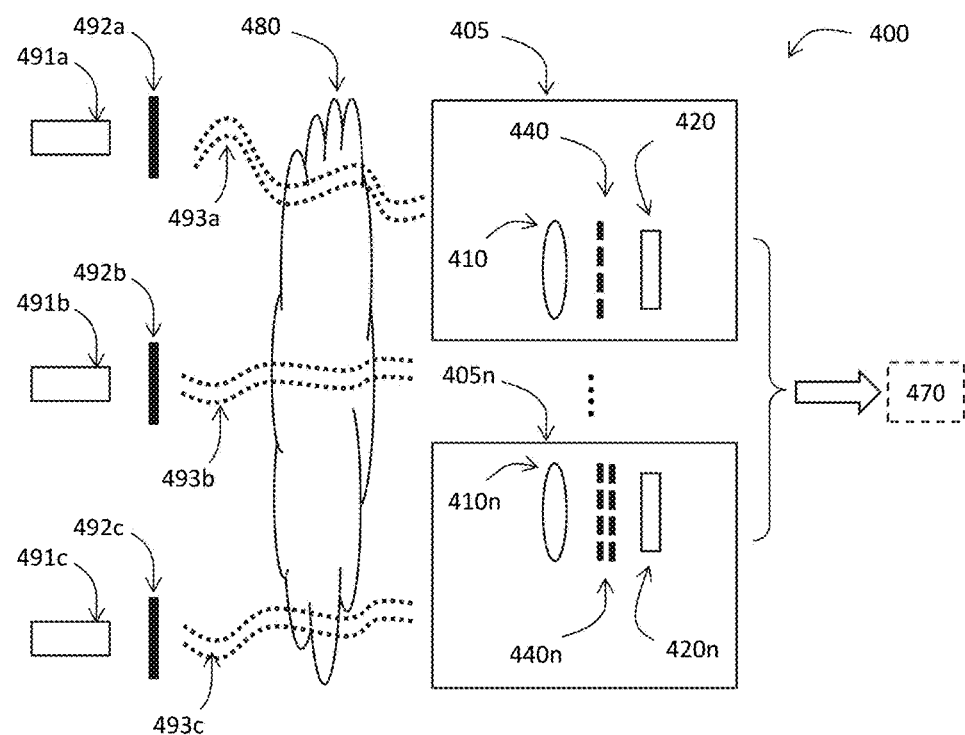
FIG. 4 shows an embodiment of a coded localization system, and a sensing and processing method with an unknown medium with another embodiment.

The following disclosure is organized to first present general themes, and then design methods, and finally specific applications and devices. System concepts and mathematics underlying the various embodiments, including the physical layout of optical coding and data vector formation are shown in FIGS. 2-4. Examples for applying codes to multiple-pixel and single-pixel system are shown in FIGS. 5-9. A framework for designing particular codes based on Fisher information is disclosed in FIGS. 10-12, and provides methodology for selecting a particular code for a task requirement. With the full reading and appreciation of FIGS. 2-12, specific devices may be developed. Such devices can embody several system embodiment features at the same time, and examples are provided. An example of data processing where the codes are polarization analyzer angles is shown in FIGS. 13-17. A two-pixel detector example that detects the location of a moving object is provided in FIGS. 18-20; this approach is extended to multi-aperture multi-pixel systems in FIGS. 20-22 to detect motion and orientation. The coded systems disclosed hereinbelow may also form full-resolution images as initially disclosed in FIG. 23 and shown again in later application FIGS. 24-30. More complex codes and tasks with more apertures, with methods of design, which include cross-talk and SNR considerations, are presented in FIGS. 24-30. Applications of enabled devices performing profile measurements and localization tasks are provided in FIGS. 31-41. More details about the devices that may be used in these applications are included in FIGS. 42-50, along with example design parameters including codes, task requirements, processing algorithms, and numerical results.

As noted above, coded localization systems are disclosed hereinbelow. Such imaging systems are useful for measuring relative and absolute location and orientation information as well as for image formation with reduced system length. The coding applied to form the coded localization systems may be task-dependent and optimized for information capture according to the detection or estimation task at hand. Coded localization systems and algorithms for passive infrared detection and polarization detection and estimation are also disclosed herein. Techniques to reduce size, weight, and power in coded localization imaging and measurement systems are also disclosed.

In this disclosure, a "code" or "coding" can be either a property of electromagnetic energy that emanates from one or more objects, or a device that detects such property on a localized level. A "coded localization system" is therefore a system that utilizes multiple images that are acquired by detectors sensitive to the "codes" and can impute code-specific information to each of the images. The code-specific information can, in turn, be utilized to extract information (such as, for example, location of one or more objects within the scene) from the multiple images, that would not be available without the coding.

In certain imaging domains, the amount of relevant object information can become very small or sparse compared to the system SBP. In long wave infrared imaging systems, only objects with certain temperatures can form information on the sensor. In some cases, only a small number of warm objects will be in a scene. In another example, only objects that are a certain color, for example signs on roadways, may be in a scene, and may be the desired information to be captured and estimated. With either optical or digital filtering by color, the average scene can become sparse. In another example, the edges of objects may be the information of interest. In many man-made scenes, the quantity and orientation of object edges can be considered sparse. Polarization and temporally short domains can be considered sparse as well. Some systems estimating and detecting the 3D location and orientation of objects involve coding and decoding of signals in the polarization domain. With coded localization systems disclosed herein, specialized sensing, decoding, and processing may be used within spatial, spectrum and polarization domains to increase the ability to localize distant objects or features, enabling robust answers to questions "where is that" or "where am I."

When a particular class of object scenes can be considered sparse, less than the maximum number of image pixels is needed to accurately estimate the location of objects. Said another way, a system with a reduced SBP can be used to accurately estimate the location of the objects. Using a smaller sensor and coded localization also results in a smaller system dimensionally. When 3D estimation precision, or information capture capacity of the system, is not a function of the density of pixels, then exploiting the sparsity of the scene in some domain directly leads to smaller sensors, less power and less costly overall systems. For example, the SWaP (size, weight, and power) is reduced. In some cases, the precision of 3D location estimation can be higher with localization coding than without even when large numbers of pixels are used in the system that does not employ localization coding.

The upper drawing of FIG. 2 is an embodiment of the invention shown as system 200. In this embodiment, optics 210a and 210b, with focal lengths fa and fb, respectively, form coded images of object 205 at distances ya and yb, respectively, from the optical axis on respective sensors 220a and 220b. The estimates of distances ya and yb only partially determine y location, and ratios of fa/ya and fb/yb only partially determine range. In this embodiment the channels are coded with codes 230a and 240a, and 230b and 240b and the coded images formed at sensors 220a and 220b are decoded to further determine y location and the range or z location of object 205. Such codes are for example binary or real-valued intensity or phase screens, masks, and apertures, where the code varies as a function of spatial location in the image or aperture. Codes may also include polarization sensitive and selective materials. In one illustrative embodiment, codes are placed in light path locations between the object and the sensor, for example between the object and the objective lens, between the aperture and the sensor, or distributed throughout the system.

The goals of coded localization systems include coding of specialized optical systems across more than one aperture in order to optimize detection and localization estimation, increasing the information capacity of the system, and reducing system size. Such systems also become insensitive to knowledge of 3D system geometry and insensitive to environmental system tolerances. These systems enable spatially coherent 3D estimation even when the systems are geometrically and dynamically varying. These systems may include optics, codes, sensors, and processors where the localization precision is related to the joint design of at least two of optics, codes, and sensors. Localization precision is dependent on system SNR and not on the number of pixels.

Figure 1:
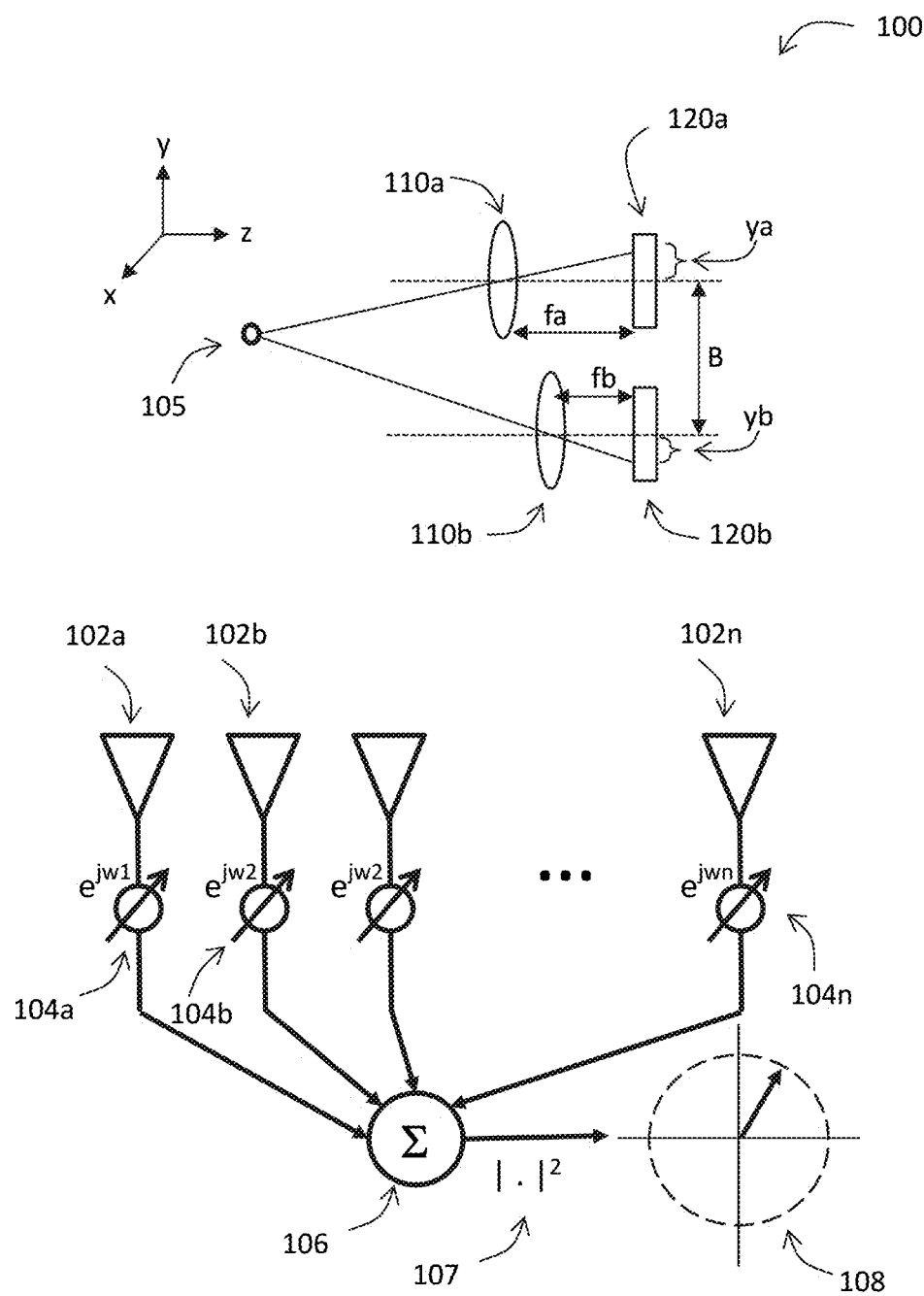

A radar system analogy can be redrawn as an optical system by changing the location of the complex weights, squaring operator, and processing, and is shown in the lower drawing of FIG. 2. The main differences between radar (lower drawing of FIG. 2) and optics (upper drawing of FIG. 2) relates to the fact that typical radar wavelengths can be temporally coherently sampled; yet optical wavelengths cannot yet be temporally coherently sampled. Wavelengths are spatially coherently sampled by detectors 207a, 207b to 207n. And in radar systems, the antenna elements are arranged so that the field patterns from each element overlap. In accord with this disclosure, an optical array of elements can be similarly arranged, such that the field patterns from each element or channel overlap. The mathematical weights 202a, 202b, to 202n can be applied across the array, through various coded localization optics or specialized coded localization sensors. The sensors 207a to 207n are temporally incoherent samplers and form the magnitude squared estimates of the electromagnetic energy. These samples are then decoded with process 206 to estimate or detect parameters related to distant objects. The mathematical weights 202a, 202b, to 202n may also be deterministic, such as Fourier coefficients, or be a function of the sampled data, such as used in Auto-Regressive (AR) modeling, and can have a representation on the complex unit circle 208 where signal amplitude and object angle are displayed. An indirect benefit of localization coding is that each imaging channel is dependent on other imaging channels for sub-pixel localization. In a prior-art classical stereo imaging system (see FIG. 1), each imaging channel is independent of other channels. This independence drives a 3D localization error due to 3D system position uncertainties as well as uncertainties in object/image correspondence in the resulting images.

In certain embodiments of coded localization systems disclosed herein, remote systems are used together to increase location precision. The geometry of such systems may be static or dynamic, as when the systems move relative to each other. The 3D system geometry also does not need to be known to sub-pixel tolerances, unlike prior art stereo imaging systems. From the nature of coded localization systems, the location of the systems is determinable by the data generated through imaging of the same distant object.

In coded localization systems disclosed herein, a distant object is imaged by multiple imaging channels. In one embodiment, the imaging channels may have different chief ray angles, or boresight angles, to the object. In another embodiment, the fields of view of different imaging channels overlap, at least in the volume where the distant object is located. In contrast to prior art stereo imaging systems, each imaging channel is not a classical imaging system outside of the geometrical information just described; rather, each channel acts to code the relative angular location of distant objects as measured at the sensor. The coded localization systems thus form N samples of a remote object with each sample being coded with a unique code. The different coded information, as measured at the image sensors, is combined to enable high precision, fast computation, and the ability to enable image correspondence between the different image channels.

In an embodiment, coded localization systems are used to code angular information, relative to two or more sub-systems and/or two or more imaging channels on the same sensor. The relative angle and distance to a distant object is decoded with incomplete knowledge of optics and sensors (through environmental tolerances) or sub-systems (for example if sub-systems are moving relative to each other). In another embodiment, coded localization systems are used to improve estimates of angular location and distance in situations where knowledge of optics and sensors are known. In yet another embodiment, coded localization systems are used to reduce the search space when estimating image correspondence by constraining the search to regions of corresponding localization codes.

FIG. 3 shows an embodiment of a coded localization system 300. In FIG. 3, coded localization system 300 is configured to record N channels with optics 310 to 310n and sensors 320 to 320n. In this configuration, each channel records 2D spatial, and possibly color and temporal information, for a particular code 340 to 340n. In one embodiment, channel codes 340 to 340n differ at least by a different polarization value or angle of polarization. In another embodiment, channel codes 340 to 340n differ at least by an intensity of spatially varying attenuation. In another embodiment, channel codes 340 to 340n differ at least by a phase of spatially varying intensity. In another embodiment, channel codes 340 to 340n differ at least by a phase of spatially varying sinusoidal intensity. In another embodiment, channel codes 340 to 340n differ at least by a value of spatially varying optical path length. In another embodiment, the channels consist of at least one of an image, aperture, wavelength, polarization, and field of view. Lens 395 is an optional objective lens that cooperates with optics 310 to 310n to form a re-imaging configuration wherein the optics 310 to 310n function as a micro lenses array to re-image portions of the field through codes 340 to 340n. If lens 395 is not present, optics 310 to 310n form individual objective lenses for each of the coded imaging channels.

In an embodiment, the data set 370 from system 300 is a three dimensional matrix M(x,y,p) where (x,y) are spatial variables 350 and p is at least one of a polarization, intensity, and optical path variable 360. There are N planes Mi in the data set 370; that is, for i=1 to n, Mi=M1 to Mn. Color and temporal variables may be embedded into each spatial domain matrix Mi through such configurations as Bayer color filter arrays, temporal averaging, etc. Temporal information may also be made explicit through an additional dimension of the matrix M. In an embodiment, processing system 380 combines data 370 containing matrix M according to the signal to be extracted from the coding sequence 340 to 340n. In one embodiment, processing system 380 forms a sub-signal $s_{ij}$ using the dimension p as the first iterator, where $s_{11}$=[M(1,1,1) M(1,1,2) ... M(1,1,n)], $s_{12}$=[M(1,2,1) M(1,2,2) ... M(1,2,n)], ..., =[M(i,j,1) M(i,j,2)...M(i,j,n)]. In one embodiment, the final signal $s_{tot}$ to be processed is formed by concatenating the sub-signals, $s_{tot}$=[$s_{11}$ $s_{12}$ $s_{13}$ ... $s_{ij}$] and analyzed for spectral content. The spectral analysis is demonstrated in subsequent paragraphs to enable a polarization compass among other devices. In an embodiment, the spectral analysis may be at least one of temporal and spatially varying and may include at least one of a spectrogram analysis, a space-frequency analysis, a scale-space analysis, and a time-frequency analysis. In another embodiment, the sub-signals are averaged and the average is analyzed for spectral content. In another embodiment, the data M1 to Mn are processed to form a weighted sum of images $M_{tot}$=$\Sigma w_i M_i$ where i=1 ... n, and the weights $w_1$ to $w_n$ are based on the codes 340 to 340n. In another embodiment, the codes in multiple measurements employ sinusoidal functions.

FIG. 4 shows an embodiment of one coded localization system 400 employing polarization codes. A number of illumination objects, 491a, 491b, 491c are modified by unknown source codes 492a, 492b, 492c and form signals 493a, 493b and 493c. In one embodiment, source codes 492a, 492b, 492c are for example linear polarizers. In one embodiment, the number of these objects, source codes and signals is one, for example as may be modeled while viewing a very narrow portion of the polarized sky. In another embodiment, the number of these objects, source codes and signals is larger than one, for example when viewing a wide field of view of the polarized sky the polarization may be modeled by a very large number of objects, source codes and signals that vary in angle and magnitude across the sky. In one embodiment, the signals 493a, 493b and 493c emanating from the sources/source codes are describable in a spatial, temporal, and spectral domain. A generally unknown medium 480 between the sources/source codes and the sensing systems 405 acts to corrupt the signals 493a, 493b and 493c. In an embodiment, a specialized sensing system is a collection of optically coded systems 405 to 405n containing codes 440 to 440n, optics 410 to 410n, and detectors 420 to 420n. In one embodiment, codes 440 to 440n are implemented in the polarization domain through polarization analyzers. In another embodiment, codes 440 to 440n are implemented through linear polarization with varying physical angles. In another embodiment, the collection of optically coded systems 405 to 405n is designed to record the spectral, spatial, temporal and polarization information such that accurate and reliable information is captured in the presence of the unknown medium 480. In one embodiment, processing the recorded data by process 470 is used to extract the needed localization information from the recorded data. In another embodiment, codes 440 to 440n are implemented through amplitude masks above the sensor planes of detectors 420 to 420n where the collection of optically coded systems 405 to 405n is designed to record the spectral, spatial, and temporal information such that accurate and reliable information is captured in the presence of the unknown medium 480.

Figure 5:
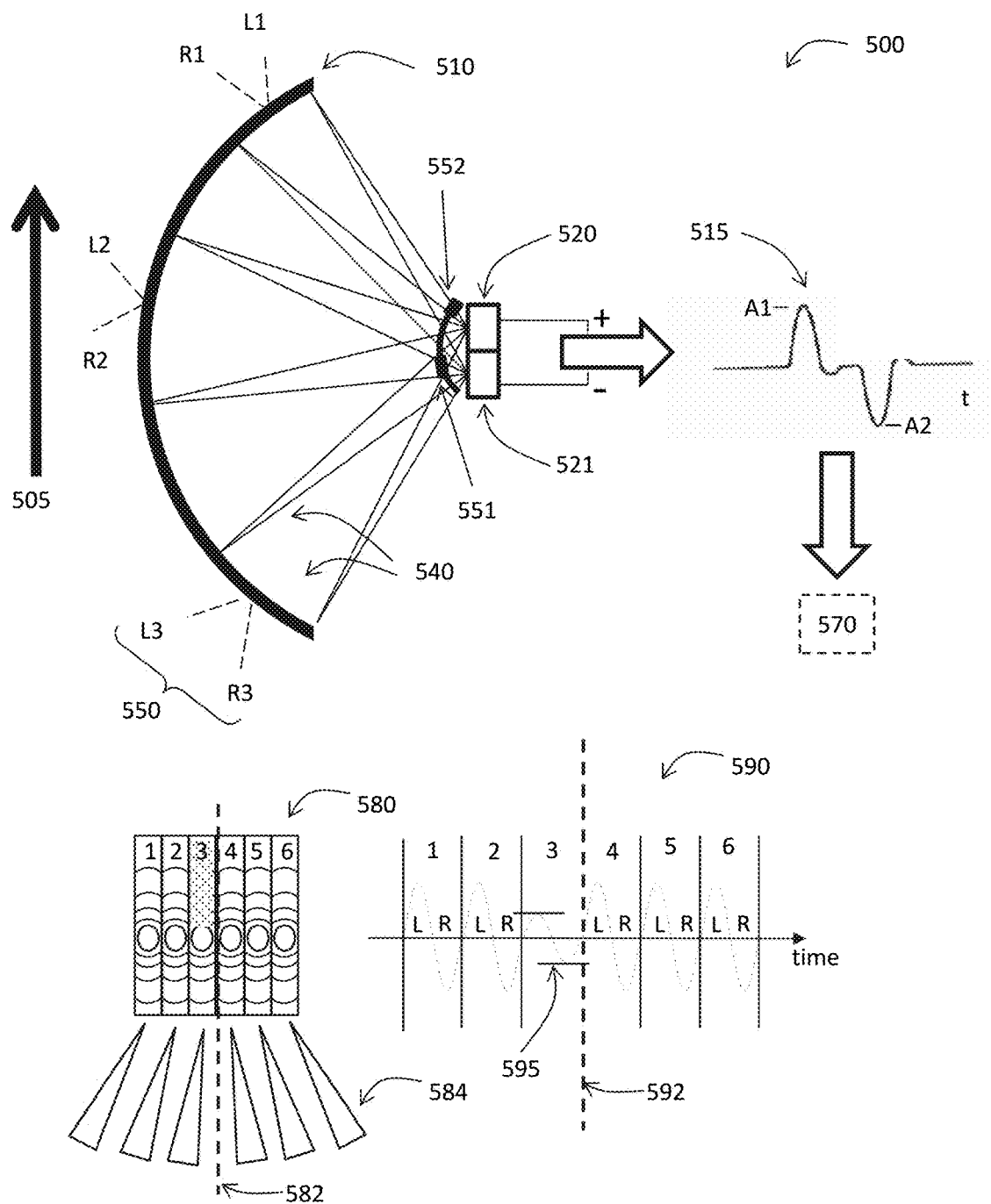
FIG. 5 shows an embodiment of one two pixel bipolar coded localization system.

FIG. 5 shows an embodiment of one coded localization system 500. Lens system 510 contains several different fields of view L1, R1, L2, R2, L3, and R3. Detectors 520 and 521 outputs are combined in a bipolar fashion to produce signal 515 when system 500 is exposed to motion 505 in the sensing field. Processing system 570 processes information in signal 515. In one embodiment, at least one of complimentary lens regions 550, 551 and 552 is purposely designed so that the measured signals at the output of the dual-element sensor 520, 521 are different for the left and right fields of view for one or more imaging channels. For example, region 550 may be partially attenuating, by screening or blocking at least a portion of the outermost lens surface. Alternatively, region 551 or 552 may be at least partially attenuating, so that the response of detector 521 or 520 respectively is altered.

Lens configuration 580 is an embodiment of an exemplary system with 6 lenses labeled 1 through 6 covering a left and right half of a field of view, where the halves are separated by dotted line 582 and 592 in graph 590. Configuration 580 illustrates the front surface of lens system 510, as viewed from the sensing field. Configuration 580 illustrates a small field of view 584 for each lens segment, indicating that each segment have non-overlapping sensing regions. Per system 500, each of the non-overlapping field regions is imaged to be overlapping on the detector pair 520 and 521. An attenuating mask is placed over lens 3. Example output 590 indicates a sinusoidal-like response for each of the L and R (or + and −) detector pixels within regions labeled 1 through 6 in graph 590 corresponding to each of the lenses labeled 1 through 6 in 580. Signal 595 is clearly attenuated peak-to-peak within region 3, indicating that the moving object was in the zone of lenses 1-3 covering a half of the field of view. In this case, the difference in the signal amplitudes indicates the angular location or field location of the moving object. Without the coded lens (i.e., in the prior art), all field points will appear identical and angular location cannot be determined. In one embodiment, the code may be enabled through different aperture areas and shapes for the left and right fields of view L3 and R3 for one or more imaging channels. In another embodiment, the difference is obtained using at least one of different absorptive lens thicknesses, different polarizations, and polarizations purposely matched or unmatched to detector element polarizations. In one embodiment, detectors 520, 521 are thermally sensitive elements and system 500 forms a passive infrared motion sensing system. In another embodiment, lens system 510 is a Fresnel lens, which can readily be formed inexpensively with optical molding and is highly compatible with different absorptive lens thicknesses, different polarizations, and polarizations purposely matched or unmatched to detector element polarizations. In one embodiment, the processing system 570 processes signal 515 to detect the signature caused by the localization coding in region 550 to produce a measure of angle to the object that caused the motion. In an embodiment, for a two pixel sensor 520, 521, the measures of angle to the object are used to count the number of objects in the field of view. In an embodiment, for a two pixel sensor 520, 521, the measures of angle from multiple sensors are used to count the number of objects in the combined field of view.

Figure 6:
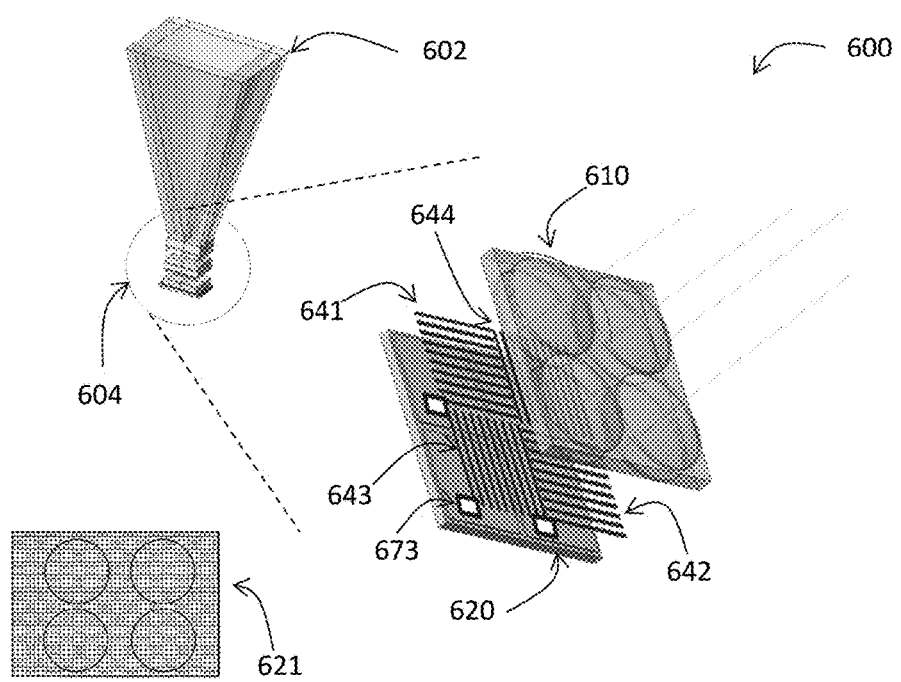
FIG. 6 shows an embodiment of one coded localization system for imaging on a detector with overlapping fields of view.

FIG. 6 shows an illustration 600 with an embodiment of coded localization system 604, along with expanded detail inside system 604. Apparatus 604 is a 2×2 coded localization system for imaging on detector 620 with overlapping fields of view 602, the "2×2" notation referring herein to layout of imaging channels in a coded localization system. Each aperture in lens 610 is coded by a mask 641, 642, 643, 644 placed between lens 610 and sensor 620. In one embodiment, the masks are different for each channel relative to the orientation of system 604. By imaging the same object points multiple times with the example 2×2 configuration, each object point is imaged 4 times. By coding each channel differently, more information can be captured (as compared to a prior art pixel architectures). In an embodiment, the aerial image sub-pixel instantaneous fields of view from a particular object point, for this 2×2 example, may be given by $I_s=[i_{11}\ i_{12};\ i_{21}\ i_{22}]$. The aerial image sub-pixel instantaneous fields of view $I_s$ are weighted by a mask and summed together on sensor 620 to form the coded sample 673. In one embodiment, all four fields of view 602 may be formed as image circles 621 on a single detector array 620. Each of the four channels has essentially the same information at the proper corresponding x/y locations before coding due to the overlapping fields of view 602. In one embodiment, the localization codes on masks 641, 642, 643, 644 for the different imaging channels have different functions and include at least one of spatial phase, spatial amplitude, polarization, and optical path difference. In another embodiment, the mask locations vary in the distance they are located between the lens 610 and the sensor 620 (e.g., the mask for any one channel is located at a different location along the optical path as compared to the mask in another channel). In another embodiment, the codes are composed of at least one of a smooth function, a rapidly varying function, and random or pseudo random functions that provide a broad set of basis functions for designing codes with many degrees of freedom. In another embodiment, the codes for a 2×2 implementation is a code composed of biased sinusoids such that the code maximizes the Fisher Information of a general scene. In another embodiment, the measured samples vary as a function of sub-pixel changes in an aerial image, enabling sub-pixel resolution measurements, or measurements at a finer scale than the pixel spacing. In another embodiment, the codes include wavelength specific codes. Masks 641, 642, 643, 644 may select wavelengths, in one embodiment, and be sensitive to a selection of wavelengths in another embodiment. By selecting a wavelength, the codes can perform hyper-spectral filtering as well as sub-pixel location information. By being sensitive to a selection of wavelengths the codes can be used in polychromatic imaging systems such as visible spectrum (red/green/blue) and affect all colors equally, thus preserving color fidelity, or affect colors differently, providing another degree of coded information through color variation while still being a broad spectrum device. In an embodiment, each object point is imaged in at least two of a selection of visible wavelengths, near-IR, mid-wave IR, and long-wave IR wavelengths for broad spectrum imaging and use in imaging and targeting systems that fuse at least two of visible, near-IR, and long-wave IR images.

Figure 7:
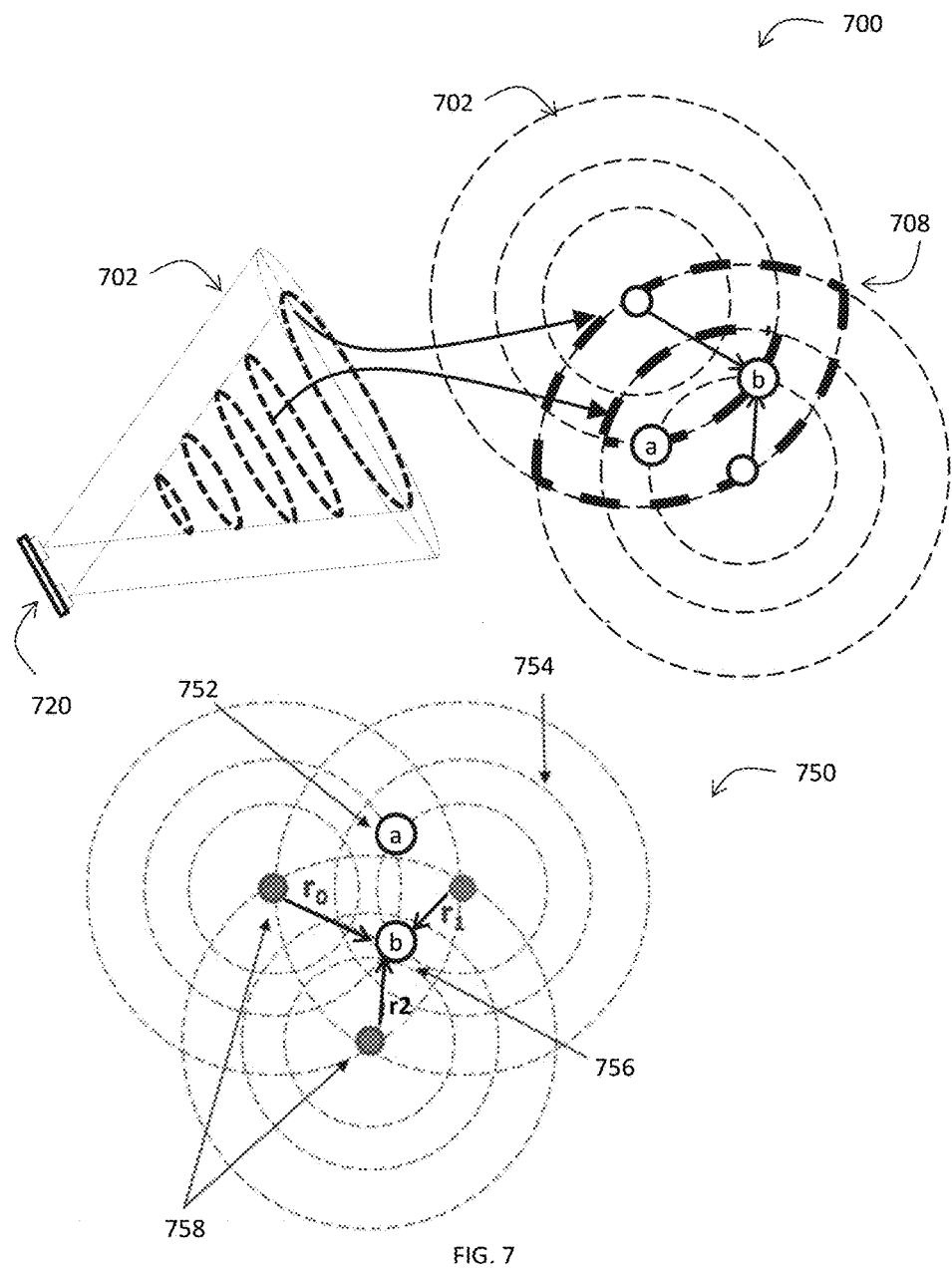
FIG. 7 is an embodiment of a coded localization system using single pixel detectors.

FIG. 7 shows an embodiment of one coded localization system 700; system 700 employs single pixel detectors. In one embodiment, two imaging channels are mounted in such a way that the boresight (or on-axis) directions are all parallel. The two pixels 720 have overlapping fields of view 702 that form intersecting contours 708. Contours indicate constant detected values as a function of object position. This enables estimation or detection of the location of an object using only two pixels. The fewer number of pixels required to perform a given task results in lower power and size. The location of an unknown object point in the field of view has an uncertainty between locations 'a' and 'b' in the intersecting contours 708. In one embodiment, a priori knowledge exists to differentiate between locations 'a' and 'b'. In another embodiment, the a priori information includes at least one of a hemisphere, intensity, wavelength, and a polarization complex value to provide discrepancy between 'a' and 'b'. Without a priori information a third channel may be used as described below.

In one embodiment, overlapping fields of view 754 of three imaging channels, as shown in system 750, are mounted such that the boresight (or on-axis) directions are parallel with overlapping fields of view 754. The on-axis positions of systems 0 and 2 are shown as 758. An unknown object point is located between these three channels. In an embodiment, the relative distance to the unknown point is given by three normalized radius values, one for each imaging channel, r0, r1, and r2. If the normalized radius values are known for each channel, and the imaging geometry of all channels is also known, then the 3D location of the object point can be determined as 'b' or 756 in system 750. If only systems r0 and r1 were used, an ambiguity would remain with point 'a' or 752. In another embodiment, the three imaging channels are localization coded so that the relative radius of each object point can be determined, independent of scene bias, and noise from the collection of imaging channels and the corresponding 3D object location can be estimated. With localization coding the estimation precision is smaller than the pixel size even if locations of the pixels or sensors and/or optics in 3D are not well known, or the uncertainty in spatial localization is less than the area of a detector pixel. Multiple configurations are possible, for example, single pixel sensors and multiple measurements are formed through spatially displaced systems, or single pixel sensors and multiple measurements are formed through temporally displaced systems. Also coded localization systems where the coding is both spatial and temporal provide benefit where the signal varies in both time and space. For all of these configurations, a method and apparatus are provided for relative object location estimation with precision high compared to the number of pixels.

Figure 8:
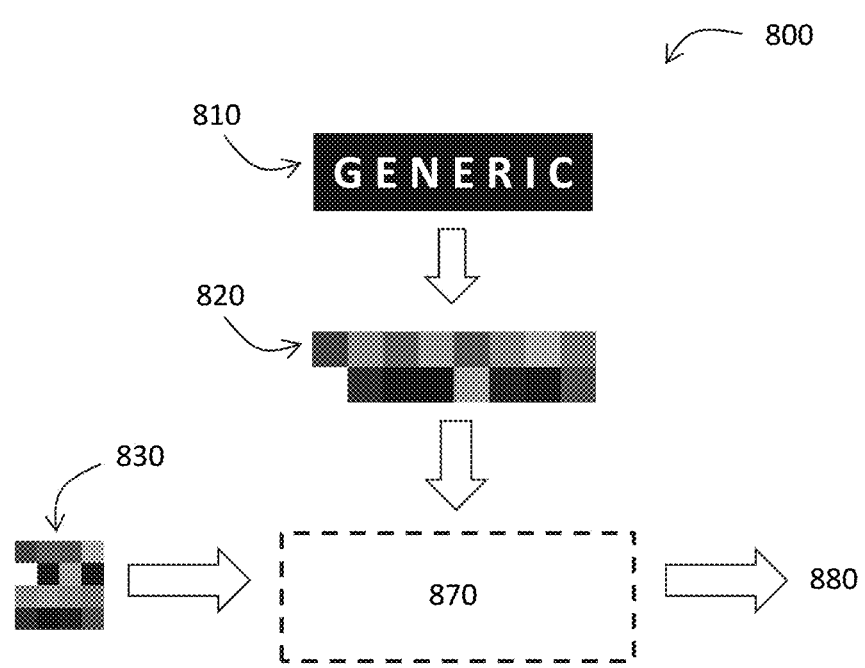
FIG. 8 is an embodiment of a coded localization system using a priori information.

FIG. 8 shows an embodiment of coded localization system 800 using a priori information. In one embodiment, the object or optical data of the word "GENERIC" is known in advance as 810 (and 810 may be created by known prior art). From this information a collection of known measurement vectors 820 is formed and later used to test against the actual sampled measurement vectors 830 in order to perform at least one task of detection, localization, ranging, and multi-channel correspondence. If 810 is an image, then the number of samples forming 810 can be much larger than in the sampled or known measurement vectors 820 and 830. In one embodiment the vector 820 contains reduced data compared to the source 810. In one embodiment the formed measurement vectors 820 and the sampled measurement vectors 830 can be normalized and so form a vector metric for sub-pixel localization of the generally complicated target 810. The actual sampled measurements 830 are compared at a vector level to the modeled vectors 820 and a vector norm calculated as a matching metric using processor 870. In one embodiment the measurement vector is compared to a stored or estimated object vector to detect at least one of the object, object orientation, and object location. In another embodiment the measurement vector is used with a mathematical model of the object to estimate object parameters.

Figure 23:
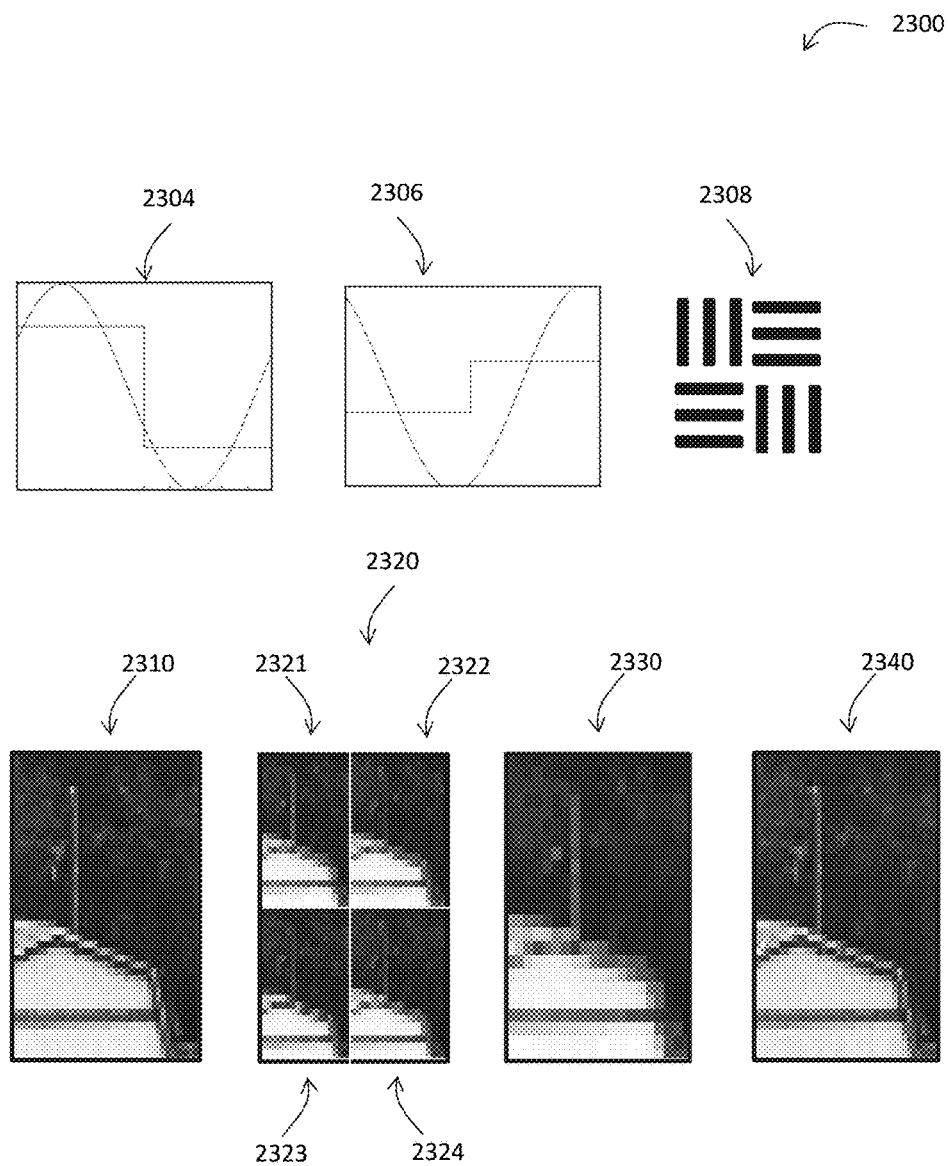
FIG. 23 illustrates an embodiment of coded localization systems forming images using overlapping FOV 2×2 systems.

The system of FIG. 8 applies to an "object camera" or "object sensor". That is, in a large number of applications information is only desired about certain type of objects, or certain classes of objects. Some applications may only be interested in capturing information about location and dimensions of telephone poles. Other applications may only be interested in the number of locations of people. All other collected data that doesn't represent information about either telephone poles or people is not really wanted and could be discarded as a pre-processing step. In one embodiment of the coded localization system 800 (operating as an object sensor), a model of a set of objects 810 is collected and then reduced to the possible known measurement vectors 820. The sampled measurement vectors 830 are compared to the known measurement vectors and objects in the set of application-specific objects are then detected, and information about these objects further detected or estimated, such as their orientation, location, position, etc. In another embodiment human viewed images corresponding to regions about the detected object can then be formed as shown in FIG. 23 from the sampled or known measurement vectors.

Even with very noisy sampled data the sampled measurement vectors can closely match the modeled vectors and the sub-pixel location 880 of the object 810 is detected. In an embodiment the normalized vector method enables an invariance to object gain, as the vectors capture direction and relative magnitude. In another embodiment the normalized vector method enables a low sensitivity to additive noise as the process is bipolar. In another embodiment the normalized vector method enables an error magnitude as well as direction for fast detection and a combination of detection and estimation steps. In an embodiment, a method and apparatus are provided for context-dependent optical data reduction and storage.

Figure 9:
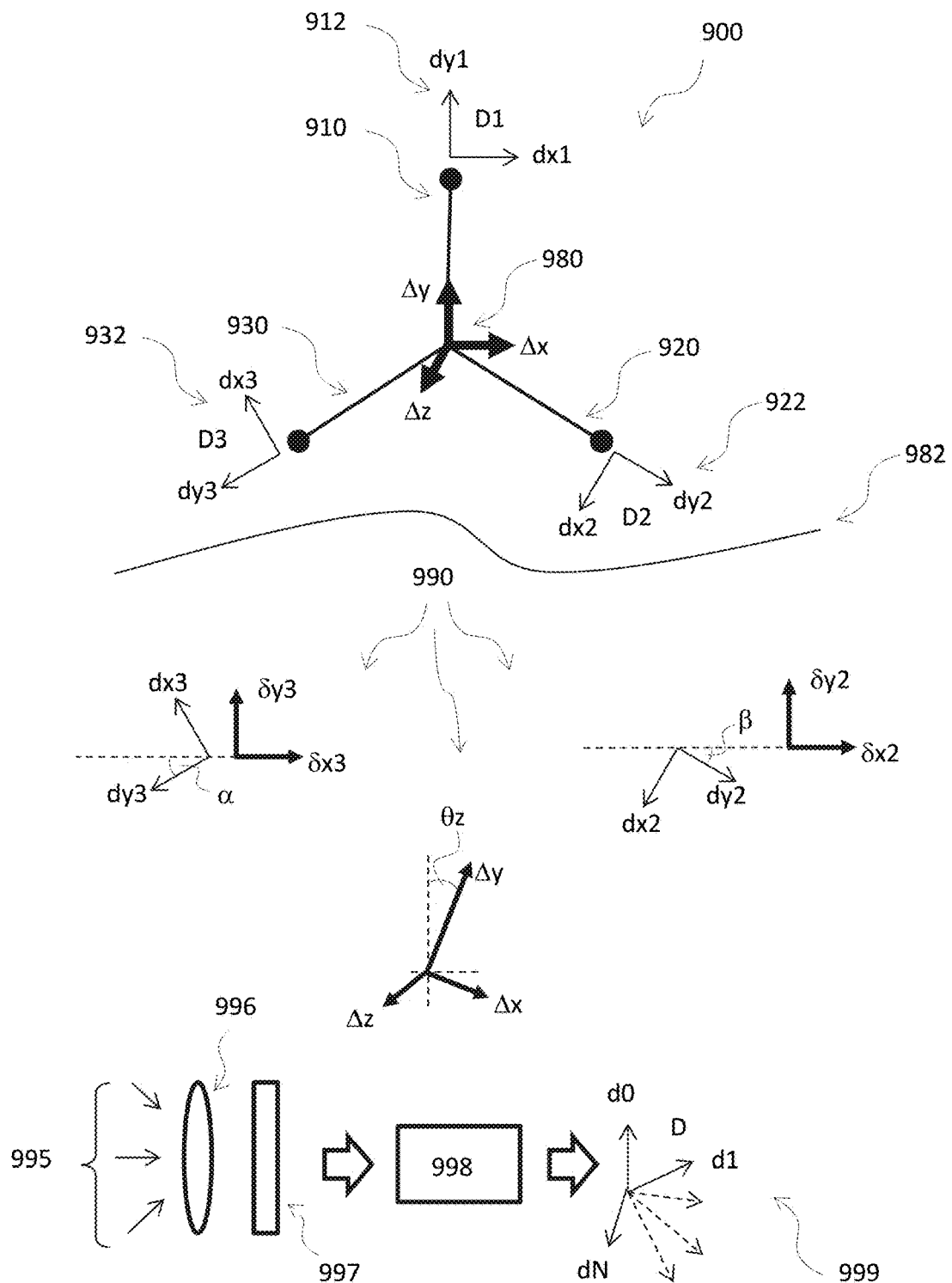
FIG. 9 is an embodiment of a coded localization system for motility and motion observation and discrimination.

FIG. 9 shows an embodiment of coded localization system 900 for motility and motion observation and discrimination. This localization system 900 is useful to build devices for localization, navigation, and orientation as described in later paragraphs and figures below. In one embodiment of system 900 the arrangement of arms 910, 920 and 930 may be for example coplanar with axes $\Delta x$ and $\Delta y$ and orthogonal to $\Delta z$ in reference coordinate system 980. Reference coordinate system 980 is also an inertial frame of reference for motility and mobility estimates. In an embodiment of system 900 each arm 910, 920 and 930 forms motion estimates 912 as [dx1, dy1], motion 922 as [dx2, dy2], and motion 932 as [dx3, dy3], respectively for each arm, along and orthogonal to the direction of the arm. In another embodiment, arms 910, 920 and 930 also provide details D1, D2, and D3 for each of the motion estimates 912, 922, and 932, respectively. In one embodiment details D1, D2, and D3 are at least one of an estimate of signal quality and noise levels, structure information such as polarization state and wavelength intensity variance, object specific features and energy information such as spatial frequency modulation and intensity across field. In one embodiment the coded nature of the coded localization system 900 provides details with an improvement in at least one of SNR, spatial resolution, size, weight, and power consumption. In another embodiment the coded nature of the coded localization system 900 provides motion estimates 912, 922, and 932 with an improvement in at least one of precision, motility detection, spatial resolution, and accuracy. In another embodiment calibration to a reference provides an improvement in absolute orientation and localization. In an embodiment, a method and apparatus are provided for absolute orientation estimation. In an embodiment, a method and apparatus are provided for absolute 3D location estimation. In an embodiment, an improvement is provided for orientation and 3D location estimation for positioning compared to prior art inertia-based navigation systems. In an embodiment, system 900 provides a method and apparatus for performing at least one of orientation and 3D location estimation for indoor applications. In an embodiment, system 900 provides a method and apparatus for performing at least one of orientation and 3D location estimation for applications with unreliable GPS coverage.

In subsystem 990 the orientation of the motion indicated by arm 922 can be decomposed at any instant in time using angle $\beta$ into components [$\delta x2$, $\delta y2$]. Also in subsystem 990 the orientation of the motion indicated by arm 932 can be decomposed at any instant in time using angle $\alpha$ into components [$\delta x3$, $\delta y3$] of the overall reference coordinate system 980 and combined with [dx1, dy1]. In subsystem 990 the angle $\theta z$ is rotation in the $\Delta x$ $\Delta y$ plane, or rotation about the $\Delta z$ axis. In an embodiment of system 900 the true motion and motility of each arm 910, 920 and 930 in reference coordinate system 980 are coupled based on a frame formed by arms 910, 920 and 930. In another embodiment of system 900 the motion estimates 912, 922, 932 are independent of each other and so a number of useful relationships and constraints between the independent motion estimates and the coupled constraints of the geometry in system 900 with respect to reference coordinate system 980 can be established.

In one embodiment when $\theta z=0$ and $dx1=0$, $\delta x2=0$ and $\delta x3=0$, when $dy1>\delta y3$ and $\delta y2=\delta y3$ reference coordinate system 980 is pitching. In another embodiment when $\theta z=0$ and $dy1=0$, $\delta y2=0$ and $\delta y3=0$, when $dx1=0$ and $\delta x2=-\delta x3$ reference coordinate system 980 is rolling. In another embodiment when $\theta z=0$ and $dy1=0$, $dy2=0$ and $dy3=0$, when $dx1=dx2=dx3$ reference coordinate system 980 is yawing with proportion to dx1.

In an embodiment a non-planar surface 982 can be profiled in at least two dimensions using a fixed reference coordinate system 980. In another embodiment of system 900 a moving surface or portion of surface 982 can be detected and estimated based on violations of the constraints presented by the physical arrangement of the arms 910, 920, and 930. In another embodiment of system 900 a known planar or non-planar surface 982 can be utilized to estimate the geometry of the physical arrangement of the arms 910, 920, and 930, for example during a calibration procedure. As such system 900 can estimate motility and relative motion, and also detect and estimate external motion. In one embodiment measurements are made in at least one of spatial, temporal, spectral and/or polarization domains. In another embodiment measurements are made in at least two of spatial, temporal, spectral and/or polarization domains.

In an embodiment system 900 may contain electromagnetic energy converters 997 for converting energy 995 into electrical signals, which may be further digitized by at least one of electromagnetic energy converters 997 and process 998 and a physical media 996 for transporting electromagnetic energy to the electromagnetic energy converters 997. Converted data is processed by process 1998 to form a sparse set of N+1 motion estimates 999 denoted d0, d1, . . . , dN. Electromagnetic energy 995 may be in the form of ultraviolet to visible to long wave infrared wavelengths, acoustical wavelengths and radio wavelengths for example.

In an embodiment electromagnetic energy 995 may be further modified by the physical media 996 prior to detection for example to affect at least one of a polarization state, a wavelength, a spatial intensity, and a modulation of a spatial frequency. In another embodiment physical media 996 may also impart a variation between modifications to electromagnetic energy 995 among the arms 910, 920, and 930 to affect at least one of the optical properties of magnification variation, field of view, optical axis skew, field intensity variation, field polarization variation, and field aberration content.

In an embodiment of the invention disclosed herein a method for design of coded localization systems included maximizing the information for a given task. Imaging systems are often designed to produce visually pleasing pictures. In cases when the systems are producing information, design methods related to information are required. A preferred method is system design that minimizes the Cramer-Rao bound and maximizes the corresponding Fisher information for particular aspects of the 3D scene information. In one embodiment coded localization systems are designed so that the cross-information between channels sampling the same remote object is reduced compared to no coding. In another embodiment the sum of the output of coded imaging channels is essentially independent of the independent variable or variables in the domain of the codes.

Design of these coded systems can be understood through information theory. Designing via methods disclosed herein can maximize the possible precision of estimated parameters, or more generally, increase the information capacity of the coded system relative to the object parameters of interest.

The variance of the best unbiased estimator $\underline{\theta}'$ of a deterministic quantity $\underline{\theta}$, based on noisy measurements, is bounded by the Cramer-Rao bound. Or, $\mathrm{Var}(\underline{\theta}') \leq$ Cramer–Rao Bound $= J(\underline{\theta})^{-1} =$ inverse of the Fisher Information matrix J.

The Fisher Information matrix J is a fundamental matrix related to the overall system that describes the sensitivities of the system to the expected unknowns. Assume the measurements y are defined by a set of unknowns. Then the elements of J are products of the partial derivatives of the measured signals with respect to the unknowns. In the additive Gaussian noise case the Fisher Information matrix can be written as $$J_{ij} = \frac{d\underline{y}^T}{d\theta_i} R^{-1} \frac{d\underline{y}}{d\theta_j},$$

where the vector y represents the measurements that are parameterized by the vector $\underline{\theta}$. The matrix R is the correlation matrix of the additive Gaussian noise. If the noise is uncorrelated and identically distributed then the correlation matrix is the identity matrix multiplied by the noise variance. In one embodiment, a diagonal correlation matrix for the following results is assumed. In another embodiment variations based on non-Gaussian and non-identical noise statistics can also be followed for systems that are not well modeled by this type of noise. In low-noise cases many types of systems are well modeled by additive Gaussian noise.

The Fisher Information matrix can also be written as $$J_{ij} = \Sigma_{\# \ of \ channels} \begin{bmatrix} \text{info on } x_0 & \cdots & X\text{info on } x_0 \\ \vdots & \ddots & \vdots \\ X\text{info on } x_0 & \cdots & \text{info on } x_0 \end{bmatrix},$$

where the sum is over the different channels. The desired information is the parameter $x_0$. The Fisher Information matrix contains entries related only to the system information about $x_0$, as well as what's called cross-information about $x_0$ and the other unknowns, as well as information about the other unknowns. The cross information on $x_0$ can be considered a nuisance parameter as its presence negatively contributes to estimating the value of $x_0$. Or, the nuisance parameters increase the related Cramer-Rao bound on the parameter $x_0$. In one embodiment of multi-channel system design a goal is to maximize the overall system information about a particular parameter while also minimizing the cross information related to the same parameter. This will result in a system optimized to estimate the chosen parameters from the crowed object information space.

In one embodiment, a simplified object model such as $y_i(x) = G \cdot h_i(x - x_0)$, with gain G and position $x_0$ unknown, and with uncorrelated white noise is employed. The partial derivatives of this model are $$\frac{dyi}{dG} = h_i(x - x_0) \text{ and } \frac{dyi}{dx_0} = -G h_i'(x - x_0), \text{ where } h'(x)$$

is the derivative of h with respect to x. The Fisher Information for one channel is then given by $$J = \begin{bmatrix} (h_i(x - x_0))^2 & -G h_i(x - x_0) h_i'(x - x_0) \\ -G h_i(x - x_0) h_i'(x - x_0) & G^2 (h_i'(x - x_0))^2 \end{bmatrix}$$

The upper right and lower left hand quantities are the nuisance parameters for the quantity $x_0$. With multiple imaging channels and two unknowns, minimizing the Cramer-Rao bound on $x_0$ is equivalent to diagonalizing the Fisher Information Matrix J. This happens when $$\sum_{channel \ \#i} h_i(x - x_0) h_i'(x - x_0) = 0.$$

In one embodiment, with two channels and the above imaging model J is diagonalized when $h_1(x) = \sin(w\,x)$, $h_2(x) = \cos(w\,x)$, for a spatial period w. In another embodiment the form of the individual channel codes can be a sum of cosines where the frequency of each cosine is a harmonic of a fundamental period. The phase of the sum of cosines for each channel is designed so that the Fisher Information is diagonal. In another embodiment the form of the individual channel codes can be a sum of products of cosines where the fundamental frequency of each cosine is a harmonic of a fundamental period. The phase of the sum of products of cosines for each channel is designed so that the Fisher Information is diagonal.

Incoherent imaging systems are non-negative. One embodiment of non-negative code is: $h_1(x) = 0.5 \sin(wx) + 0.5$, $h_2(x) = 0.5 \cos(wx) + 0.5$, for a spatial period w. By phasing of multi-channel sinusoidal codes estimation performance can be equivalent to "spatially coherent" systems. In another embodiment the sum of cosine and sums of products of cosine codes also has a bias term in order to make the code non-negative. The non-negative requirement forces the amplitude of individual sinusoidal components to decrease in multi-sinusoidal code models. This has the effect of reducing the information capacity related to those particular code components.

Figure 10:
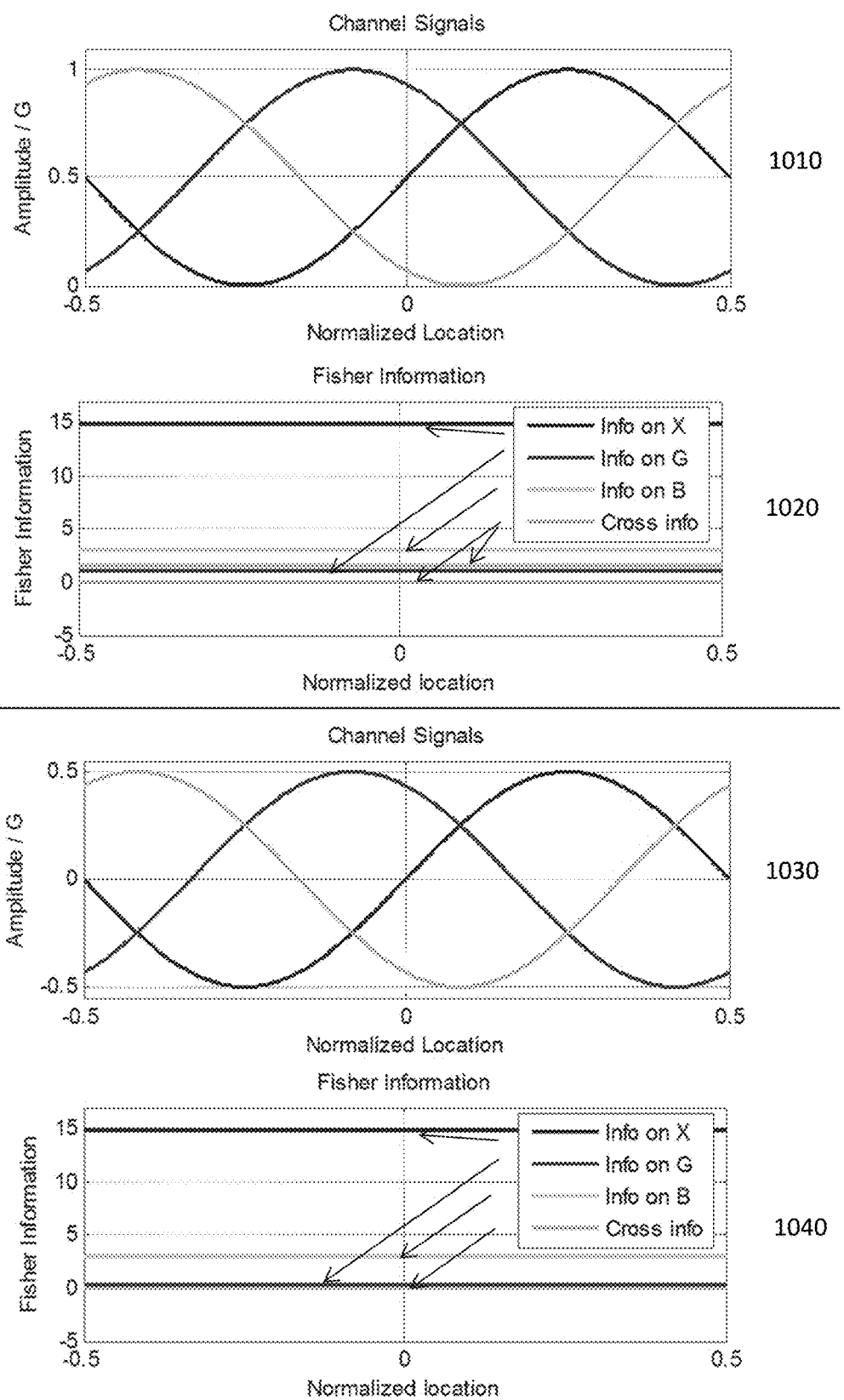
FIG. 10 shows graphs of a 3 channel linear combination coded localization system that increases the Fisher Information on object location.

FIG. 10 illustrates graphical data from a 3 channel coded system that increases the Fisher Information on object location. Graph 1010 is from a system of three unipolar or non-negative channels. Graph 1030 is from a system of three bipolar channels, or the channels from 1010 but without the bias term. The additive noise is considered to be the same for both the biased and unbiased systems. The equations of the sinusoids are given by cos(2πx+phase), where x ranges from −0.5 to +0.5. The phase of the three sinusoids are 30 degrees, 150 degrees, and 270 degrees, which are 2π symmetric with a 120-degree separation.

From graph 1030 the unbiased channels are bipolar (have negative values). While a temporally incoherent optical system cannot have negative measurements, the 3 channel biased system of 1010 can have identical information about the unknown position variable x as the unbiased system. The Fisher Information related to measurements 1010 is shown in 1020, and for 1030 is shown in 1040. These Fisher Information plots also include an unknown additive bias term. With proper system design the addition of unknown bias does not negatively affect the captured information about the desired parameter or parameters. The value of information about variable x is the same in 1020 and 1040. And, the cross information related to X is zero for both 1020 and 1040. The non-zero cross information curve in 1020 is related to the cross information between G and B.

Figure 11:
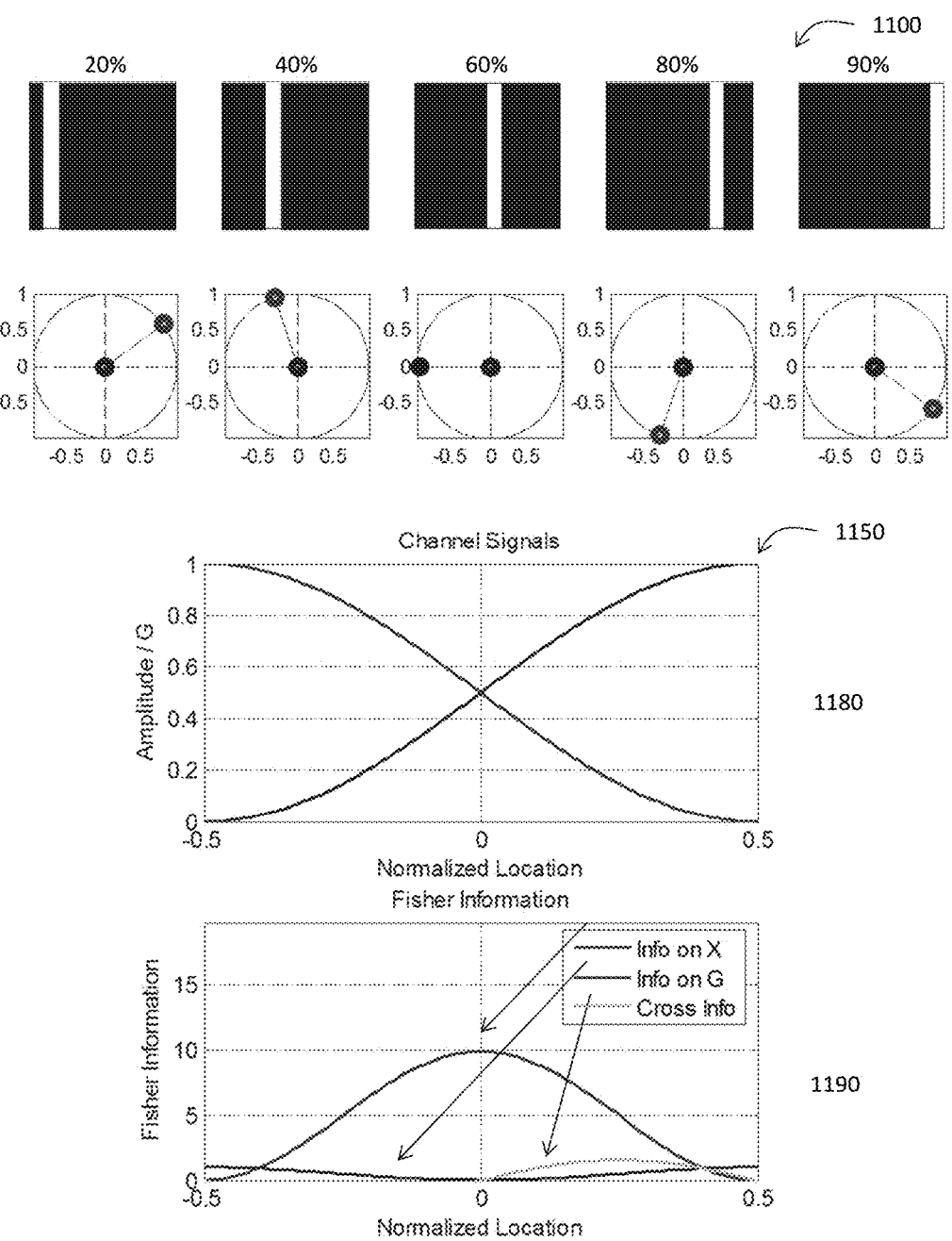
FIG. 11 shows graphs of codes for a coded localization system performing sub-pixel imaging of a 1D line on a set of coded pixels.

FIG. 11 shows graphical data 1100 for a coded localization system performing sub-pixel information gathering, detection and estimation of a 1D line on a set of coded pixels. The set of coded pixels, the codes, and the disparity of the codes constitute a "system" as a functional description used hereinafter. The top row shows the aerial images of a line as it would appear during one period of the codes before sampling. In one embodiment the period of the codes is over one or less pixels. In another embodiment the period may be over many pixels. In one embodiment the pixel codes are biased sinusoids and cosines and the measured data is the inner product of the individual codes with the aerial image data.

In one embodiment the imaging model is unknown gain, bias and vertical line location and four codes record each of the horizontal or vertical sub-pixel dimensions of the line. In an embodiment when the four codes are sinusoids phased by 90 degrees the difference between the two 180 degree out of phase channels is a bipolar sign with no bias. The two sets of differences yield two bias-free measurements that are together shifted in phase by 90 degrees. These two measurements may represent the real and imaginary part of the Fourier Transform coefficients at one spatial frequency of the sub-pixel object. The complex representations of these differences of Fourier transform measurements are represented as the horizontal and vertical vectors in the row of unit circles shown in FIG. 11. The two vectors have been scaled so that the largest magnitude is one, and the vector with the smaller magnitude is scaled proportionately to one. In the case of imaging a vertical line, all the vertical vectors have essentially zero magnitude. The horizontal vectors directly indicate the sub-pixel location of the vertical line.

Figure 25:
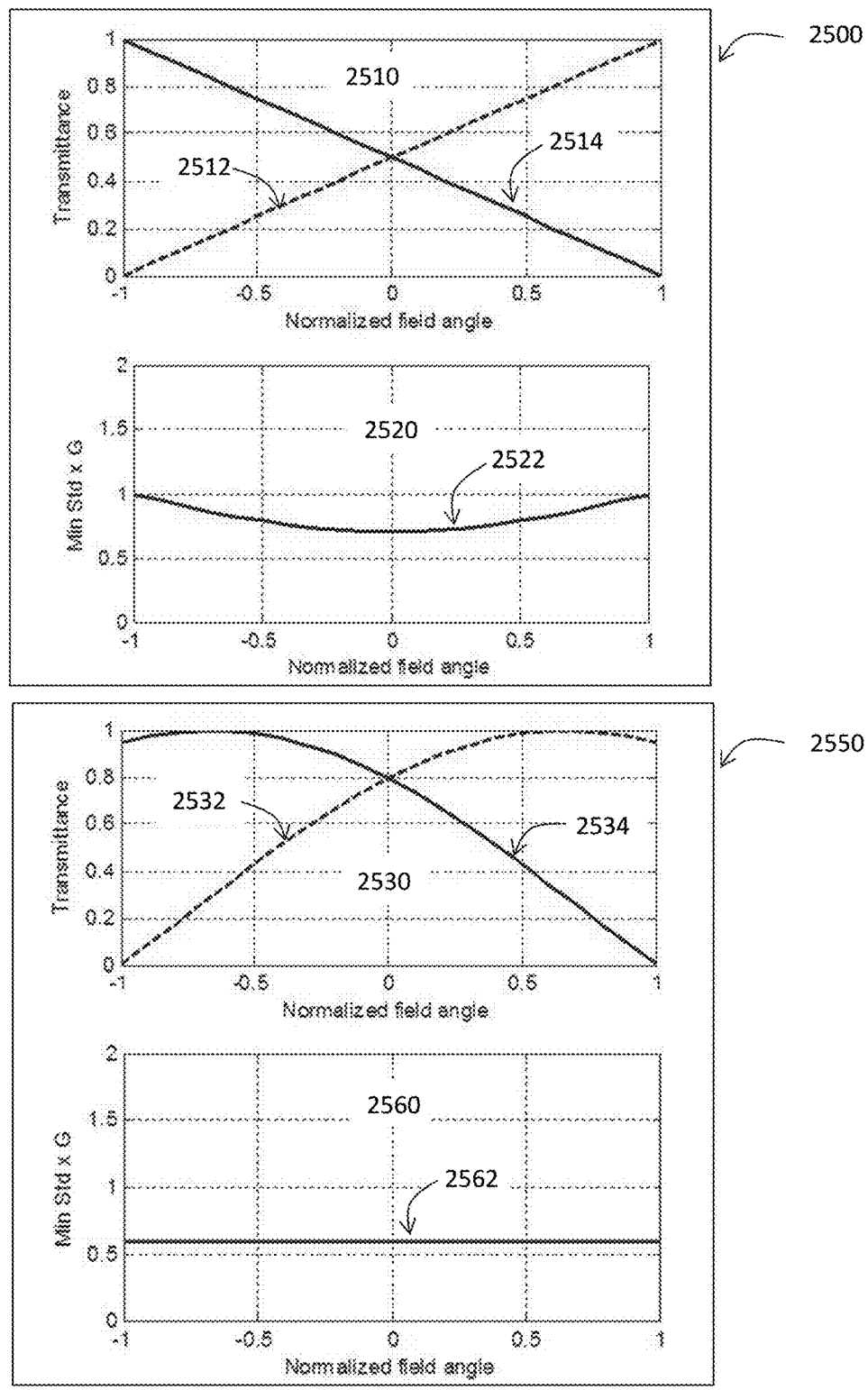
FIG. 25 is an embodiment of an optimized two pixel system.

In another embodiment when the gain and bias were known a priori then only 2 codes phased by 180 degrees are needed for each vertical or horizontal direction of the object. In one embodiment the a priori knowledge is obtained from an un-coded channel. An example of such codes is given in system 1150 with graphs 1180 and 1190. Graphs 1180 and 1190 describe a "system" as they show the system design aspects (the code values), with two different codes as the system requires, and the associated Fisher information, that enables the results shown in 1100. Graph 1180 in FIG. 11 shows two sinusoidal codes that have 2π symmetry, or are phased by 180 degrees. A bias has been added so that the amplitude of the codes is non-negative. The Fisher Information on related to these codes is shown in graph 1190. Notice that the maximum value of Fisher Information related to spatial position x is about ⅔ that of the 3 channel coded system of plot 1020 of FIG. 10. From graph 1190 the information related to spatial location is biased as a function of sub-pixel location. The system designer can accept this bias or redesign the 2 channel code to form a compromise between bias and 2π symmetry. In a comparison case, FIG. 25 shows two examples of two channel codes that illustrate other choices. In one embodiment the channel codes in FIG. 25 are polynomial codes.

The two channel codes 2500 of FIG. 25 have 2π symmetry (or the sum of the codes are constant as a function of spatial position) as shown in 2510. The square root of the inverse of the Fisher Information, or Cramer Rao Bound (CRB), for this system is described in 2520. The CRB for this system is also biased but has less change than does the equivalent CRB for the two channel system 1150 in FIG. 11. System 2550 in FIG. 25 describes another related design that does not exactly hold 2π symmetry but does achieve an unbiased CRB, and therefore an unbiased Fisher Information as shown in 2560. The collection of graphs in 2550 is considered a "system" since it describes the design of the codes, the orthogonality of the code designs, and the Fisher information achieved. Each code taken alone is unimportant, rather it is the inter-relationship of the codes or the system-level accomplishment of the combination of codes that is important. There are numerous other two channel codes such as those in FIG. 11 and FIG. 25 that balance the need for orthogonality, non-negativity, 2π symmetry and CRB/Fisher Information bias.

Figure 12:
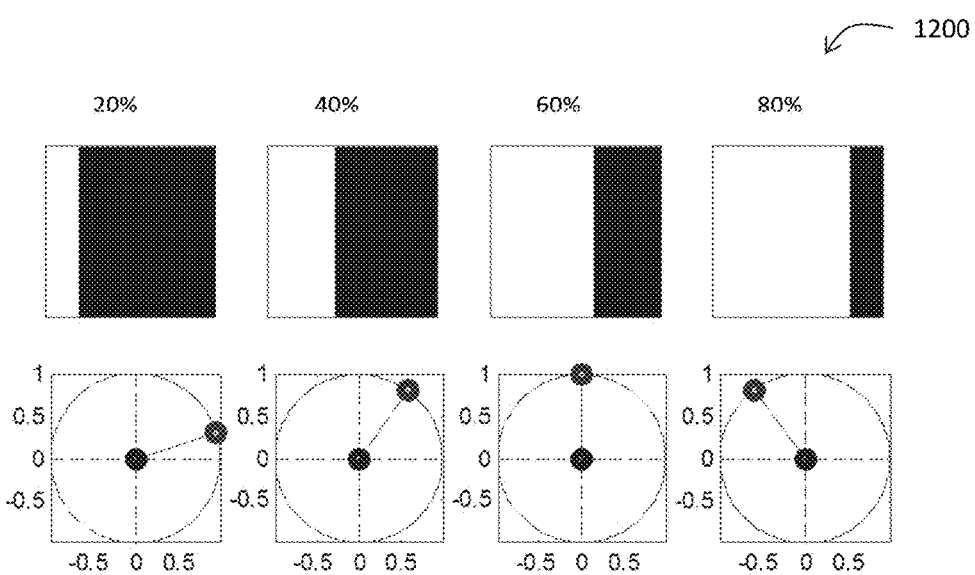
FIG. 12 illustrates codes for a phased sinusoidal coded localization system responding to a sub-pixel edge.

FIG. 12 shows a phased sinusoidal coding for a localization system 1200 and responding to a sub-pixel edge. The edge is a vertically aligned edge so the vertical measurement vectors have zero magnitude. The horizontal vector, being the Fourier Transform at one spatial frequency of the sub-pixel imagery, shifts with the location of the edge. The location of the sub-pixel edge location can be directly measured from the horizontal measurement vector. In one embodiment system 1200 uses 4 phased channels per direction with no a priori knowledge of the edge gain and bias. In another embodiment system 1200 uses 2 phased channels per direction with a priori knowledge of the edge gain and bias.

In another embodiment the number of actual unknowns in the image data is larger than the unknowns that are actually desired. The image gain and bias, for example, are two quantities that are often considered less important in 3D imaging/ranging than the range to particular spatial features. In an embodiment to further simplify and reduce system size, weight, and power, hi-resolution imagery is acquired and used to model the sampled measurement vectors a priori. With this high resolution information the gain and bias can be considered known. In another embodiment high-level and high resolution image processing features may be used to guide the image processing.

In another embodiment a high resolution imaging system is equipped with coded localization systems that provide measurements in 3D that are used in conjunction with the high resolution images to augment disparity in multi lens camera systems. In another embodiment the augmented disparity is used to generate coordinates for at least one of entertainment, mapping, navigation, survey, and geoinformation systems.

In another embodiment an estimate of bias is formed through the sum of the outputs of the measurement channels. The sum of the measurement channels can be an accurate measure of the bias (code bias plus the bias from the object, system, etc.) if the codes are designed with $2\pi$ symmetry. An important characteristic of $2\pi$ symmetry is that the sum of the measurement channels can be a constant for a particular object in the domain of the code. Reconsider the three-channel measurement system of 1010 from FIG. 10. The sum of the codes or measurements 1010 is a constant as a function of normalized location. The sum of the code then provides no information about location, only information about bias.

In a method for designing a 2D optical system and a system PSF, codes designed to have $2\pi$ symmetry are those where the sum of the measurement channels is independent of the particular domain variable, be it spatial, polarization, temporal, etc. Consider spatial coding. Then a set of codes has $2\pi$ symmetry if the combination of PSF and spatial codes, when all channels are summed, produces a sampled value that is ideally independent of spatial location. A multi-aperture 2×2 system with 2 horizontal and 2 vertical sinusoidal codes can have $2\pi$ symmetry if the sinusoids for each channel are out of phase by 180 degrees. Design of codes also depends on field of view arrangements of multiple channels including overlap and adjacency, or system field of view (SFOV), as well as the task at hand ("where is that," and "where am I"), where codes that have overlapping fields of view or specialized SFOVs can provide multi-channel signals with more information than independent and un-coded sensors when detecting objects or motion and also discriminating between global and local motion.

Figure 13:
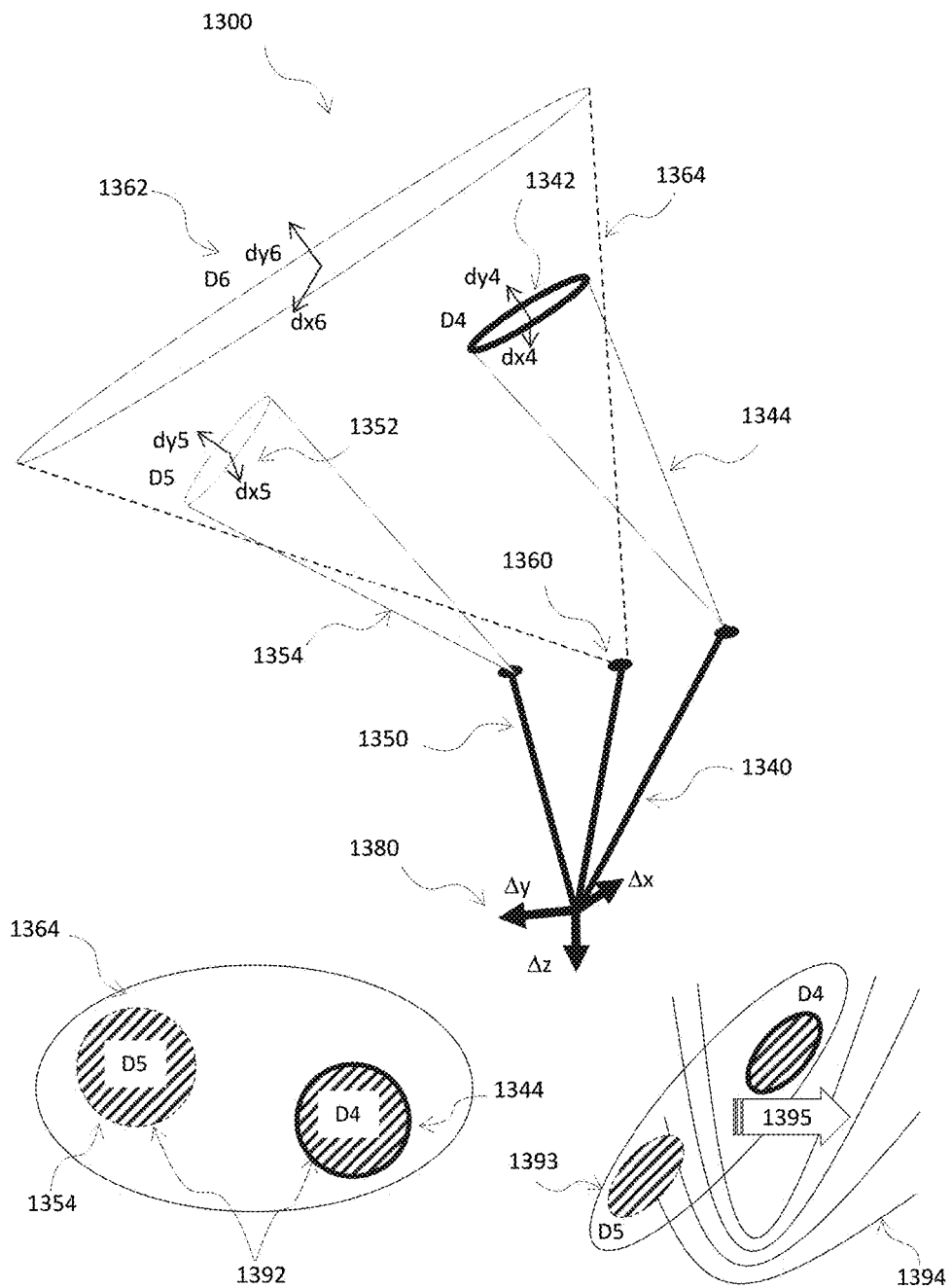
FIG. 13 is an embodiment of a coded localization motility and motion observation and discrimination system with overlapping fields of view.

FIG. 13 is an embodiment of a coded localization motility and motion observation and discrimination system 1300. In one embodiment of system 1300 each arm 1340, 1350 and 1360 forms motion estimates 1342, 1352, and 1362 respectively, within overlap regions 1392 formed by the overlap of large region 1364 with smaller regions 1344 and 1354. In an embodiment the motion estimation 1342, 1352, and 1362 also contain details D4, D5, and D6 are for example independent estimates of wavelength intensity. In another embodiment details D4, D5 and D6 contain polarization intensity and angle.

For one embodiment of system 1300 the true motion and motility of each arm 1340, 1350 and 1360 in reference coordinate system 1380 are coupled based on a frame formed by arms 1340, 1350 and 1360 overlap regions 1392. In another embodiment of system 1300 the motion estimates 1342, 1352, 1362 and details D4 and D5 are independent from each other. In another embodiment the details D6 from region 1364 have a partial dependence on regions 1344 and 1354.

In one embodiment system 1300, when rotated about the $\Delta z$ axis, has a system field of view (SFOV) consisting of sparse region 1393 panned across a region (indicated by arrow 1395) such as sky, resulting in a SFOV shaped like a band with a finite extent of elevation and 360 degrees in azimuth. Features 1394 are in one embodiment, at least one of a measure of polarization strength and direction. Features 1394 are in another embodiment a response to polarization codes from the coded localization systems. In one embodiment various parameters of the features 1394 are reported in the details D4, D5, and D6. In another embodiment details D4, D5, and D6 contain at least one of parameters related to contrast, intensity contours, wavefront slope, and wavelength information.

In another embodiment system 1300 provides details D4, D5, and D6 for regions contained within the SFOV where the details contain polarization for sky for at least a portion of the SFOV. The pattern of vectors in the at least one portion of the SFOV provides geocentric azimuth, elevation and roll estimates from polarization patterns in the sky. In an embodiment motion and motility estimates of the reference coordinate system 1380 such as motion 1395 across pattern 1394 allow the portions of the SFOV to be mapped into an adaptive sky model. In an embodiment the adaptations include influences from near-horizon effects including at least one of pollution, dust, smoke, and thermal gradient wavefront distortion.

While measuring orientation of signals containing partial polarization is common and well known, measuring signals with polarization parameters with very low degree of partial polarization is not well known. In one embodiment of measuring low degrees of partial polarization the unknown medium of FIG. 4 is included in system 1300 and acts to change the degree of polarization, often to a very low value that can be recovered by use of the invention disclosed herein. In another embodiment the unknown medium of FIG. 4 is at least one of clouds, fog, thermal gradient wavefront distortion, and pollution.

In another embodiment the collection of optics and detector of system 1300 have some particular field of view (FOV), which may be a portion of the overall SFOV, and instantaneous field of view (iFOV) and forms N measurements. The iFOV is the FOV of a particular pixel. In another embodiment the iFOV may be a function of the particular pixel, through for example, distortion of the optics. In one embodiment coded localization systems are disclosed where the sampled PSF of the imaging system is space-variant. In another embodiment the N measurements form a measurement vector as a function of spatial position. In another embodiment the N measurements form a measurement vector with a magnitude and phase as a function of spatial position. In another embodiment the N measurements are configured to be unbiased. In another embodiment the N measurements are designed so that the sum of the squares of the N measurements is constant in the absence of noise.

In one embodiment the system 1300 produces the data matrix M in FIG. 3 through the unknown medium 480 in FIG. 4. Assume that (x1,y1) is the spatial location of the data in M. Then the collection of data through a polarization dimension is M(x1,y1,i), i=1, 2, . . . N. For the moment assume that the unknown medium 480 in FIG. 4 as applied to system 1300 just imparts a constant magnitude or gain and bias over spatial, spectral, temporal and polarization domains of the measured data. In this embodiment of data M the measured data in the polarization domain can be described as $$M(x1,y1,i)=G\cos(wi+phi1)+\text{Bias}$$

$$\underline{M}(x1,y1)=G\cos(wi+phi1)+\text{Bias}$$

where $\underline{M}$ is a vector of M and G is an amplitude dependent on the signal 493a-c in FIG. 4, the unknown medium 480 attenuation and the sensitivity of the sensing system 1300. The phase phi1 is related to the relative orientation of the signal and the sensing system. The Bias is also related to the signal, the unknown medium and the sensing system. The term wi is considered known and is related to the rotation of the coding elements 340 to 340*n* in FIG. 3 and coding elements 440 to 440*n* in FIG. 4 when the coding elements form a polarization analyzer. In an embodiment the degree of partial polarization can be given by the ratio of G to the Bias. In another embodiment orientation is determined using G and phi1. In another embodiment data M is acquired with minimized Bias and maximized G. In another embodiment data M is acquired with equal Bias and G.

In real systems the sensing of M is always in the presence of noise. The estimation of G, phi1 and Bias is then a statistical estimation problem. The best possible estimation performance can be described in terms of Fisher Information and Cramer-Rao bound for this particular embodiment. In an embodiment design of the sensing system 1300 involves optimizing the system to maximize the Fisher Information relative to the quantities of interest while reducing the cross information with other quantities. This is equivalent to reducing the Cramer-Rao bound for the best possible unbiased estimation performance of particular parameters of the system. In one embodiment the parameters to be estimated include at least one of a linear polarization angle and magnitude.

In one embodiment the Fisher information matrix is created by the inner products of the partial derivatives the data model M with respect to the system unknowns G, phi1 and Bias. Or $$J(i,j) = [\partial \underline{M}/\partial(\theta_i)]^T [\partial \underline{M}/\partial(\theta_j)]$$

If $d_i := \cos(w^*i)$, $i=1, 2, \ldots N$ is chosen so that the sum($\underline{d}$)=0 then only the diagonal elements of the Fisher information are non-zero and $$J(1,1)=N/2, J(2,2)=N\ G^{\wedge}2/2, J(3,3)=N.$$

In one embodiment, N=3 and the different channels of the coding elements 340 to 340*n* in FIG. 3 and 440 to 440*n* in FIG. 4 are linear polarizers and are rotated consecutively by (180/3) degrees (and the effect on the measurement phase is 2×180/3) degrees then w*i=0, 2π/3, 4π/3. And sum(sin(w* $\underline{i}$))=0. The best possible unbiased estimation variance of the three parameters are then given by $$\text{var}(G_{est}) \geq 2\text{sigma}^{\wedge}2/N$$

$$\text{var}(phi1_{est}) \geq 2\text{sigma}^{\wedge}2/(G^{\wedge}2 N)$$

$$\text{var}(\text{Bias}_{est}) \geq \text{sigma}^{\wedge}2/N,$$

where sigma$^{\wedge}$2 is the variance of the additive white Gaussian noise. In many situations this noise is dominated by shot noise, which is unavoidable even in "perfect" detectors. In one embodiment shot noise is minimized by adjusting exposure time to minimize Bias while maximizing G. In another embodiment shot noise is minimized by adjusting sensor sensitivity to minimize Bias while maximizing G. In another embodiment shot noise is balanced with read noise by adjusting sensor sensitivity to equalize Bias and G.

In one embodiment the design the coded localization system will choose the channels of the polarization domain so that the cross information between unknowns is zero or as low as possible while also acting to increase the Fisher Information of the desired unknowns. In another embodiment the unbiased codes sum to zero. In another embodiment unbiased codes form an orthogonal set.

Figure 14:
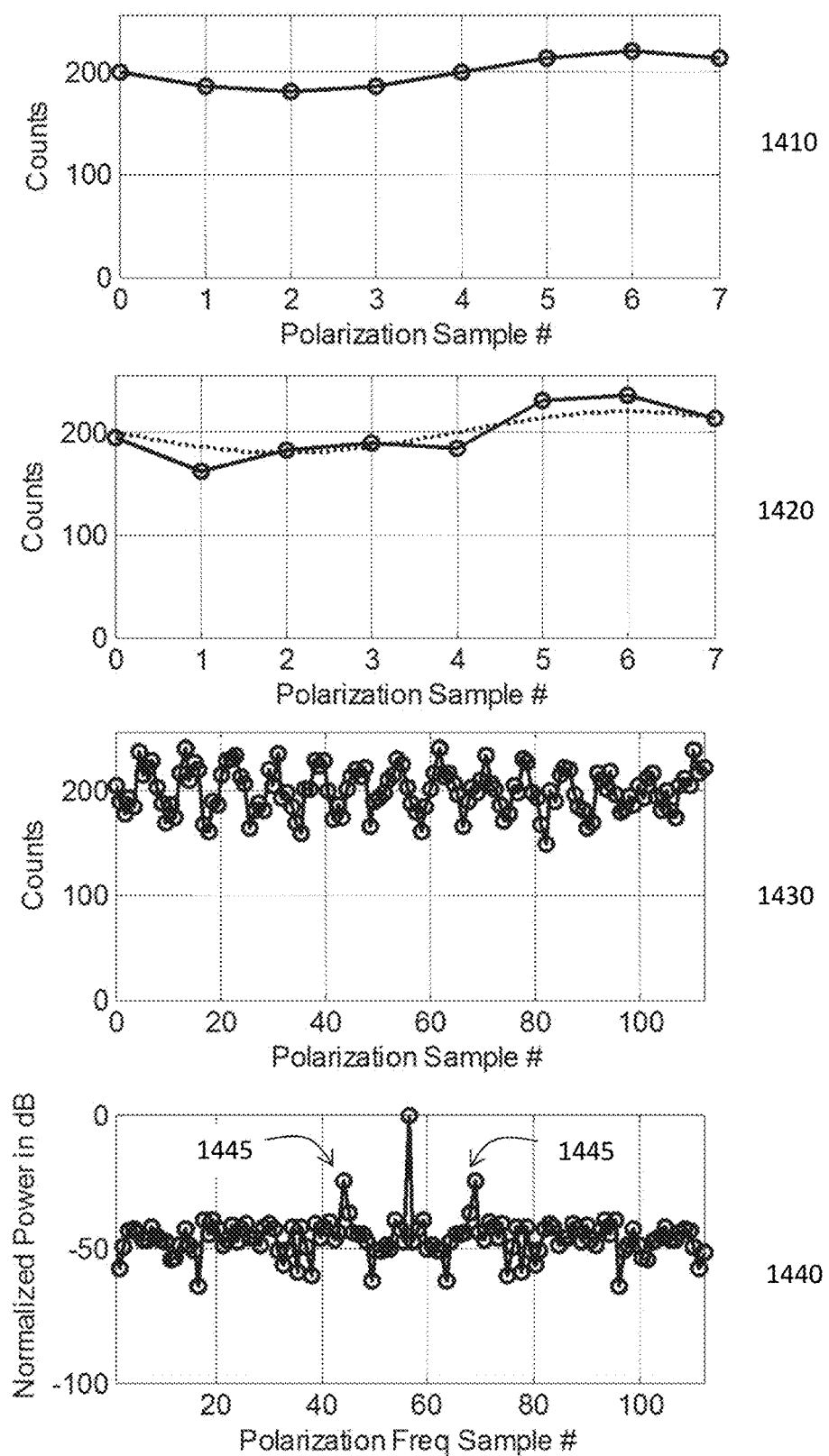
FIG. 14 is an embodiment of a coded localization system showing 8 polarization steps with $2\pi$ symmetry, or $\pi/4$ phase steps, or $\pi/8$ real rotation steps of a linear polarizer.

In practice the amplitude of the signals 493*a-c* in FIG. 4 can be very small relative to the noise level of the sensing system 1300. High noise levels lead to a reduction of localization precision. As an example, the signal amplitude in the polarization domain can be less than 1% of the full scale signal. With a ten bit detector operating close to full well, the amplitude of the detected signal can be about 0.01*1024 or about 10 counts out of maximum of 1024 measured grayscale counts. With even a perfect detector the standard deviation of the shot noise would be about sqrt (1024)=32 counts resulting in a signal-to-noise level far less than one. FIG. 14 is an embodiment of a coded localization system showing 8 polarization steps with 2π symmetry, or π/4 phase steps, or π/8 real rotation steps of a linear polarizer. In one embodiment to improve the estimate of the polarization signal amplitude and phase more polarization steps can be used. FIG. 14 shows graph 1410 with 8 polarization steps with 2π symmetry, or π/4 phase steps, or π/8 real rotation steps of a linear polarizer. Graph 1420 in FIG. 14 shows the result of this signal in shot noise.

The use of more than the minimum number of polarization phase samples is useful for detecting when the actual measured signal does not correspond to a sinusoidal model. With proper choice of optics and detector the iFOV can be made small compared to the angular extent of the signals as seen by the sensing system. When the iFOV is smaller than the signal angular extent a larger number of samples can be used in the estimation of the unknowns thereby increasing estimation precision in unavoidable noise.

If the system is designed to minimize the cross information spatial resolution can be traded for estimation precision. If the signals have lower spatial resolution than the sensing system this can be a beneficial trade. In one embodiment the received data can be configured such as: [$\underline{M}$(x1,y1); $\underline{M}$(x2,y2); $\underline{M}$(x3,y3); ...; $\underline{M}$(xN,yN)], where the concatenation of noisy sinusoid is seamless due to the 2π symmetry of the designed system. In another embodiment the received data can be configured such as: $1/N^* \Sigma i \underline{M}(xi,yi)$.

FIG. 14 graph 1430 illustrates an embodiment for spatial concatenation of 2π symmetric polarization samples to increase the ability to estimate signal phase in noise. Any one imaging channel is represented by graph 1420. Graph 1430 shows the polarization samples in 4×4 spatial neighborhoods with additive shot noise. Graph 1440 is the Fourier Transform of graph 1430, plotted as 20*log 10 of the Fourier Transform of the data. While graph 1430 can be considered roughly a sinusoid graph 1440 clearly shows the sinusoidal nature of the signal indicated as peaks 1445 in the spectrum. The phase of the signal at the signal peaks 1445 can be estimated from the phase of the complex values of the Fourier Transform.

From the above Cramer-Rao bounds, the variance of best possible unbiased estimate of the signal phase is dependent on the amplitude of the signal. As the signal amplitude decreases the ability to estimate the phase also decreases, or the variance of the best unbiased estimator of signal phase increases. In an embodiment the processing required to estimate the phase of unknown polarization signals can change as a function of the signal amplitude or degree of polarization. In contrast, as the signal bias increases so too does the noise. In an embodiment the processing required to estimate the phase of unknown polarization signals can change as a function of at least one of the signal bias and degree of de-polarization.

Figure 15:
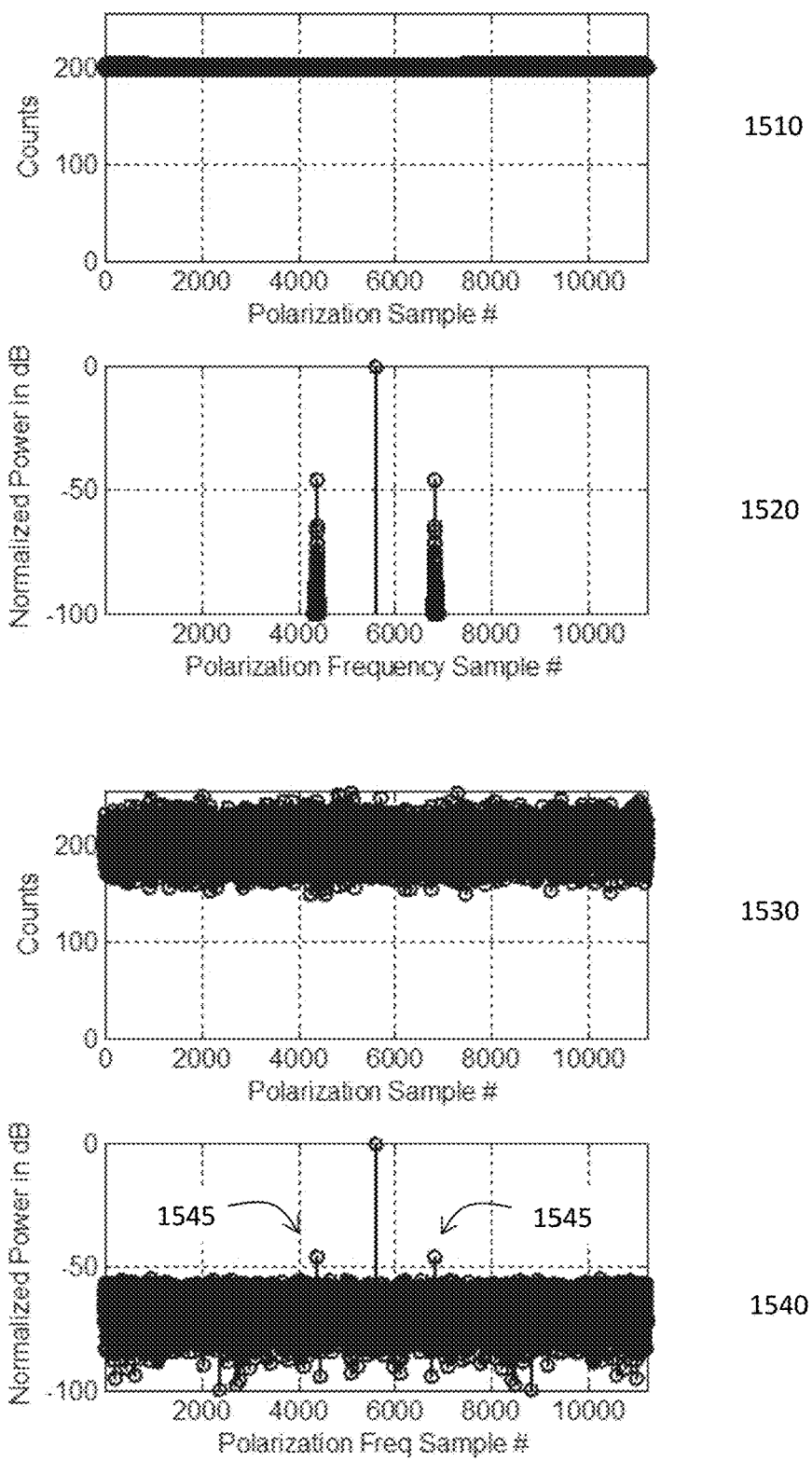
FIG. 15 is an embodiment of the invention including stacking samples and performing spectral decomposition.

FIG. 15 is an embodiment of the invention including stacking samples and performing Fourier decomposition. Graph 1510 shows a noise-free sinusoidal signal that has been stacked as described in FIG. 4 to form a long signal. Signal 1510 has a bias of 200, degree of polarization 1%, amplitude 2 with 8 polarization angles across 40×40 spatial samples with no noise. Graph 1520 shows the Fourier transform of the signal in graph 1510. Graph 1530 shows the signal in graph 1510 with shot noise. Signal 1530 has a bias of 200, degree of polarization 1%, amplitude 2 with 8 polarization angles across 40×40 spatial samples with shot noise. In an embodiment the Fourier transform is used to estimate the magnitude and phase of the underlying signal as shown in graph 1540 as peaks 1545. The sinusoids are clearly above the noise in the spectral analysis.

Figure 16:
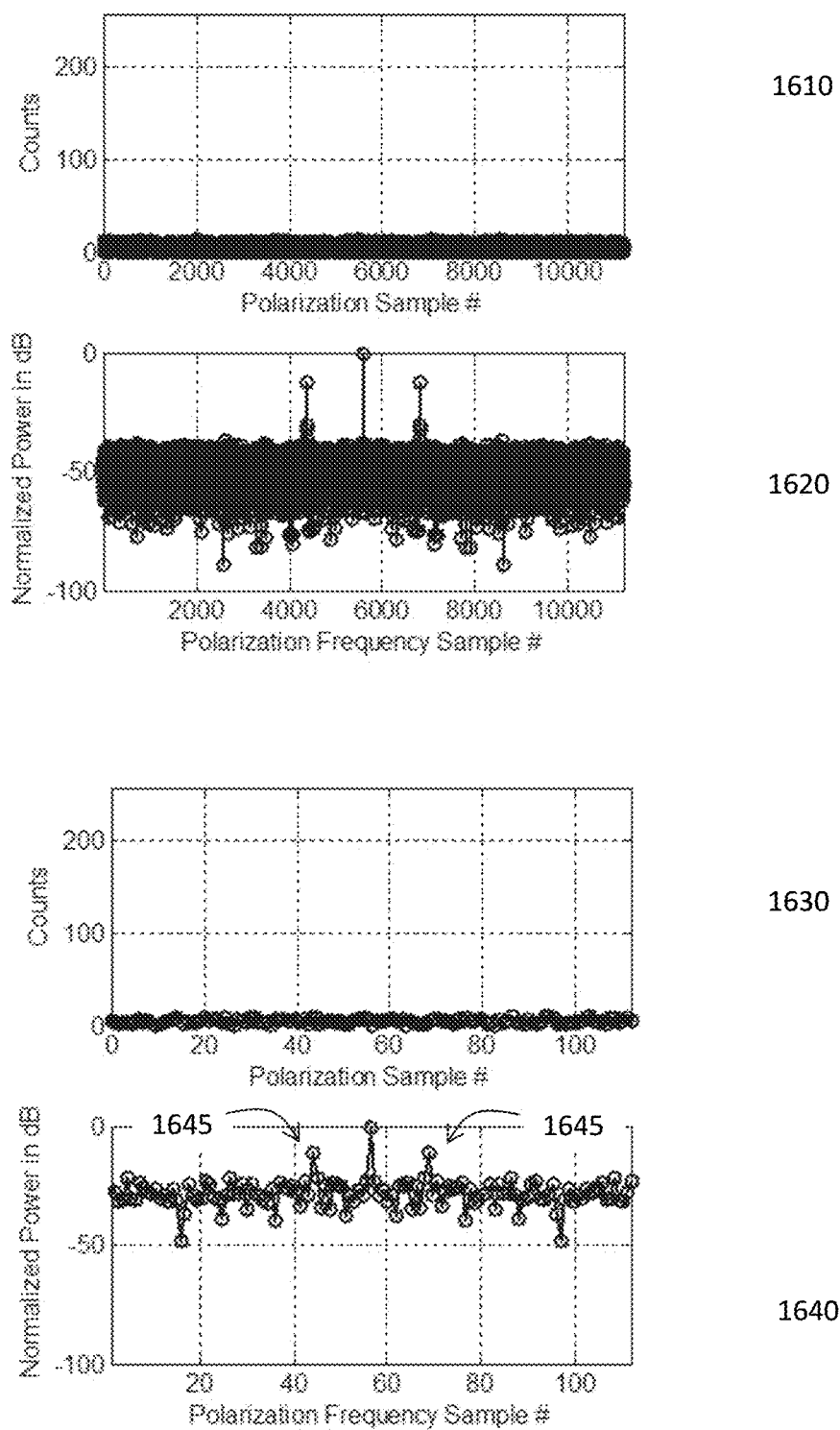
FIG. 16 is an embodiment of the invention including stacking samples and performing spectral decomposition.

FIG. 16 is an embodiment of the invention including stacking samples and performing Fourier decomposition. Graph 1610 shows a sinusoidal signal that has been stacked as described in FIG. 4 to form a long signal. The difference between 1610 and 1530 is that the exposure related to 1610 has been reduced by approximately a factor of 10 compared to 1530. This reduction in exposure reduced the signal bias and shot noise but not the signal amplitude. Signal 1610 has a bias of 20, degree of polarization 1%, amplitude 2 with 8 polarization angles across 40×40 spatial samples with shot noise. Graph 1620 shows the Fourier transform of the signal in graph 1610. The sinusoids are clearly above the noise in the spectral analysis. Even with fewer samples as in graph 1630, the spectral components are still clearly visible in graph 1640 as points 1645. In an embodiment, the optics reduce the memory storage required compared to the FOV and localization uncertainty. In another embodiment, optics and data-dependent signal processing reduces the amount of data stored compared to classical imaging systems.

Due to the non-uniformity of the unknown medium 480 described earlier the SNR can vary spatially across typical images. Therefore the ability to implement a spatially varying process will further improve results, for example by correctly selecting the number N or the fundamental exposure time to use in given FOV or iFOV. In an embodiment where the amplitude of the signal is limited but the bias can be increasing the exposure time can be optimized to equalize gain and bias. In an embodiment arms 1340, 1350, and 1360 in FIG. 13 have different exposure times providing spatially varying sampling if G and Bias in the SFOV.

Figure 17:
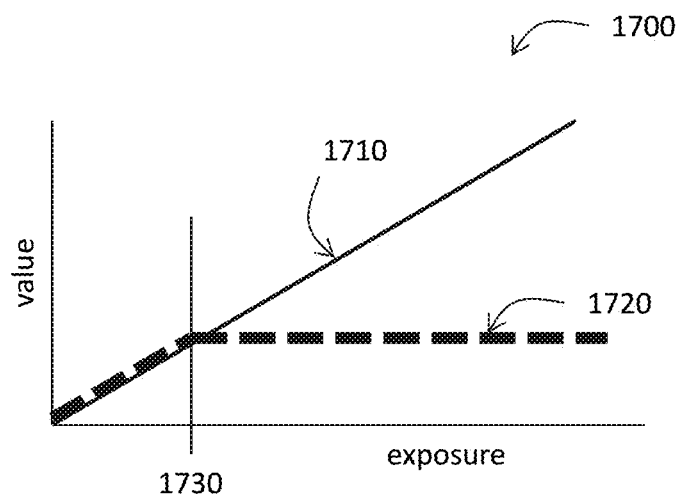
FIG. 17 is an embodiment of the invention where the amplitude and bias are optimized for increasing exposure.
Figure 17:
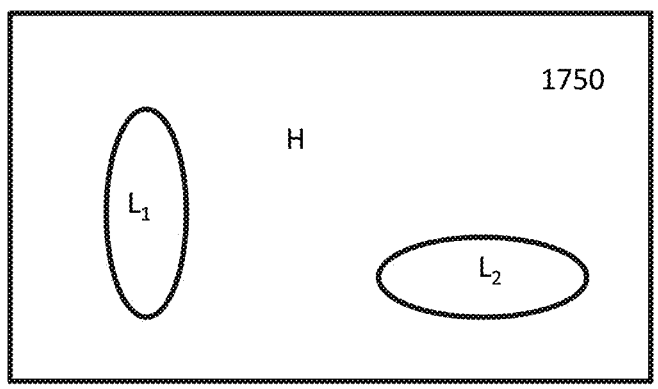
Figure 17:
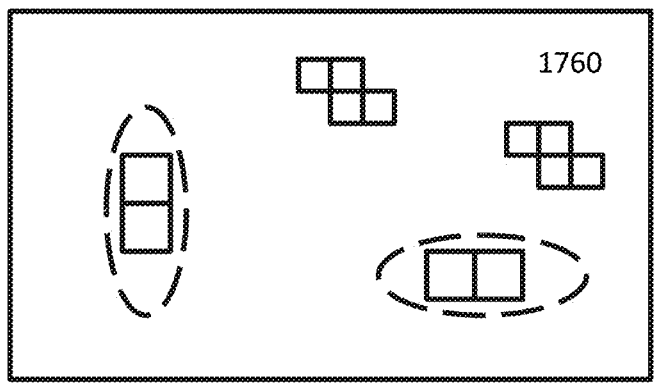

FIG. 17 is an embodiment of the invention showing system 1700 where the amplitude 1720 and bias 1720 are shown for increasing exposure on horizontal axis. Exposure value 1730 can be considered an optimal exposure value since the amplitude of the signal is maximized. Increasing exposure beyond 1730 only increases the shot noise in the system. Low dynamic range signals such as these can benefit from varying the exposure as a function of detected bias and amplitude present in the signals. FIG. 17 also shows a symbolic representation for spatially varying data acquisition and also spatially varying processing. In one embodiment the spatially varying data acquisition changes as a result of the estimated polarization amplitude or degree of partial polarization. In another embodiment the spatially varying processing changes as a result of the estimated polarization amplitude or degree of partial polarization. One goal of this spatially varying data acquisition and processing is to bound the uncertainty in the estimate of the polarization phase below some level. Box 1750 shows a symbolic map of estimated polarization intensity in spatial coordinates. There are three broad regions of polarization amplitude H, L1 and L2. In one embodiment the region denoted by H could be defined by the spatial regions where the estimated degree of polarization is >10%. Regions L1 and L2 are regions where the degree of polarization is say, 5% and 1%.

In an embodiment at least one of the acquisition parameters and processing parameters within regions L1 and L2 can change in order to improve or better match the estimated phase uncertainty over the entire spatial extent.

Box 1760 shows another embodiment of the invention with unique spatial data acquisition and processing regions that could be increased to improve estimated phase accuracy. The data acquisition and processing parameters related to region H is some value, while in region L1 approximately 2×2 more polarization samples are gathered and in region L2 10×10 more polarization samples are gathered, wherein gathered includes at least one of collecting more data temporally and spatially over at least one of longer periods of time and larger spatial regions and denser sampling periods. In one embodiment the increased number of polarization samples can be through larger spatial neighborhood. In another embodiment the increase in samples can be through at least one of additional samples in time, through additional polarization measurements and measurements in different colors and imaging channels. In another embodiment an increase in polarization samples can be through a reduced exposure and multiple exposures.

In one embodiment when the spatial extent of localized information is very broad and has low variation, very few detector elements can be utilized to understand the information in the object space. In another embodiment the object space is not sparse and is highly variable and the task is insensitive to such a signal and very few detector elements can be utilized to understand the information in the object space.

Figure 18:
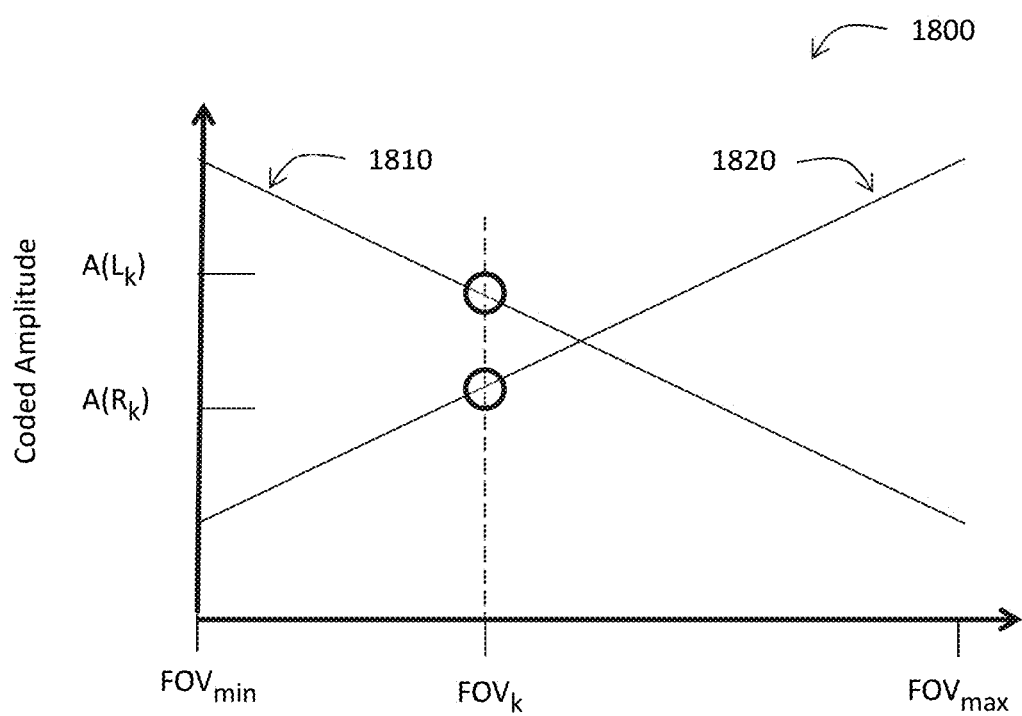
FIG. 18 is an embodiment of a localization code that can be applied across the field of view of a bipolar two detector motion sensor system.

FIG. 18 is an embodiment of a localization code that can be applied across the field of view of a bipolar two detector motion sensor system similar to that illustrated in FIG. 5. The embodiment in FIG. 18 as applied to the apparatus of FIG. 5 shows a system 1800 of linear codes that vary with the particular object FOV of the system. The left channel 1810 and right channel 1820 in FIG. 18 represent the response of the set of complimentary lens regions 550 as measured at the sensor 520 and 521 in FIG. 5, as a function of FOV. For a finite number of lens regions 550 the actual code could be a stepped structure vs. FOV and as a function of L3 and R3 in FIG. 5. As the number of channels becomes large, or if individual optics for each channel have a wide FOV, the code can become smooth and continuous vs. FOV. For a particular moving object located at $FOV_K$, the particular complementary lens region k would then produce a signal measured by the sensor with amplitude of $A(L_K)$ and $A(R_K)$ times some unknown gain.

In one embodiment, an angle and gain normalized code represented in FIG. 18 is such that the left channel 1810 is represented by x,|x|<1 and the right channel is 1−x,|x|<1. In this case the minimum FOV is represented by x=0 while the maximum FOV is represented by x=1. The measurement model is then L(x)=G*x, R(x)=G*(1−x) where both the gain G and angle x are unknown. The values of L(x) and R(x) are equivalent to $A_1$ and $A_2$ on FIG. 5.

In another embodiment a difference-over-sum calculation is sufficient to estimate the location of x from L(x) and R(x). [L(x)−R(x)]/(L(x)+R(x))=2x−1, which is independent of the unknown gain G. In this embodiment an estimate of object angle x is: Estimate(x)=(½)[(L(x)−R(x))/(L(x)+R(x))+1].

In another embodiment angle can be estimated as a function of time the angular velocity of an object between any adjacent positions in x can be determined by differentiating Estimate(x).

Figure 19:
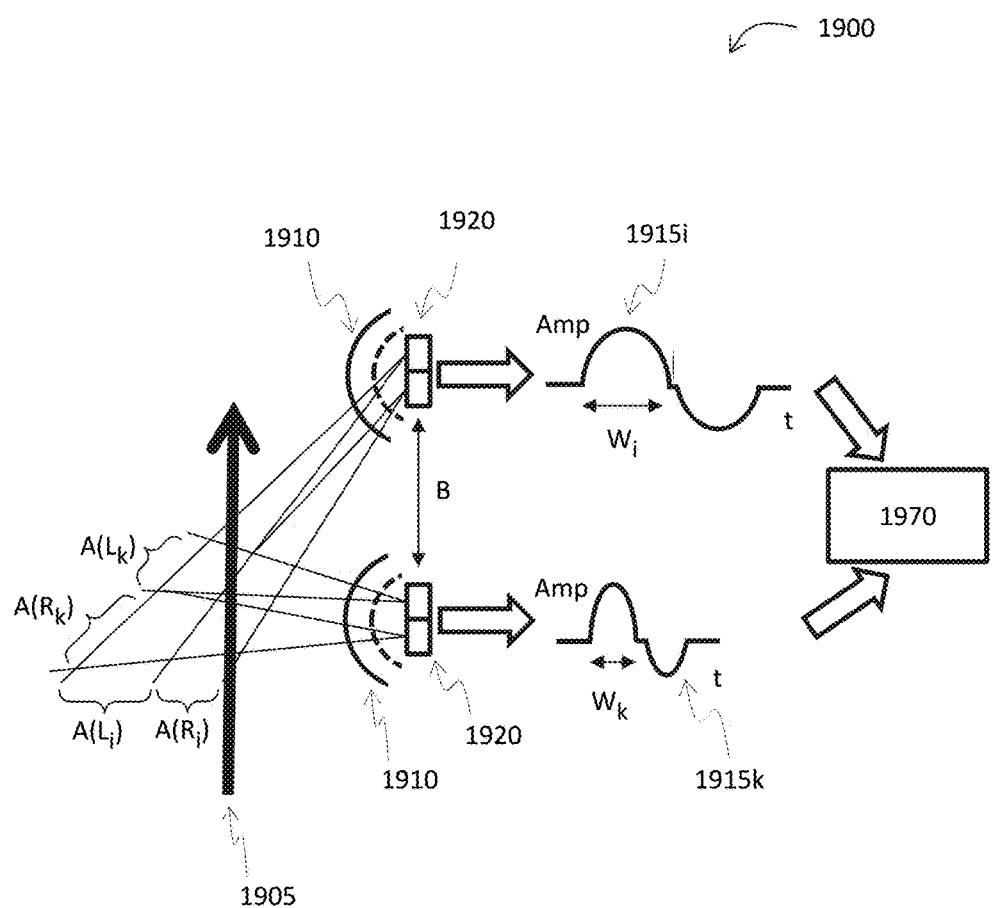
FIG. 19 illustrates an embodiment where at least two coded localization systems can be used to estimate object range and velocity in addition to object angle and angular velocity from object motion.

FIG. 19 illustrates an embodiment where at least two coded localization systems can be used in system 1900 to estimate object range and velocity in addition to object angle and angular velocity from object motion 1905. In one embodiment system 1900 contains at least two systems where each system is similar to that of FIG. 5 and contains bipolar detector pairs 1920. In another embodiment the two systems can also be combined within a single optic 1910. In another embodiment the object motion 1905 is at least one of constant and nearly zero and system 1900 undergoes at least one of translation and rotation to scan the object field of interest.

By estimating the angle to an unknown object from two different positions using processor 1970, range estimates can be formed independent of the gain of the system, intensity of the object, etc. An object with some motion vector 1905 traversing two complementary lens regions A(Li) A(Ri) and A(Lk) A(Rk) produce two temporal output signals 1915$i$ and 1915$k$ respectively. In an embodiment the output signals 1915$i$ and 1915$k$ are amplitude coded and temporally coded. The amplitude code is due to the code designed into the complementary lens regions. The temporal code is due to the general optical characteristics and the direction and speed of motion of the object. The two codes are providing complementary information to processor system 1970 and so in one embodiment can be used to further increase the precision of the range and velocity estimates if the baseline separation of the two systems, B, is known. In another embodiment the complementary information can be used to directly estimate the baseline B as well as the range and velocity of the unknown objects. In another embodiment complementary measurement vectors are used to estimate change in at least one of orientation and 3D location. There is only one baseline B that will yield the corresponding amplitude and temporal codes for the unknown distant object velocity vector as measured by the two detector outputs yielding a discriminating signal for multiple inputs. In an embodiment system 1900 is able to count discrete objects in motion 1905 within the field of view of system 1900.

Figure 20:
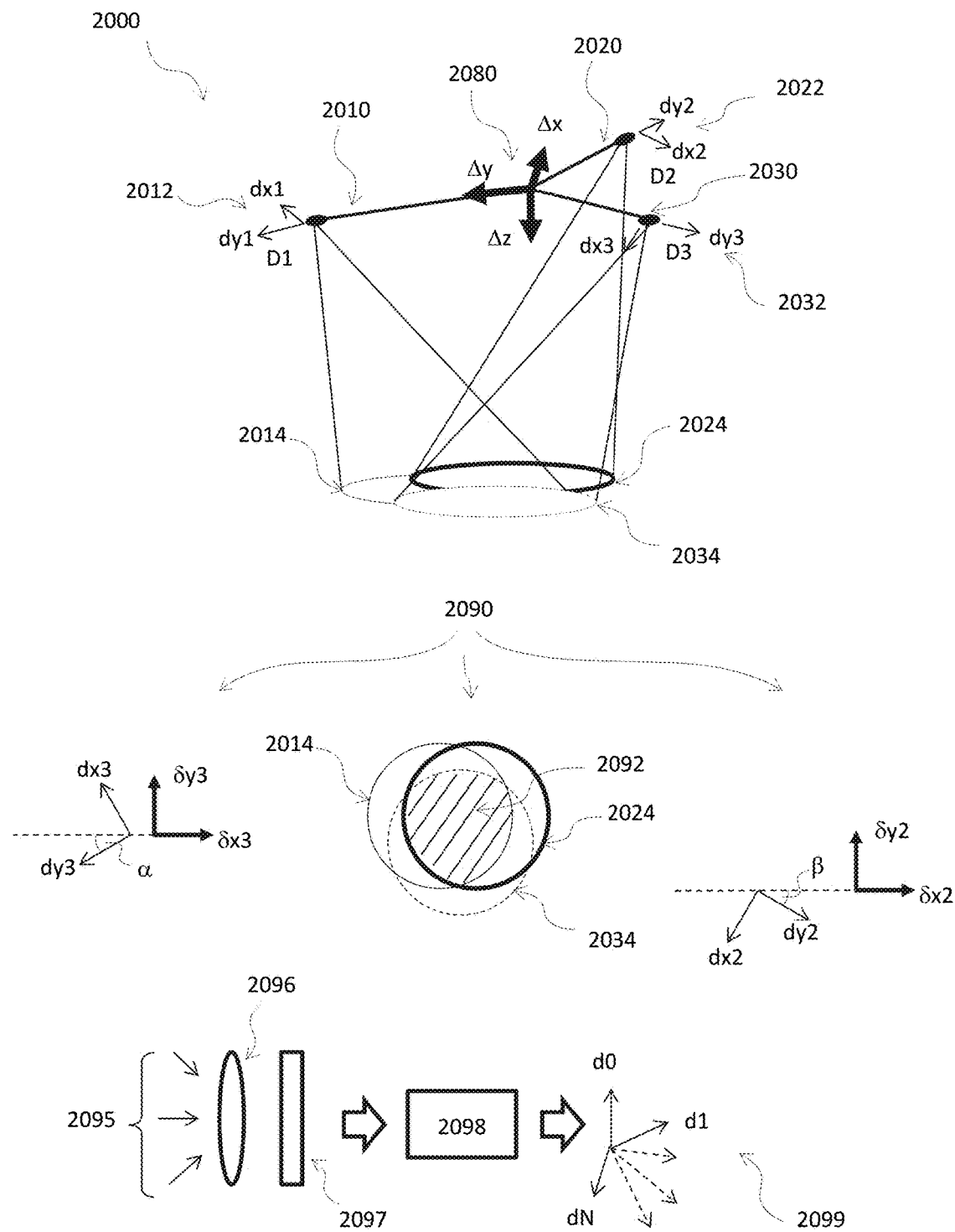
FIG. 20 is an embodiment of a coded localization system for motility and motion observation and discrimination.

When using multiple systems with single, dual, or multiple pixels and overlapping fields of view, multiple functionalities are enabled including determination of orientation or motility and translation of the system and also detection and estimation of objects and object motion within the system field of view. FIG. 20 shows an embodiment of a coded localization system 2000 for motility and motion observation and discrimination. In one embodiment of system 2000 the arrangement of arms 2010, 2020, and 2030 may be coplanar with axes $\Delta x$ and $\Delta y$ and orthogonal to $\Delta z$ in reference coordinate system 2080. In another embodiment each arm 2010, 2020 and 2030 forms motion estimates 2012 2022, and 2032 respectively, in directions orthogonal to $\Delta z$, within partially-overlapping regions 2014, 2024, and 2034. The overlap region is shown as hatched region 2092 in subsystem 2090. In another embodiment the motion estimation 2012, 2022, and 2032 also contain details D1, D2, and D3 are at least one of independent estimates of signal confidence, noise level, signal level, wavelength, wavefront phase, wavefront amplitude, and polarization direction and polarization magnitude of the partially-overlapping regions 2014, 2024, and 2034 and overlap region 2092. In another embodiment details D1, D2, and D3 are also for example object specific information including at least one of object edges, object corners, object structures, object texture, and features of interest for an object. In another embodiment details D1, D2, and D3 contain statistics about object specific information.

In another embodiment of system 2000 the true motion and motility of each arm 2010, 2020, and 2030 in reference coordinate system 2080 are coupled based on a frame formed by arms 2010, 2020, and 2030 and overlap region 2092. In another embodiment the motion estimates 2012, 2022, and 2032 are independent of each other and so a number of useful relationships and constraints exist between the independent motion estimates and the coupled constraints of the geometry in system 2000 with respect to reference coordinate system 2080 and an overlap region 2092. In an embodiment when $\theta z=0$ and $dx1=0$, $\delta x2=0$ and $\delta x3=0$, when $dy1=k(\delta y3)$ and $\delta y2=\delta y3$ the magnification of the system producing motion estimates 2012 is k times that of 2022 and 2032.

In an embodiment system 2000 may contain electromagnetic energy converters 2097 for converting energy 2095 into intensity and a physical media 2096 for transporting electromagnetic energy to the electromagnetic energy converters 2097. Converted data is processed by process 2098 to form a set of N+1 motion estimates 2099 denoted d0, d1, . . . , dN. Electromagnetic energy 2095 may be in the form of ultraviolet to visible to long wave infrared wavelengths, acoustical wavelengths and radio wavelengths for example. In another embodiment electromagnetic energy 2095 may be further modified by the physical media 2096 prior to detection for example to affect at least one of a polarization state, a wavelength, a spatial intensity and a modulation of a spatial frequency within the overlap region 2092. In another embodiment physical media 2096 may also impart a variation between modifications to electromagnetic energy 2095 among the arms 2010, 2020, and 2030 to affect at least one of the optical properties of magnification variation, field of view, optical axis skew, field intensity variation, field polarization variation, and field aberration content within the overlap region 2092.

Figure 21:
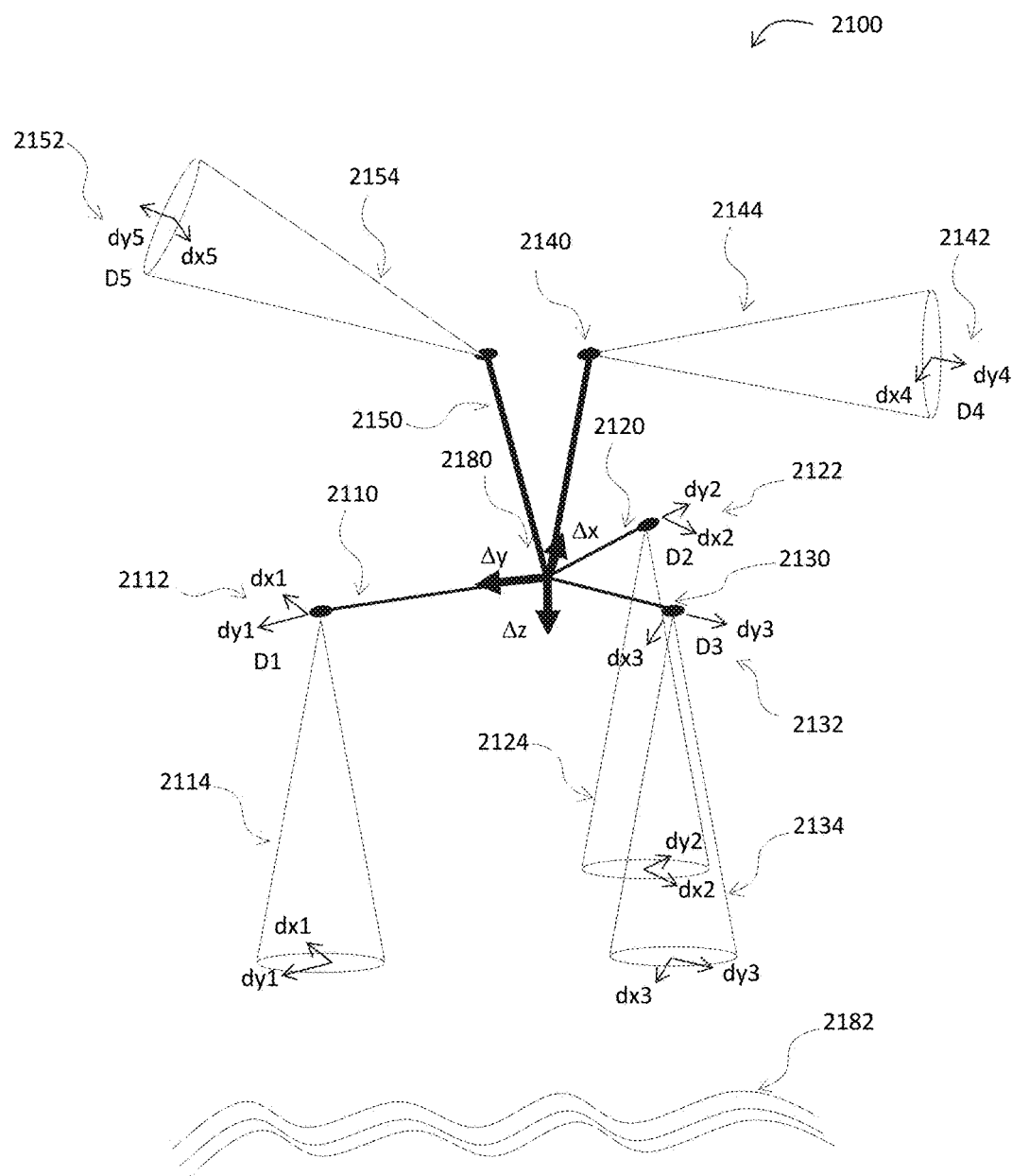
FIG. 21 illustrates an embodiment of the invention for motility and motion observation and discrimination.

FIG. 21 illustrates a coded localization system 2100 for motility and motion observation and discrimination. In one embodiment of system 2100 the arrangement of arms 2110, 2120, and 2130 may be coplanar with axes $\Delta x$ and $\Delta y$ and orthogonal to $\Delta z$ in reference coordinate system 2180, while arms 2140 and 2150 may be coaxial with $\Delta z$. In one embodiment each arm 2110, 2120, 2130, forms motion estimates 2112, 2122, and 2132, respectively, in the directions orthogonal to $\Delta z$, within non-overlapping regions 2114, 2124, and 2134 that intersect with surface 2182. In another embodiment each arm 2140 and 2150 forms motion estimates 2142 and 2152, respectively, in the directions coaxial to $\Delta z$, within non-overlapping regions 2144 and 2154 that do not intersect with surface 2182. In another embodiment the motion estimation 2112, 2122, 2132, 2142, and 2152 also contain details D1, D2, D3, D4, and D5. In one embodiment details D1, D2, and D3 are for example independent estimates of the contrast and structure in surface 2182 and details D4 and D5 are at least one of estimates of the polarization, intensity, contrast and structure for regions 2144 and 2154 containing at least one of scattered sunlight, starlight, and moonlight. In an embodiment multiple systems are used for at least one of orientation and 3D localization. In another embodiment multiple systems are used to estimate change in at least one of orientation and 3D location. In another embodiment the estimated or detected change in orientation or location is finer than the pixel spacing.

In an embodiment of the invention described by system 2100 the true motion and motility of each arm 2110, 2120 2130, 2140 and 2150 in reference coordinate system 2180 are coupled based on a frame formed by arms 2110, 2120, 2130, 2140 and 2150. In an embodiment the motion estimates 2112, 2122, 2132 based on surface 2182 are independent of each other and are also independent of motion estimates 2142 and 2152. In an embodiment using a high number of independent motion estimates that are physically dependent on a common reference coordinate system 2180 the robustness of the overall motility and motion estimate is improved.

In another embodiment system 2100 further benefits from a wide System Field of View (SFOV). The SFOV is benefited by the motility of the reference coordinate system 2180 and in an embodiment contains the sparse sampling regions 2114, 2124 and 2134 on surface 2182 and also the sparse sampling regions 2144 and 2154. The motility of reference coordinate system 2180 is exhibited by rotating system 2100 in θz, or rotation about the Δz axis, causing the sparse sampling to estimate motility with [dx1, dy1], [dx2, dy2], and [dx3, dy3] and also estimate apparent far field motion as [dx5, dy5] and [dx4, dy4]. In an embodiment the far field motion estimates and the motility estimates must correspond to the rigid body dynamic constraints of system 2100. Motion estimates that are produced with a high degree of confidence as exhibited by high valued details D4 or D5, that do not match motility parameters, indicate that there was an independent motion estimate in the far field independent of the motility and therefore detection of externally moving assets is enabled for a moving and motile platform as embodied by system 2100. In another embodiment the SFOV for rotating in θz includes the annulus formed by regions 2114, 2124 and 2134 swept in a circular arc upon surface 2182 and the horizontal horizon bands formed by sweeping regions 2144 and 2154 in a circular arc across a surface formed by the horizon and at least one of skylight, moonlight, and twilight. In another embodiment the coded localization system 2100 measures relative locations of other objects. In another embodiment the coded localization system 2100 measures absolute locations of other objects. In another embodiment the coded localization system 2100 measures at least one of a relative orientation and a relative location of itself. In another embodiment the coded localization system 2100 measures at least one of an absolute orientation and an absolute location of itself.

Figure 22:
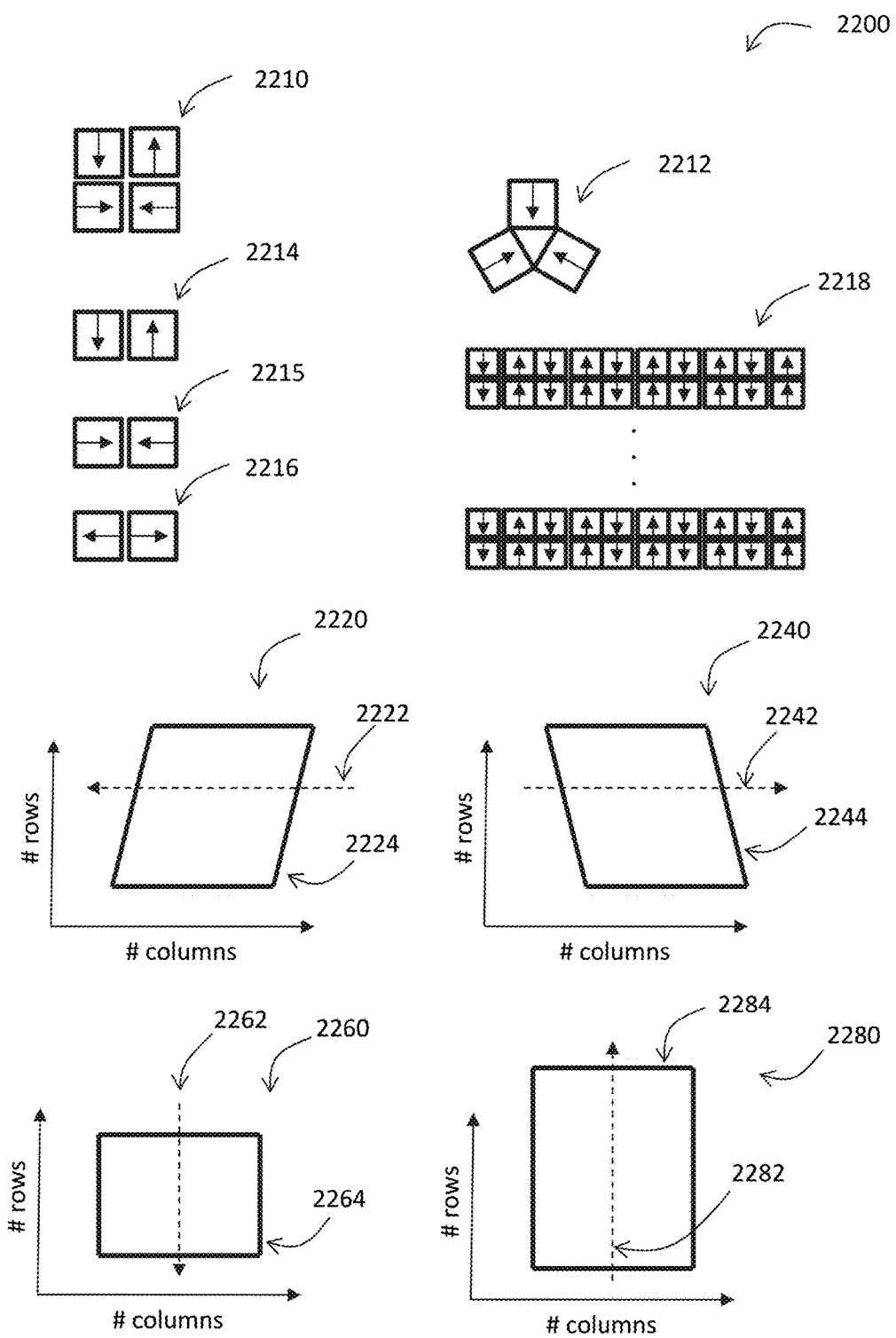
FIG. 22 is an embodiment of the invention with sampling diversity for coded localization systems.

FIG. 22 is an embodiment of the invention with sampling diversity for coded localization systems. In many coded localization systems including motion and motility discrimination systems that use detectors operating with rolling shutter exposures, motion that is fast relative to row (or column) exposure times can skew the image captured and sampling diversity is employed. In another embodiment of the disclosed invention rolling shutter correction is provided for coded localization systems through sampling diversity as illustrated in FIG. 22. For objects with horizontal motion relative to sensor sampling when sensor rows are sampled in temporal sequence or rolling shutter sampling as in 2220 and 2240 the resulting images are sheared relative to a global sampling of the object at a single time instant. In one embodiment the shear is known and signal processing can be used to recover the proper image without the shear. In another embodiment an object is moving across the rows and towards a row sampling/reading, as in 2260, and the image of the object is vertically compressed. In another embodiment the object motion is with the direction of row sampling/reading so that the image of the object is expanded as in 2280.

Systems 2220 and 2240 show a shearing of the formed image, while 2260 and 2280 show a motion and direction dependent magnification of the object. 2260 experiences a loss of information of the object as the magnification is reduced, while 2280 shows an increase of information as the magnification of the object has increased. Objects travelling towards or away from sensors with rolling shutter sampling will also experience a motion dependent magnification as sampling of the object over time will result in a time-dependent magnification due to changing object distance.

In an embodiment coded localization sampling diversity systems 2200 consist of multiple rolling shutter sampling sensors in diverse geometries. System 2210 samples rows both vertically and horizontally. In an embodiment, system 2210 may be achieved by using sensors oriented and changing the readout direction of the rows and columns. In another embodiment system 2210 may be achieved by using mirrors and optical elements to reverse the effective readout directions relative to the image of the object presented to the sensor. In another embodiment system 2210 may be achieved by rotating sensors and changing sensor readout timing. System 2212 is another embodiment where the readout directions are not orthogonal to each other. System 2214 is another embodiment of coded localization sampling diversity where the sensor readout directions are opposite each other in the vertical direction. System 2215 is an embodiment where the sensor readout directions are opposite each other in the horizontal direction and reading toward each other. System 2216 is an embodiment where the sensor readout directions are opposite each other in the horizontal direction and reading away from each other. In another embodiment of coded localization sampling diversity, systems 2214, 2215, and 2216 can be enabled by multiple sensors or with a single sensor that changes the direction of sampling and reading after each frame. In an embodiment, system 2218 consists of arrays and groups of sensor readout directions are varied across a wide variety of sensors. In embodiment timing skew between sensors in systems 2200 produces more diversity in row and pixel sampling.

FIG. 23 illustrates an embodiment of coded localization systems forming images using overlapping FOV 2×2 coded localization systems as depicted in FIG. 6. Codes enhance the localization and can also enable image formation in shorter systems. In one embodiment the locations of localization codes can vary from to near the lens to the sensor plane. In another embodiment the codes can include both amplitude and phase. In another embodiment the codes can also be composed of random or pseudo random functions. In one embodiment multiple measurements of a remote object are made simultaneously in at least one domain of temporal, spectral, spatial and polarization. In another embodiment multiple measurements of a remote object are made simultaneously in at least two domains of temporal, spectral, spatial and polarization. In another embodiment measurements are made in the visible wavelengths. In another embodiment measurements are made in the IR wavelengths.

A particularly useful code for a 2×2 implementation is a quadrature code composed of biased sinusoids. This type of code can maximize the Fisher Information of a general scene.

In one embodiment quadrature mask or coding functions $C_i(x,y)$ placed at or near the image plane and illustrated as 2304 and 2306 are given by:

$$C1(x,y) = \tfrac{1}{2}\cos(w\,x+phi) + \tfrac{1}{2}$$

$$C2(x,y) = \tfrac{1}{2}\sin(w\,x+phi) + \tfrac{1}{2}$$

$$C3(x,y) = \tfrac{1}{2}\cos(w\,y+phi) + \tfrac{1}{2}$$

$$C4(x,y) = \tfrac{1}{2}\sin(w\,y+phi) + \tfrac{1}{2}$$

where the variable w is chosen to be equal to $2\pi/dx$ with dx being the side length of a pixel. In this manner the four codes are a single period of a biased sinusoid with 4 varying phases. The absolute phase of the codes phi needs to be known for each code. The sets of sinusoids above in the x and y direction do not have $2\pi$ symmetry but can still be useful for reduced height imaging and detection. One embodiment of a code that has 2 values per pixel is given by:

$$C1 = \begin{bmatrix} 0.7931 & 0.2049 \\ 0.7931 & 0.2049 \end{bmatrix} C2 = \begin{bmatrix} 0.3772 & 0.6208 \\ 0.3772 & 0.6208 \end{bmatrix}$$

The other two codes are given by C3=C1' and C4=C2', where ( )' denotes matrix transpose. The pattern on the sensor is symbolically shown as arrangement 2308 in FIG. 23. In practice, the codes are arranged over all or nearly all pixels assigned to a particular optical channel. The set of codes can be written as a basis set representing the system or:

$$C_x = \begin{bmatrix} 0.7931 & 0.3772 & 0.7931 & 0.3772 \\ 0.7931 & 0.3772 & 0.2049 & 0.6208 \\ 0.2049 & 0.6208 & 0.7931 & 0.3772 \\ 0.2049 & 0.6208 & 0.2049 & 0.6208 \end{bmatrix}$$

The set of sampled measurements $M_s$, related to all four channels with the corresponding object points, can then be written as $M_s = Cx[i_{1,1}\ i_{2,1}\ i_{1,2}\ i_{2,2}]$ In another embodiment the information desired are the original sub-pixel image values, or the data Is, for all values of the imaged scene. Notice that $I_s$ has twice the resolution of the actual physical pixels. Or, the desired data is sub-pixel imagery relative to the sampled 2×2 multi-aperture imagery. In an embodiment a full resolution image is produced based on the coded multi-aperture image samples through a linear operation of the sampled data $M_s$. or $I_s\_$estimate=pinv($C_x$') $M_s$, where pinv( ) is the pseudo inverse of $C_x$.

In an embodiment of the choice of the codes that make up Cx the inverse can be well conditioned. In another embodiment a quadrature code containing biased sinusoids is an example of a well-conditioned Cx. If the mean values of the uncoded pixel samples are available, either through a priori information, through a parallel measurement, or through an estimate based on the coded data, this mean value can be subtracted from the measured data $M_s$. This is equivalent to using a code that has no bias. The columns of Cx then become orthogonal and its inverse is ideally conditioned giving the best performance in the lowest light situations. In an embodiment the codes for reduced height systems have $2\pi$ symmetry. In an embodiment an estimate of bias can be formed by the sum of the measurements $M_s$.

In another embodiment the codes in arrangement 2308 are wavelength specific. Arrangement 2308 can select wavelengths in one embodiment, and be sensitive to a selection of wavelengths in another embodiment. In an embodiment the smaller images 2320 are at least one of a selection of visible wavelengths, near-IR, mid-wave IR, and long-wave IR wavelengths. In an embodiment the smaller images 2320 are at least two of a selection of visible wavelengths, near-IR, mid-wave IR, and long-wave IR wavelengths.

FIG. 23 also illustrates a simulated example of using the above method and apparatus to achieve ½ the size and weight and effectively constant image quality. An original resolution, or single aperture, image 2310 is simulated to be imaged through a biased quadrature 2×2 coded localization system with sampled data 2320. Sampled data 2320 represent four channels 2321, 2322, 2323, and 2324 imaged through each of the codes C1, C2, C3, and C4 respectively. The same codes are used on each pixel of the measurements in a particular channel. The measurements 2321, 2322, 2323, and 2324 are then all different in a unique manner determined by the codes. A single channel image 2330 shows more spatial detail. In an embodiment, combining the 2×2 measured data using the pseudo-inverse, the reconstructed image 2340 is produced from $I_s\_$ estimate. This reconstructed image has essentially the same resolution as the original single aperture image 2310 but with 2×2 coded imaging channels that are about ½ the size and weight of the single aperture system. In an embodiment, the complementary channels are chosen in order to reduce the length of the overall optical system. In another embodiment, coded localization systems provide complimentary measurements that are combined in digital processing to form a final image with resolution corresponding to the total number of measurements.

Figure 24:
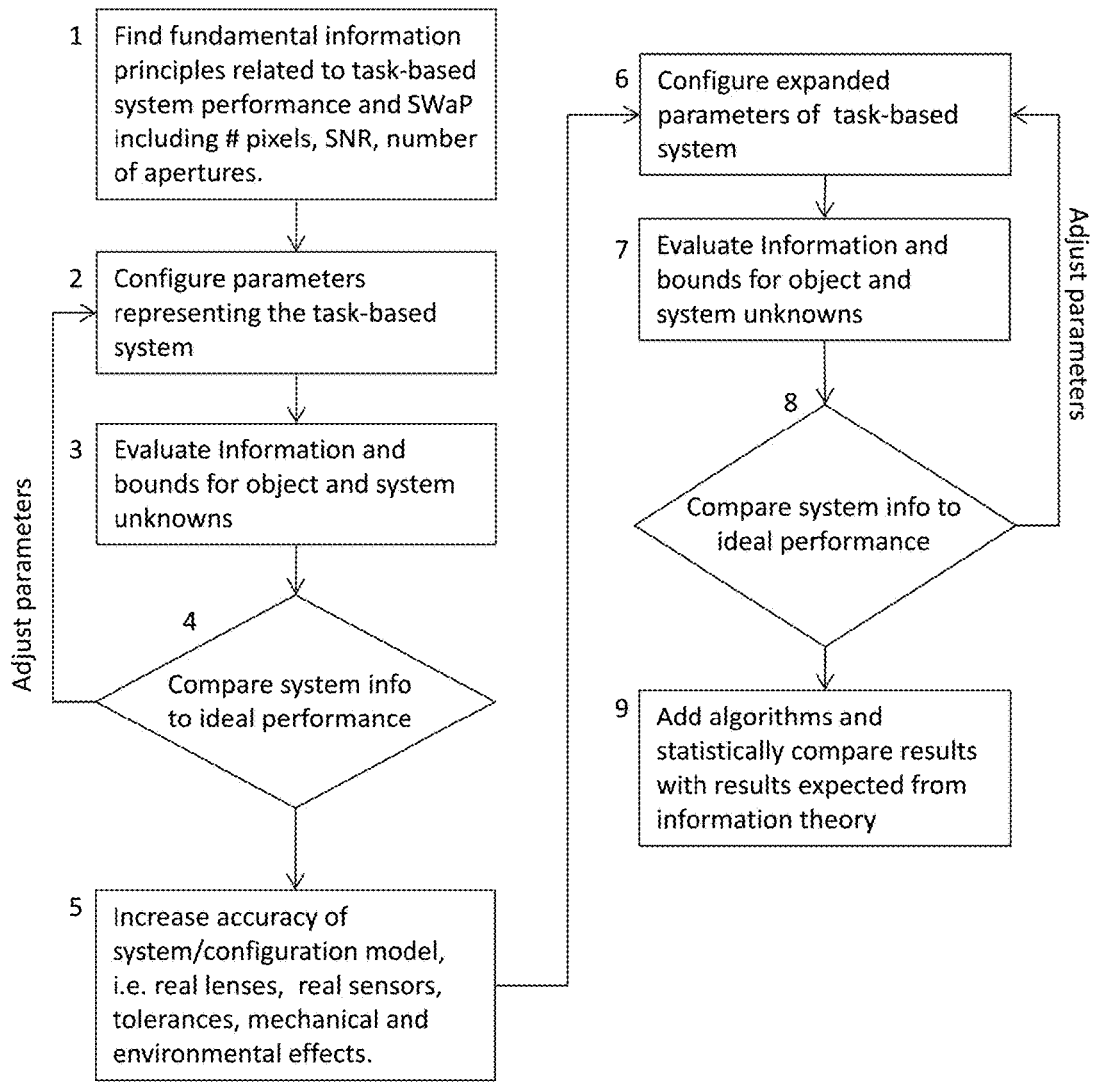
FIG. 24 is an embodiment of a design method for generalized coded localization systems.

FIG. 24 is an embodiment of a design method for generalized coded localization systems. Information theory can ideally separate systems from algorithms and produce optimized designs in terms of quantifiable tasks for specific systems. A flowchart of such a design method is described in FIG. 24. One particular advantage of this type of method is that truly global optimization can be performed over a system space often too complicated for even an expert to comprehend.

In one embodiment the method starts with a basic understanding of system tradeoffs at a fundamental information level that is relevant to reducing size, weight, and power while maximizing system performance of the particular system. Information theory teaches that ideal estimator accuracy (or standard deviation) is directly correlated with signal-to-noise level. Increasing the SNR (though more signal, less noise, etc.) directly increases the ideal estimator accuracy and decreases the ideal estimator standard deviation. Increasing estimator accuracy is the same as increase the information capacity of the system. Pixels and SNR can be traded, in an information sense, where a general system with N pixels and an SNR of S can have as much information about a distant object as a general system with N/2 pixels and 2*S SNR. In one embodiment the number of apertures is related to the SNR as well as the system size and weight.

In one embodiment step 2 involves producing a software model of the general parameters of the system, the general unknowns of the system (such as tolerances, temperature, etc.) and the parameters and unknowns of the object scene (such as ideal target representation, target "clutter", etc.). The parameters are considered deterministic and control the particular state of the system. The unknowns are either quantities to be estimated (like the number and location of specific targets) or quantities that can, in general, affect the estimation of targets. In one embodiment the system model produces a noise-free system estimate of measured parameters given the set of parameters and unknowns.

In step 3 one embodiment is for a particular set of parameters, and information theory such as Fisher Information and the Cramer-Rao Bound, predict the performance of the ideal unbiased estimator of system unknowns in the presence of the other unknowns. The system parameters are directly related to the actual information capacity of the system relative to the task-specific targets. A general goal is to find the ideal parameter set that maximizes the information through comparison and adjustment as in step 4.

In one embodiment, at least one goal that this information-based design method can offer is the ability to tailor the particular system to the particular modeled object scene. For example, it is well known that when the scene has numerous unknowns (or sometimes called clutter) these unknowns can negatively influence the estimation of the particular unknowns of interest. To minimize this effect, the information-based approach designs the system such that the system is purposely in the intersection of the null space of the clutter and the signal space of the particular desired unknowns. A simple example of this is two closely spaced targets. The presence of the second target can negatively influence the estimation of the first target, especially if they differ widely in radiated or reflected energy. In one embodiment the optimized information-based approach will attempt to orthogonalize the system, relative to the available system degrees of freedom, such that the cross-coupling of the two targets is minimized.

Steps 5-8 in FIG. 24 expand the solution by adding more parameters. By initially starting with a small parameter set and system complexity model in steps 1-4, along with an understanding of the basic principles of information theory of the particular system, the global optimum can be approached and followed as more and more complexity in the system model is added in steps 5-8.

When the design is suitably mature the designer can insert particular algorithms into the system in step 9. Statistical simulation of the algorithms and system can be compared to the performance expected from the information-based design efforts. In practice it may often be difficult to reach the information-based performance with an actual system with real algorithms, but a comparison of the statistical performance and the information-based performance can be used as a guide to judge the relative level of system performance compared to the ideal.

FIG. 25 is an embodiment of an optimized two pixel system using the method of FIG. 24. Graph 2510 with 2520 is an example of the starting point of one example of an information-based design approach to localization coding systems. In graph 2510 right channel 2512 and left channel 2514 will be optimized for angle detection. For this example the noise is additive uncorrelated Gaussian noise with variance equal to 1. The assumed system parameters model two single pixel channels with parallel optical axes and known baselines and fields of view. The optical system is designed such that the intensity output by the single pixel channel is defined by a polynomial, where the initial polynomial has two coefficients ($0^{th}$ and $1^{st}$ order) and produces a linear response vs. field angle. The initial channel responses are mirror images of each other as seen by graph 2510.

The unknown values are assumed to be the system gain G and the target angle. The Cramer-Rao Bound for the starting system as a function of target angle is shown in graph 2520. The response 2522 is biased or varies as a function of field angle. The collection of graphs 2500 and 2550 are each considered "systems" in that they embody the overall design features including system gain, bias, and spatial variation of the polynomial codes that cooperate to form the desired estimator variance by coding the target information in a cooperative fashion, as a cohesive system.

After optimization, with the CRB on target angle as a metric, the system of 2550 with graph 2530 results. In graph 2530 right channel 2532 and left channel 2534 are optimized for angle detection. The angular responses for each channel are no longer linear resulting in a lower CRB. The value for the CRB (normalized by the unknown gain G) is about 0.6 (line 2562 in graph 2560) and is also uniform across field angle and so unbiased. This value is higher than that expected from information theory principles of two channel coherent systems. Two channel coherent systems should have a CRB in standard deviation that is ½ that of a single channel system. Or the global optimum for the CRB of the optimal solution should be 0.5*G. At this point the designer can accept non-optimum performance and continue adding system complexity, such as changing the type of parameters of the measurement from a polynomial form to a sinusoidal, or reconfigure the system parameters so that the estimated CRB can reach the ideal 2 channel performance level.

While FIG. 25 was initially selected to be implemented as a two aperture, two channel system, where each channel had a single pixel, it could also be considered as a specialized single channel system. In an embodiment a single aperture system where adjacent pixels have the intensity vs. field angle response of FIG. 25 would be a space-variant system. Space variant systems are in general extremely difficult to design due to the lack of tools. But, by considering the system as a series of separate channels, where each channel influences only a single pixel, a relatively simple method of designing a space-variant system can be made through the disclosed information-based design methods and resulting apparatus. In one apparatus that embodies the invention specialized space-variant systems could be constructed of at least one of 3D index, absorption, refraction, and diffraction such that the angular responses of FIG. 25 are realized over adjacent pixels. A particular benefit of this system is that the space-variant system could enable a simple mounting directly onto a sensor such that fabrication and assembly is simplified.

Localization codes can be fairly complicated depending on the particular system goals. In many systems the task for finding matching object points from different imaging channels, or the correspondence mapping problem, can be difficult. The codes can be tailored to both improve the ability to quickly and reliably find image correspondence as well as give high resolution estimation.

Figure 26:
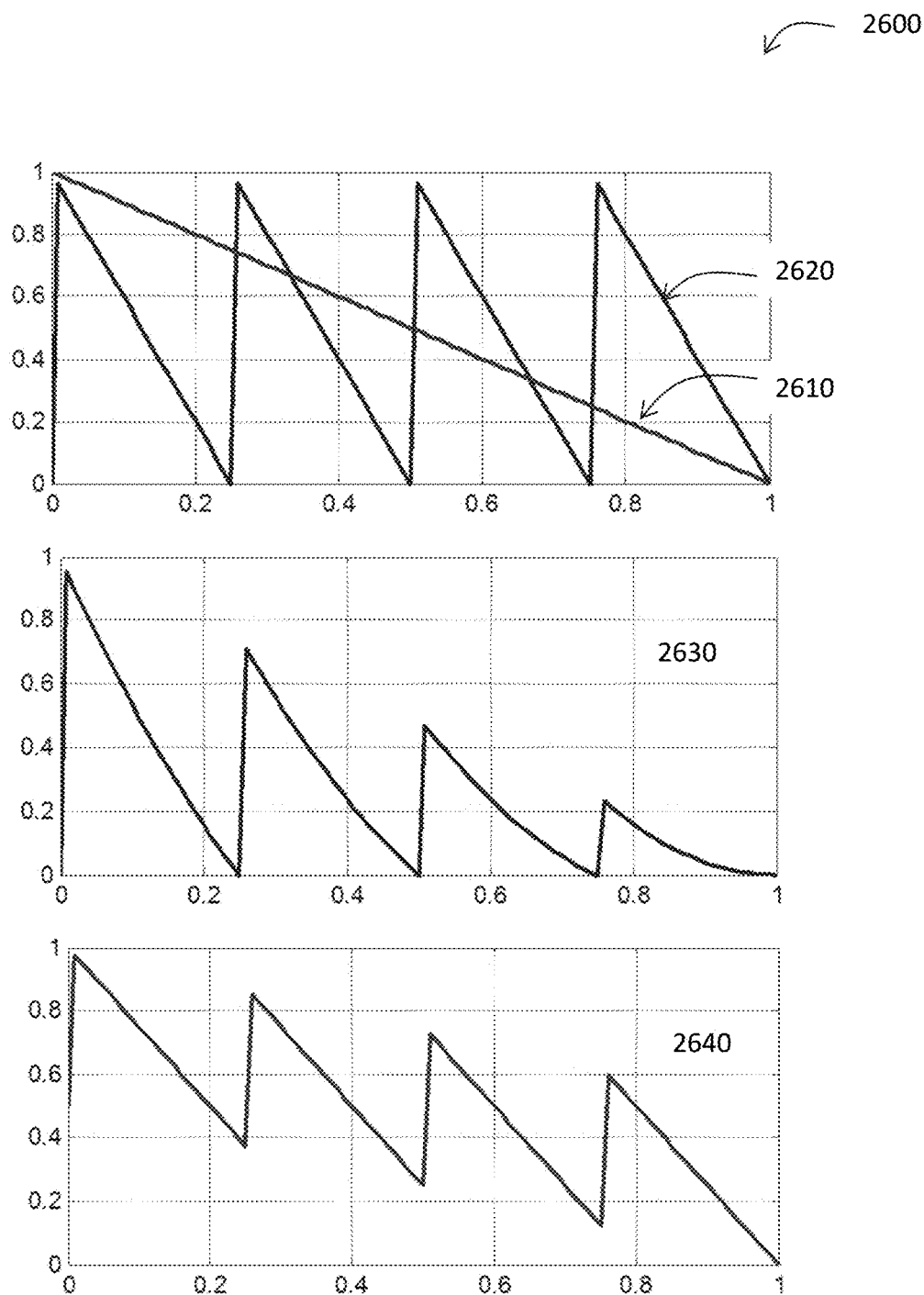
FIG. 26 is an embodiment of the invention and describes the construction of a code that enables both narrow FOV and wide FOV localization.

FIG. 26 is an embodiment of the invention and describes the construction of a code that enables both narrow FOV and wide FOV localization. The base code 2610 is the simple linear code of graph 2510 in FIG. 25. This same construction is valid for any type of code. In constructions 2600, line 2610 shows a wide FOV linear code across the normalized field angle (horizontal axis) in terms of intensity (the vertical axis). A similar version of the code but in a modulo format forms the narrow FOV code in line 2620 in FIG. 26. The narrow FOV code is helpful to aid in discrimination or corresponding image points within small neighborhoods between imaging channels. The narrow field of view code could be over 1 pixel, over 4×4 pixels, 10×10 pixels, etc. The wide FOV code 2620 is used along with the narrow FOV code 2610 in order to remove ambiguity over a wide FOV and in order to improve multi-resolution processing.

In one embodiment graph 2630 describes the combination of a narrow and wide FOV codes through a multiplicative operation. In another embodiment graph 2640 describes the narrow and wide FOV code combined through addition and scaling. Scaling is used to ensure that the intensity values are within the range of 0 to 1.

Figure 27:
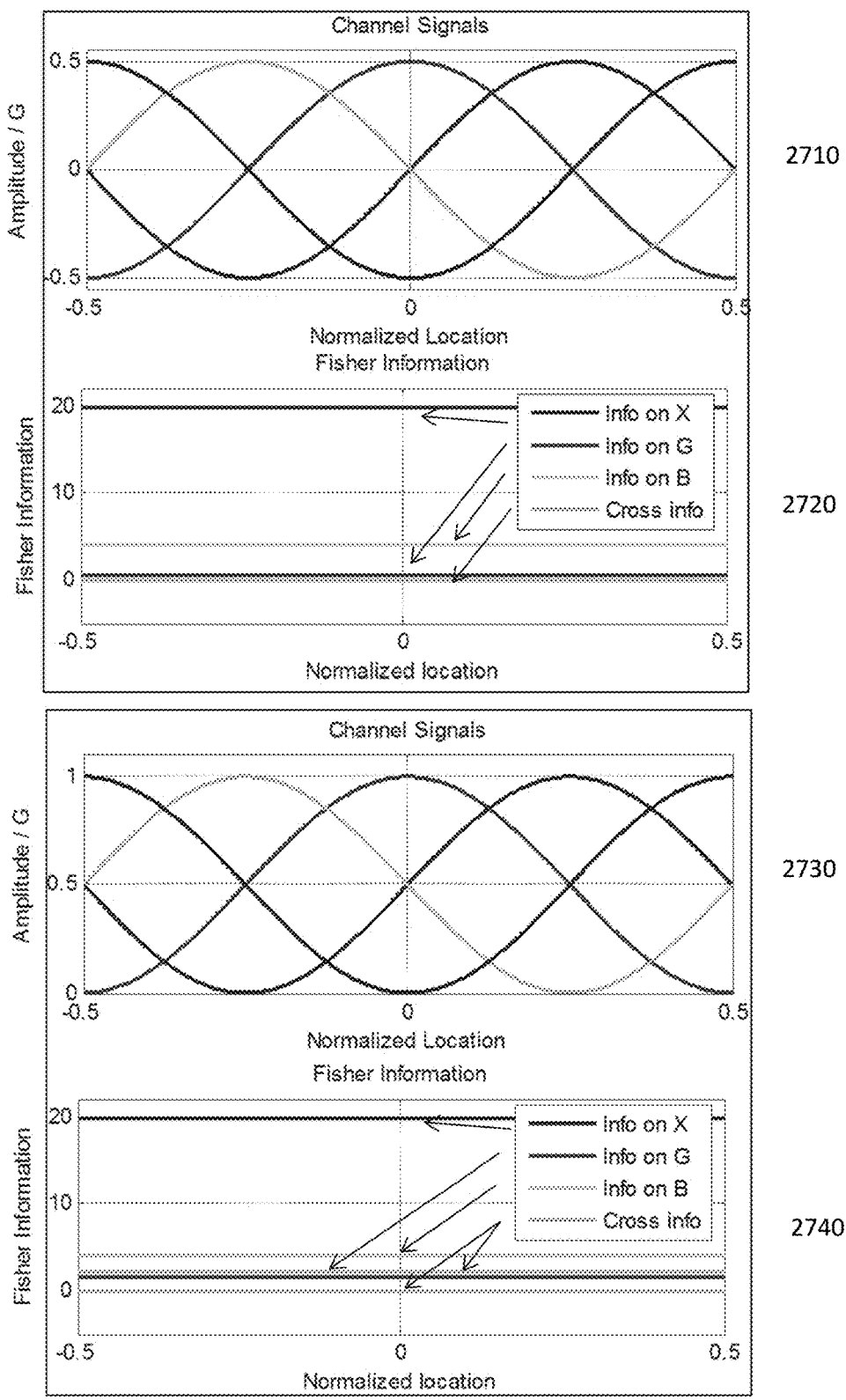
FIG. 27 is one embodiment of a 4 channel linear combination system that increases the Fisher Information on object location.

FIG. 27 is one embodiment of a 4 channel coded system that increases the Fisher Information on object location. Graph 2710 is a system of four coded channels formed from the four non-negative measurement channels of graph 2730. This is similar to the system in FIG. 10 but with 3 channels instead of 4.

From graph 2730 the channels are non-negative due to the addition of bias and are phased by 90 degrees to achieve $2\pi$ symmetry. This combination of signals retains the signal subspace and nuisance subspace orthogonality as shown in graph 2740 compared to the ideal unbiased system of 2720. The 4 coded channels have the same Fisher Information or CRB on object location.

Localization codes can also be used to estimate edge angle and position in a single pixel of the 3D angular estimation system. The code for each imaging channel can be a function of the object edge position and orientation (or angle), not just area of the pixel covered. If the measured pixel differences can be large compared to the noise, then practical single pixel multi-channel edge estimation can be achieved.

Figure 28:
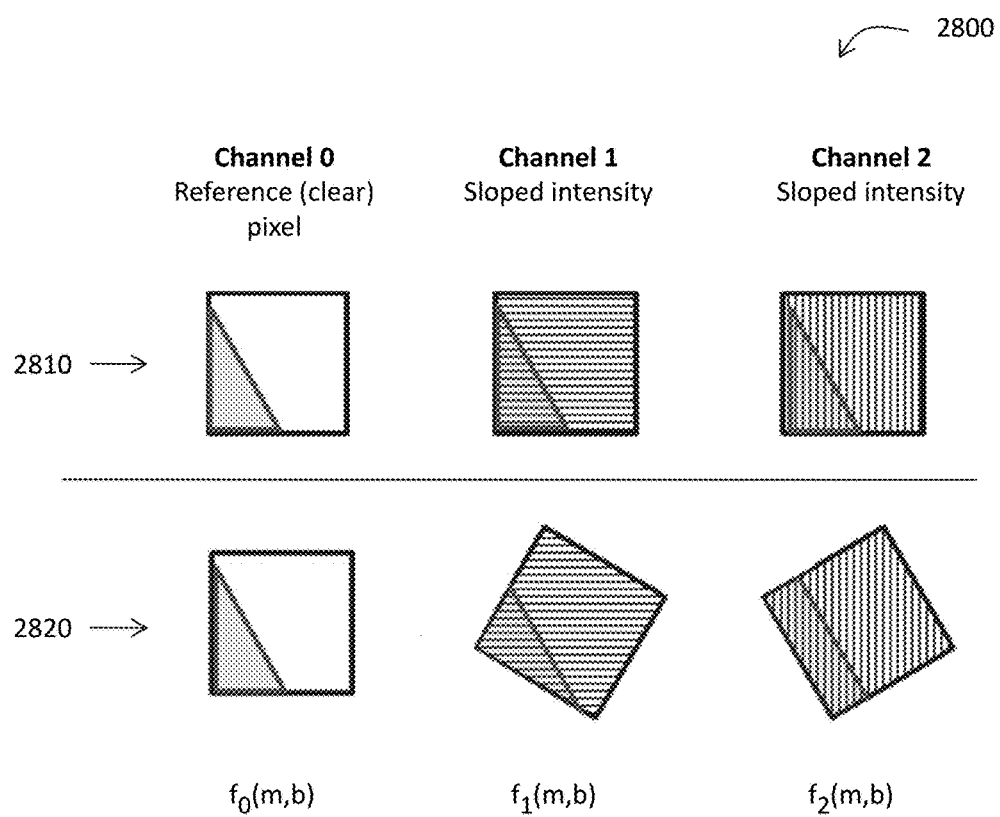
FIG. 28 is an embodiment of the invention that describes edge direction estimation.

FIG. 28 is an embodiment of the invention that describes edge direction estimation. Due to the orientation and localization code on each channel's pixels, the measured output of a pixel can be a function of both the edge angle and area. In system 2800 the upper row of pixels 2810 is in a square alignment and the lower row of pixels 2820 is in a non-square alignment. In one embodiment the measured pixel output is a function of the area of the pixel covered by the edge and the angle of the edge to the pixel. Or, pixel output can be described by some P(area, theta) for each imaging channel. This quantity can be estimated or measured from each channel. In another embodiment the three estimates of pixel covered and edge angle to the pixel can be used to solve directly for an estimate of edge angle and position. Or, with the three pixel values and knowledge of the functions P(area, theta) for each imaging channel, estimate the orientation of the edge. In another embodiment this information can also be used to increase the estimate precision using image regions.

In one embodiment the implementation of localization codes can be through classical optics design or phase/amplitude masks. Localization codes can be implemented through specialized "relative illumination" profiles. These can be enabled through optics design and/or phase/amplitude masks between the optics and sensor. As the sensor pixel response is always a function of chief ray angle, specialized optical designs that control the angle of light into a pixel can code received intensity vs. input angle and pixel angular response.

In another embodiment localization codes can be enabled through optics design. Sinusoidal intensity falloff with field angle can be designed via the projection of the aperture with field, the angle of the focused spot to the image plane with field angle and the distance to the object and image planes with field angle. Angular intensity falloff can also be designed as a function of the chief ray angle (CRA) and sensor mismatch across the field. This type of design can achieve a wide range of cosinusoidal relative illumination profiles. Design of these profiles along with the signal processing and system effects can able a compromise between ease of implementation, SNR and estimation accuracy.

In another embodiment localization codes can be enabled through phase/amplitude masks placed between the optics and the sensor. Masks positioned between optics and sensor can have wide flexibility. Non-classical responses are possible with simple optical systems. Masks positioned on or near the sensor pixels can be designed so that sub-pixel location (for points) and sub-pixel angle and location (for edges) can be measured in the presence of noise. Lithographic masks that are jointly optimized with the optics and sensor CRA can offer the largest flexibility and ultra-precision lithographic fabrication precision and low cost in volume quantities.

Figure 29:
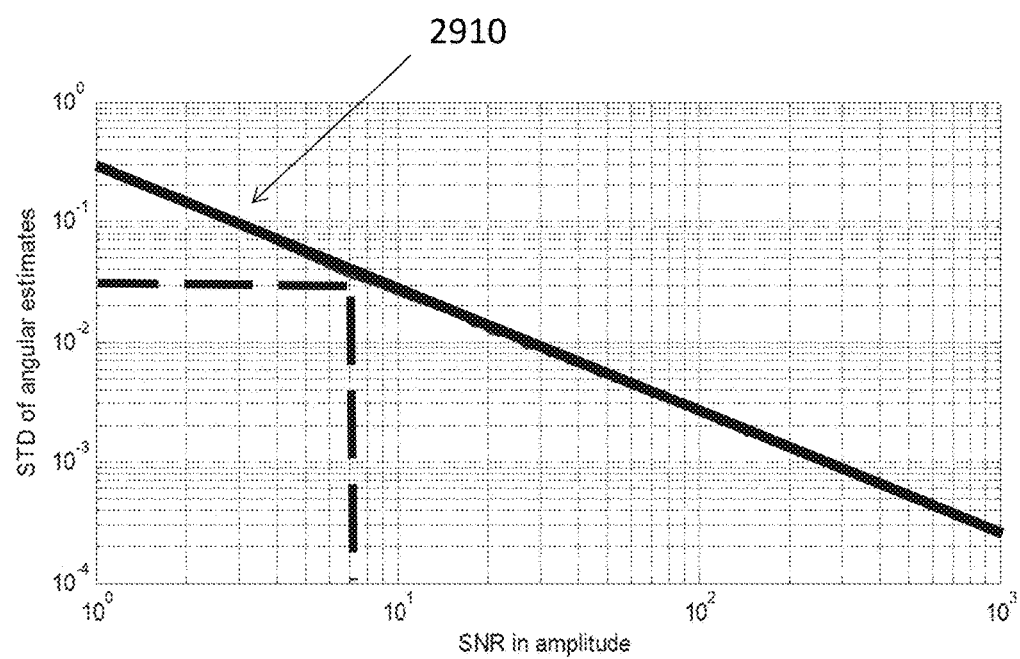
FIG. 29 is an embodiment of the invention for optimizing the design space for weight and number of pixels.

FIG. 29 is an embodiment of the invention for optimizing the design space for weight and number of pixels. This type of design is particular relevant to localization systems where SNR can be traded for the number of pixels, which is size, weight, power and cost. Curve 2910 describes the standard deviation of a 4 channel coded design with $2\pi$ symmetry as a function of measured SNR and normalized angular FOV. An angular FOV of 1.0 corresponds to the instantaneous FOV of a single pixel. When the standard deviation of angular estimates is less than 0.5 then sub-pixel angular precision is possible. In one embodiment, a system based on these designs uses anamorphic optics and a 1D linear sensor and 4 coded channels form a system with $2\pi$ symmetry, like the system of 2730 from FIG. 27. Consider the point on curve 2910 that intersects and SNR of 7. This results in an ideal standard deviation of angular resolution of 0.03 pixels.

The measured SNR is a function of the illumination and range of the object or target, the area of the collection optics, the non-ideal effects of the optics and the sensitivity of the sensor.

In a classical system the pixel size is often designed to approximately match the resolution of the optics, given by (lambda/D). If the system parameters are sufficient to yield an SNR of approximately 7 then the pixel size (or number of pixels in the same FOV, or optical magnification) can be adjusted by a factor of 1/0.03 or 33×. In one dimension 33 times less pixels could be required. In a 2D system with similar relevant parameters the number of pixels could be reduced by 33*33 or approximately 1000×.

For systems with sufficient SNR the pixel size and number of pixels can be held constant but the size of the optics reduced thereby lowering the SNR to the level required for sub-pixel localization precision.

Figure 30:
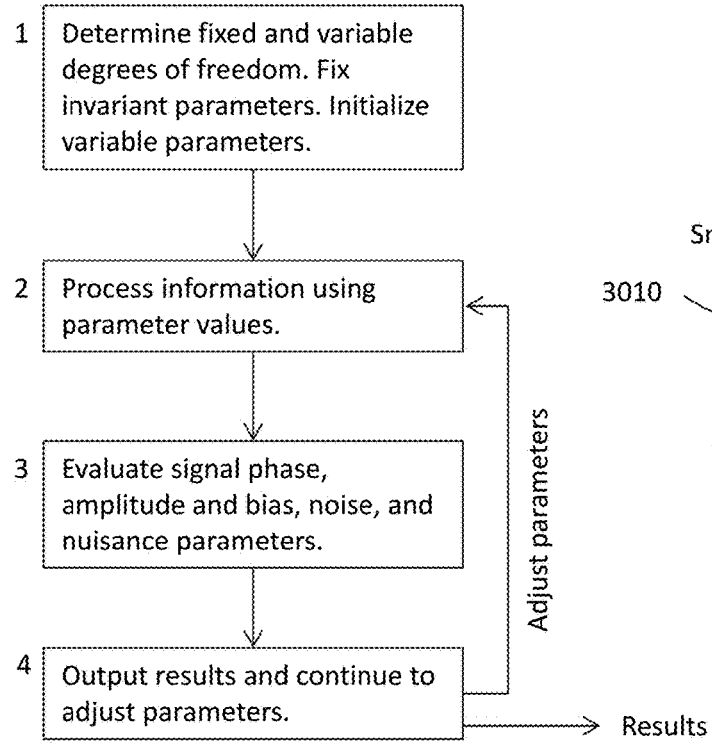
FIG. 30 is an embodiment of a design method and trade space.
Figure 30:
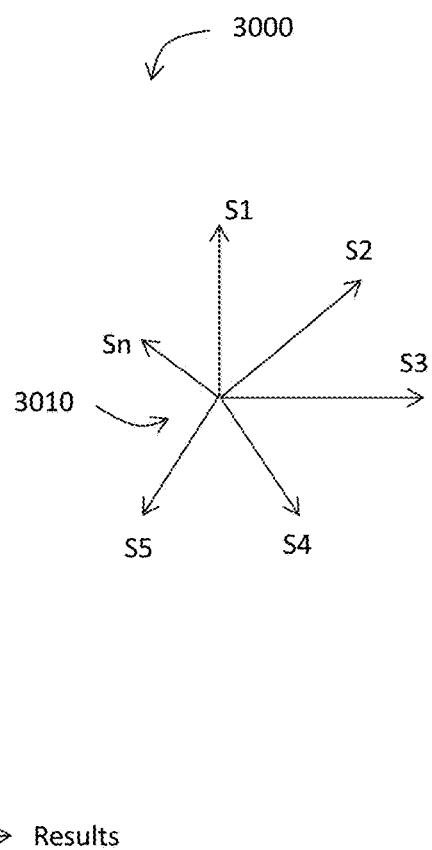

FIG. 30 is an embodiment of a design method and trade space 3000. There are a large number of subspaces or degrees of freedom 3010 that can be optimized for a given task. In an embodiment subspaces or degrees of freedom S1, S2, to Sn are for example at least two of wavelength, time, spatial extent, field of view, and exposure and sample count. The signal characteristics that dictate the desired tradeoff include at least one of estimated or known amplitude and bias. The steps in determining the tradeoffs in tradespace 3010 are also shown in 3000 as a loop. Step 1 is to determine the fixed and variable degrees of freedom. In dynamic situations in one embodiment where the sensor or field is moving time between samples may be fixed and at least one of exposure and spatial extent is a variable parameter. Given the set of parameters and parameter values the information captured by the sensing system is evaluated in step 2. In one embodiment processing may include the steps of averaging and Fourier transform processing. The output of the processing is evaluated in step 3 for signal phase, amplitude, bias, noise, and nuisance parameters. Given the state of the parameter set the results are reported by the system in step 4 and the results are also used to evaluate the current parameter states. Variable parameters are adjusted as necessary. In one embodiment the spatial extent of the processing is adjusted to reduce the effect of nuisance parameters. In another embodiment the nuisance parameters consist of at least one of clouds, trees, foliage, pollution, and dust. In another embodiment the exposure is adjusted to achieve a nearly equal bias and amplitude estimate.

Figure 31:
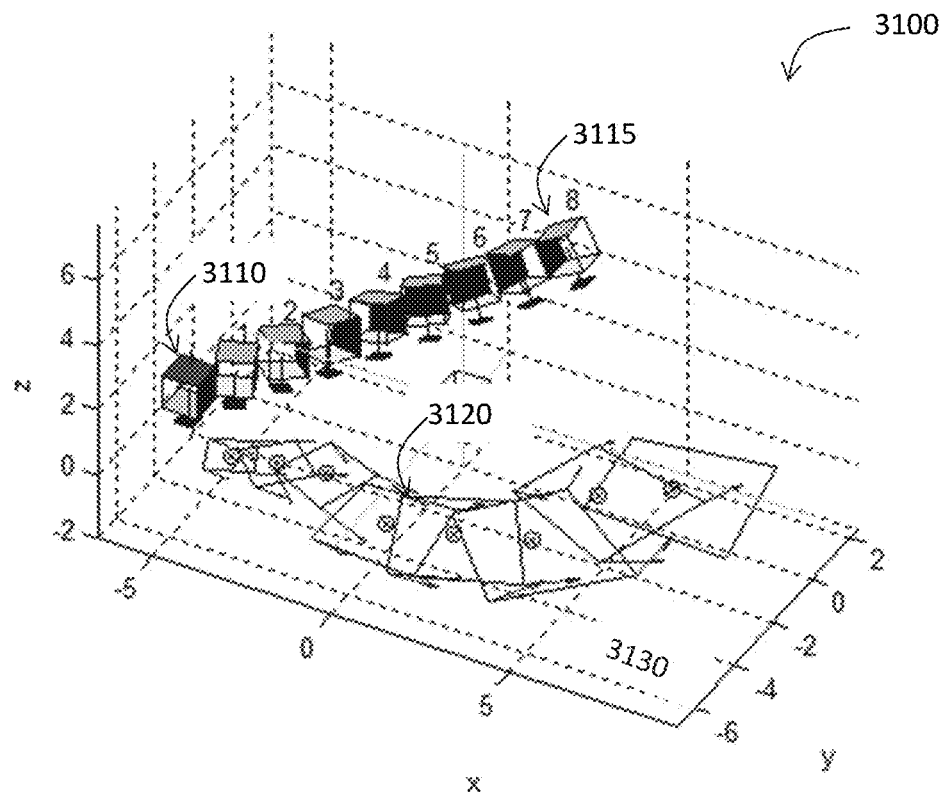
FIG. 31 is an embodiment of the invention disclosing a measurement application.
Figure 31:
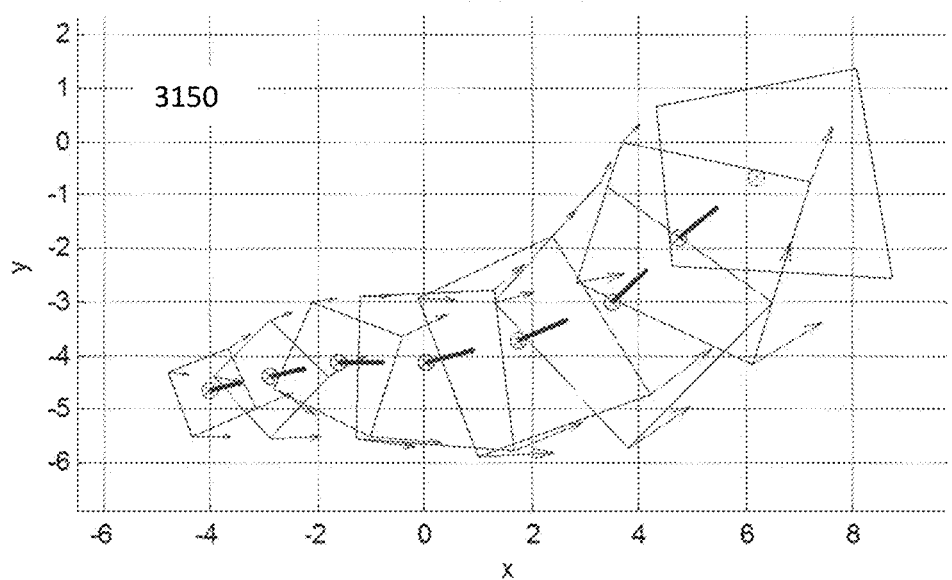

FIG. 31 is an embodiment of the invention disclosing a measurement application. In sequence 3100 a coded localization system that can perform at least motility and motion discrimination is at initial position 3110 and through a 3D translation and re-orientation of pitch, yaw, and roll sequence arrives at position 3115. In this embodiment the desired output of the system during the motion is a projection of fields of view 3120 on the x-y plane 3130 for a downward looking sampling system. Graph 3150 shows the projection results of these fields of view with rectification. In an embodiment the motility and motion discrimination system estimates at least one of a pitch, yaw, roll, x-translation, y-translation, and z-translation of itself while undergoing general motion. In an embodiment the motility and motion discrimination system estimates at least one of a pitch, yaw, roll, x-translation, y-translation, and z-translation while undergoing general motion attached to another object. In an embodiment the motility and motion discrimination system estimates at least one of a pitch, yaw, roll, x-translation, y-translation, and z-translation of an external object.

Figure 32:
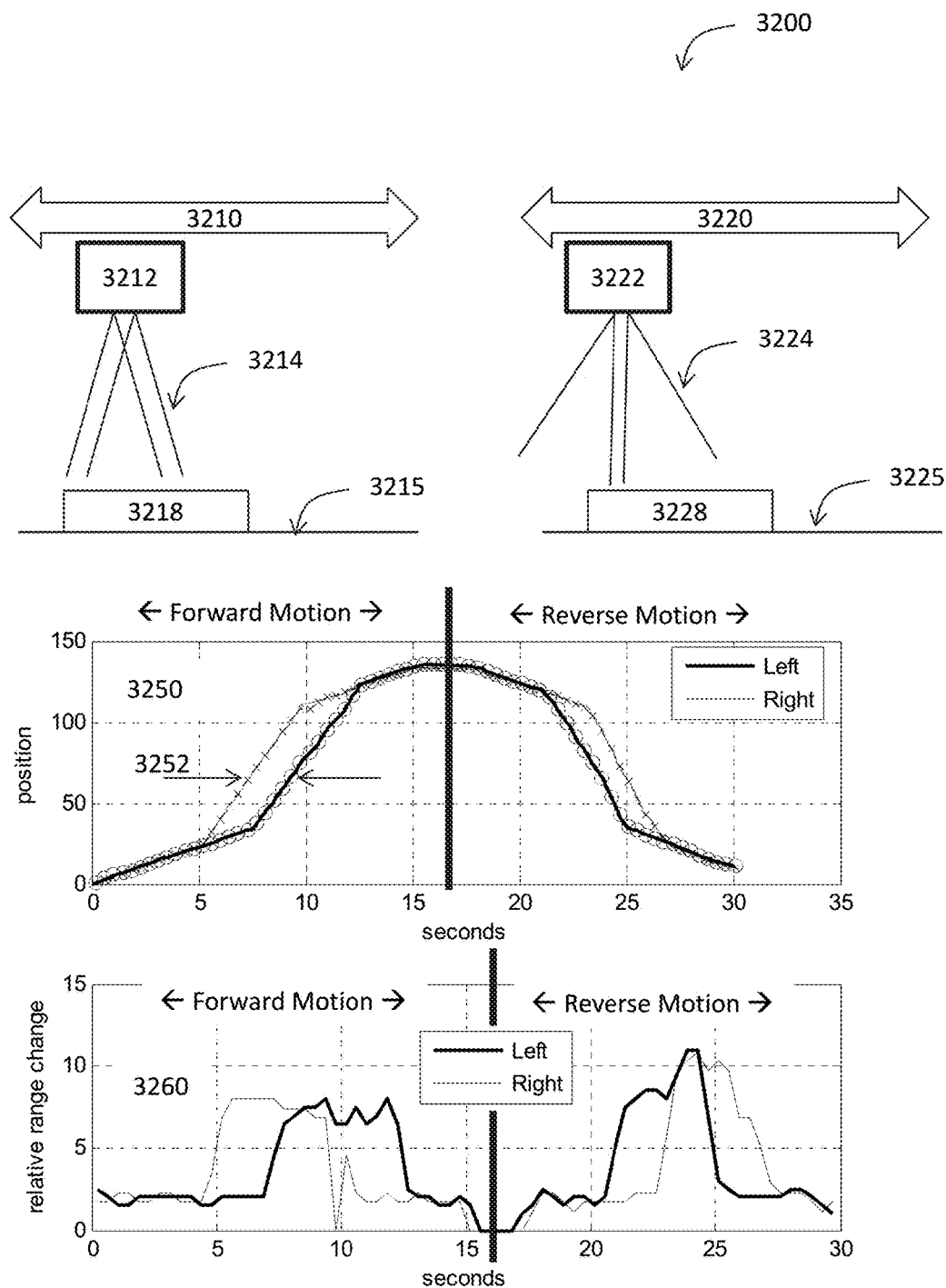
FIG. 32 is an embodiment of the invention disclosing a measurement application.

FIG. 32 is an embodiment of the invention disclosing a measurement application. In one embodiment coded localization system 3212 is a motility and motion discrimination system with partially overlapping fields of view 3214 and is translated 3210 in view of object 3218 and surface 3215. In another embodiment localization system 3222 is a motility and motion discrimination system with non-overlapping fields of view 3224 and is translated 3220 in view of object 3228 and surface 3225. In another embodiment the non-overlapping fields are tangent to each other. In another embodiment the translation is at least one of a forward and reverse direction across an object of interest. In an embodiment, localization systems 3212 and 3222 move with a velocity and sense an object that is fixed by comparing the change in relative motion in the object field. In FIG. 32 in graph 3250 if the surface were known to be of constant distance from the sensors 3212 and 3222 then it can be concluded that the two fields of view are moving at different velocities to form gap 3252 in the position measurements over time. In another embodiment the paired fields of view 3214 and 3224 are known to be rigidly related to each other and a difference in relative position 3252 is at least one of (a) the detection of, and (b) a measure of relative surface height and a measure of absolute surface height of objects 3218 and 3228 compared to surface 3215. In another embodiment object 3218 is profiled in at least on measure of height, width, depth, pitch, yaw, and roll. In graph 3260 the difference of the Left and Right fields of view 3214 are shown and indicate relative range change to the object 3218. It is shown that during forward motion the right sensor detects object 3218 first in time. While the slope of the right sensor rises the slope of the left sensor remains constant for a brief period of time. The sequence is reversed for the reverse motion as shown in the second time half of graph 3260.

Figure 33:
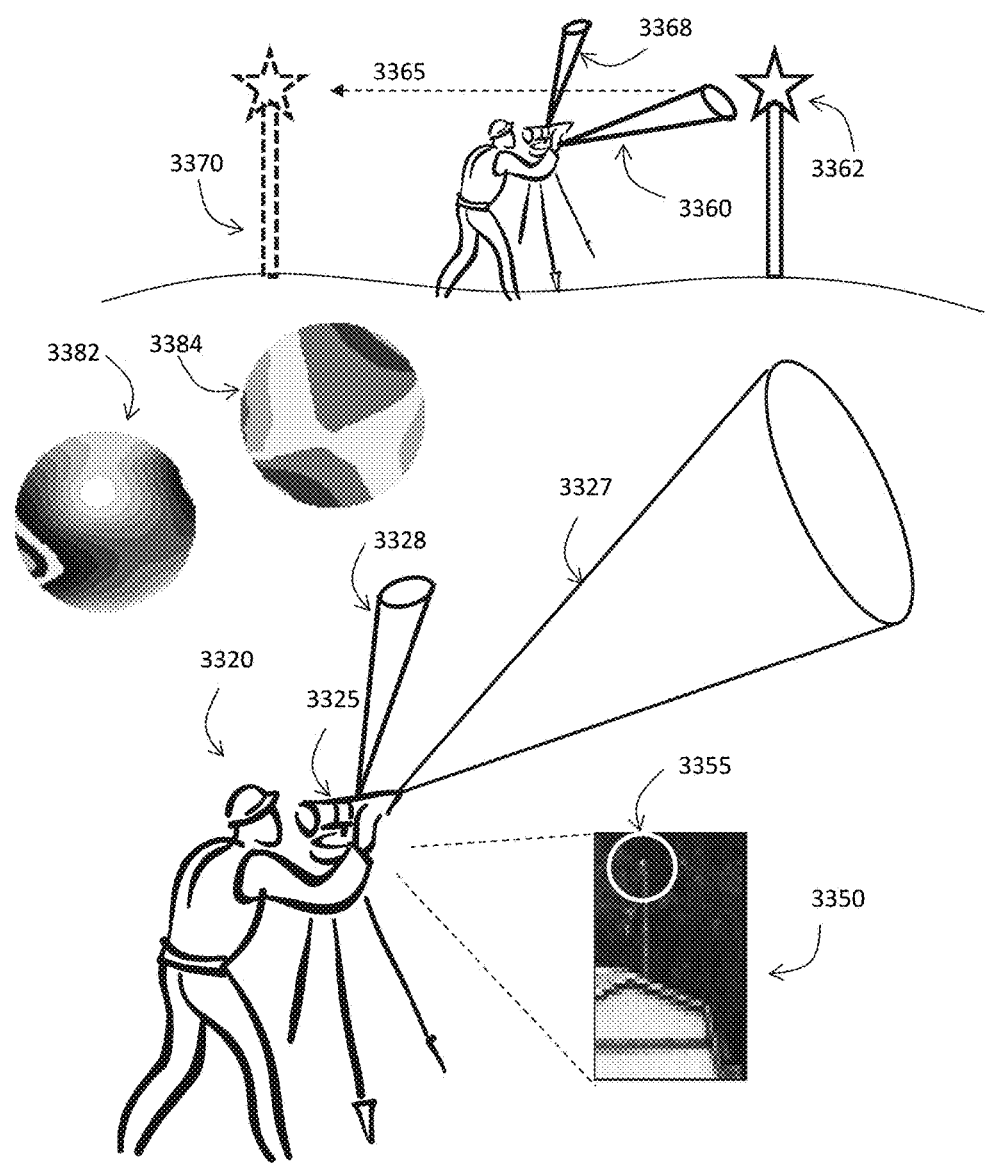
FIG. 33 is an embodiment of the invention disclosing a measurement application.

FIG. 33 is an embodiment of the invention disclosing a measurement application. Operator 3320 uses instrument 3325 equipped with coded localization systems. The coded localization systems form at least one of a reference field of view measurement 3328 and an object measurement field of view 3327. In one embodiment reference field of view measurement 3328 includes the magnitude 3582 and angle 3584 of the partial polarization of the sky. In an embodiment field of view 3327 captures 3D photo point information 3355. The codes operate as previously disclosed to enable sub-pixel measurements of object locations 3355 in the image 3350. In another embodiment the codes operate to form a reference image. In an embodiment, a method and apparatus are provided for performing long range photo point measurements, with high precision measured at the image plane compared to detector pixel spacing.

In a similar measurement activity coded systems form at least one of a reference field of view measurement 3368 and an object measurement field of view 3360. In one embodiment the coded systems localize the measurement system using field of view 3368. In another embodiment the coded systems localize the object of interest 3362. In another embodiment the information on 3362 location is used to localize another object reference point 3370 by transferring the coordinates through coordinate transform 3365. In an embodiment, a method and apparatus are provided to transfer at least one of location and orientation reference information from a known point to a new point.

Figure 34:
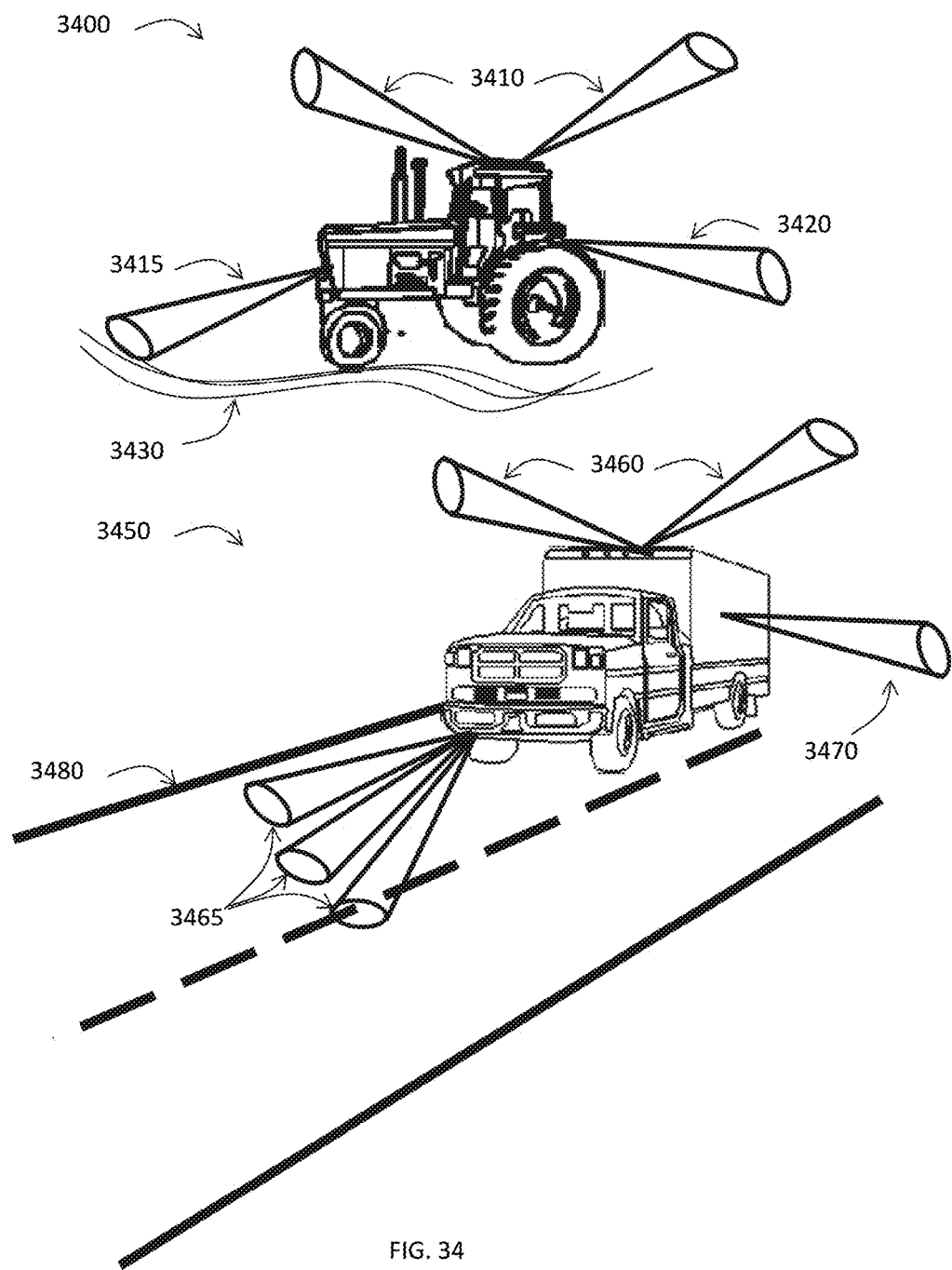
FIG. 34 is an embodiment of the invention disclosing measuring and control using coded localization systems.

FIG. 34 is an embodiment of the invention disclosing measuring and control using coded localization systems. In system 3400 coded localization systems form at least one of a reference field of view measurement 3410 and a surface measurement field of view 3415 and 3420. Field of view 3410 provides at least one of relative and absolute orientation and location information. Fields of view 3415 and 3420 may cooperate in one embodiment to provide preview and postview measurements of a grading operation on surface 3430. Orientation and localization information from FOV 3410 and surface information from FOV 3415 can be used in a feedback system to control or assist in control of the vehicle the systems are mounted on. System 3450 is also an embodiment of a vehicle mounted measurement system. In system 3450 coded localization systems form at least one of a reference field of view measurement 3460 and surface measurement fields of view 3465 for measuring surface 3480. Systems 3460 and 3465 in another embodiment provide localization information in the event of GPS interruption or degradation. In another embodiment system 3450 provides a coded localization system 3470 that detects and localizes at least one of a road sign, telephone pole, manhole, and overpass. In an embodiment, a method and apparatus are provided to for data collection and data reduction for highway information. In an embodiment, a method and apparatus are provided to for orientation and 3D location estimation for machine control.

Figure 35:
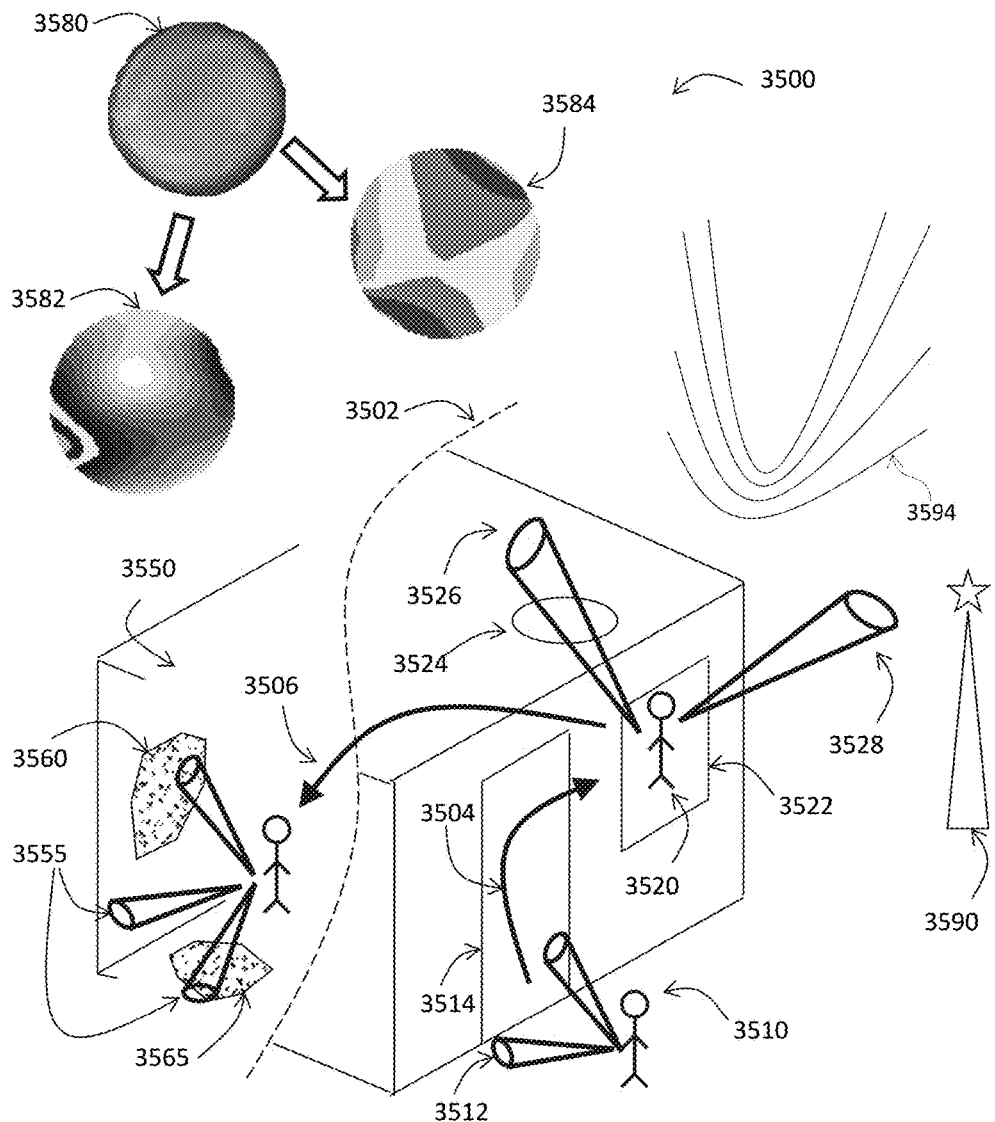
FIG. 35 is an embodiment of the invention disclosing measuring and recording using coded localization systems.

FIG. 35 is an embodiment of the invention disclosing measuring and recording using coded localization systems. Scenario 3500 depicts a survey of the interior and exterior of a structure. Dotted line 3502 depicts the split between interior and exterior tasks, while path 3504 is an entry into the structure and path 3506 is a traversal to a second location within the structure. In one embodiment operator 3510 employs coded localization system 3512 while entering doorway 3514. The coded localization system measures the translation and orientation of the operator relative to the surrounding environment providing a relative motion and orientation vector for mapping the operator movements. In another embodiment the coded localization system measures at least one of the dimensions of the doorway and the location of the doorway. In buildings under construction, the localization system can act as a recording mechanism for progress and accuracy of the structure and its features. In another embodiment operator 3510 moves along path 3504 to location 3520 within the structure and within view of window 3522 and roof opening 3524. In one embodiment coded localization system with FOV 3526 measures the roof opening dimensions and location, and FOV 3528 measures reference point 3590 and also sky and skyline structure 3594 to further localize roof opening 3524. In one embodiment sky structure may be the magnitude 3582 and angle 3584 of the partial polarization of the sky 3580. By measuring opening 3524 and its relationship and orientation to references external to the structure trajectory planning for connecting structures, pipelines, transmission line corridors and ventilation between distant structures can be achieved with high precision. In complex building structures where diverse portions of the structure must meet within millimeters over long distances such trajectory estimation and planning can be essential in modeling and controlling the building progress and precision.

In another embodiment operator 3510 moves again from location 3520 along path 3506 to a location strictly within the interior of the structure 3550 and without access to external references. In an embodiment the operator utilizes coded localization systems with fields of view 3555 to view details 3560 and 3565. Details 3560 and 3565 are for example objects and visual structure within the field of view including textiles and random structure in walls and wall covering, floors and floor covering, and shadows from lighting discontinuities and highlights from structured illumination. In an embodiment, operator 3510 is able to map in absolute coordinates at least one of the structure and objects within the structure without the aid of GPS. In an embodiment, a method and apparatus for performing at least one of distant object orientation and 3D location estimation for input to model building process.

Figure 36:
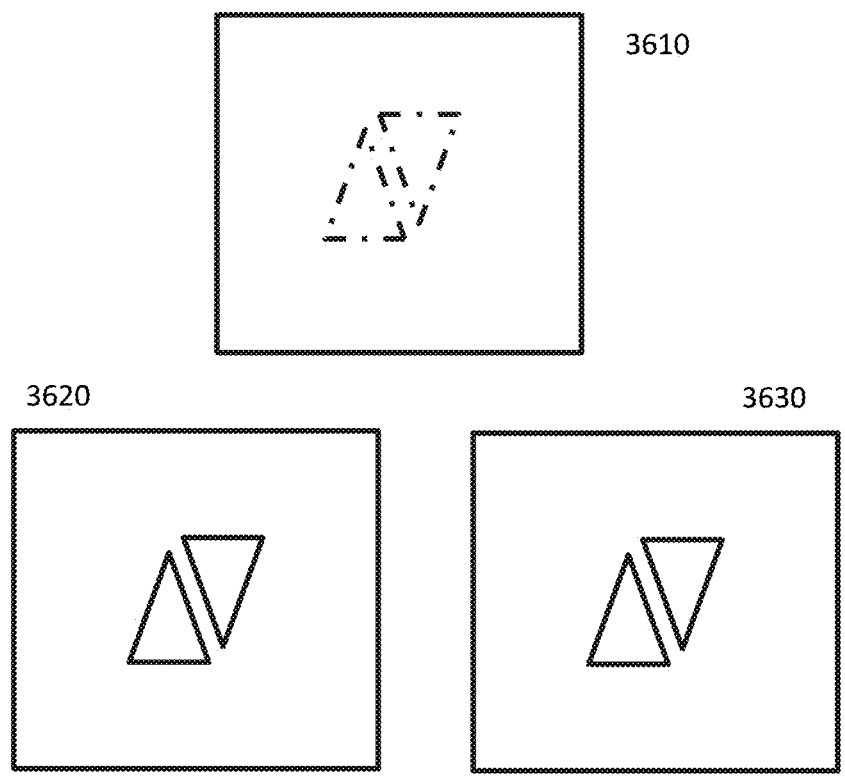
FIG. 36 shows the use of coded imaging channels to add information for human viewers.

In another embodiment FIG. 36 shows the use of coded imaging channels to add information for human viewers. In many systems image information for human viewers is increased by increasing contrast. As the intensity of the illumination or length of exposure in these systems decreases contrast unavoidably decreases, as shown in 3610. The lower the illumination level received from the object the lower the contrast and the harder for a human viewer to understand, detect or use the image. In one embodiment coded localization systems can be used to increase contrast for human viewers by fusing information in other domains that have contrast that is insensitive to illumination levels compared to classical imaging systems. In another embodiment coded polarization systems have an amplitude that is insensitive to illumination, as shown in graph 1700 of FIG. 17. Dramatically reducing exposure level does not decrease the amplitude of the partial polarization and results in lower shot noise component of the measured signal. The amplitude component of polarization signal related to 3610 is shown in 3620.

In another embodiment of adding information for human viewers the phase of polarization measurement vector has a contrast, where contrast for phase is defined as the range of $-\pi$ to $\pi$, that is insensitive to illumination as long as the amplitude of the partial polarization can be reliably estimated. The polarization phase of the signal related to 3610 is shown in 3630.

A great many objects have a natural signal or signature in the polarization domain. Generally smooth surfaces, man-made surfaces, skin, glass, and metal can have distinct polarization signatures that can enable low-cost polarization contrast. In an embodiment if the incident polarization is known or can be calculated then the polarization signal can also be used to estimate the 3D geometry of the object. In another embodiment the polarization signal can also be used just as a contrast-enhancing feature and fused with conventional imagery or a function of the polarization signal (such as an outline of the polarization signal spatial boundaries) can be fused with signals from other domains to aid human viewers. In another embodiment polarization signals can also be used for monitoring change detection and can also be used with computer processing for automatic detection, recognition, and estimation.

Figure 37:
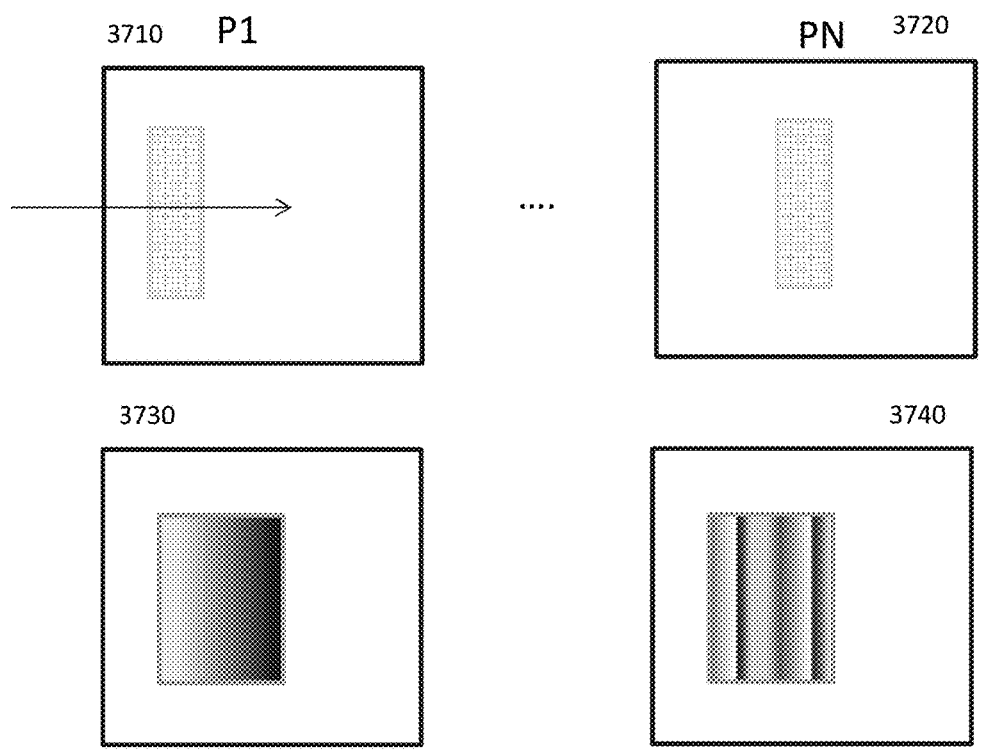
FIG. 37 shows the mixing of time, space, and polarization in order to further detection, recognition, or estimation of signals.

In an embodiment FIG. 37 shows the mixing of time, space and polarization in order to further detection, recognition or estimation of signals. Box 3710 shows an object relative to some reference and a polarization measurement P1. Box 3720 shows the same object has moved relative to the reference and another polarization measurement Pn is taken. In one embodiment, a sequence of polarization measurements can be taken, such as from FIG. 3, while the object is in motion and the polarization signature will contain a component due to spatial motion. Box 3730 depicts a scene with generally low contrast in a wavelength domain. By using polarization measurements contrast can be improved as in Box 3740 by using polarization magnitude and angle and also by fusing partial polarization vector estimates into the wavelength domain. In one embodiment the phase and amplitude of the polarization signature can be used in a low light situation to add contrast to detection or localization. In another embodiment when the polarization signature related to the stationary object is known then the motion of the object can be estimated by selecting the spatial points from each measurement image such that the known polarization stationary signature is formed. In one embodiment, object motion can be compensated or estimated through knowledge of the stationary polarization signature.

Figure 38:
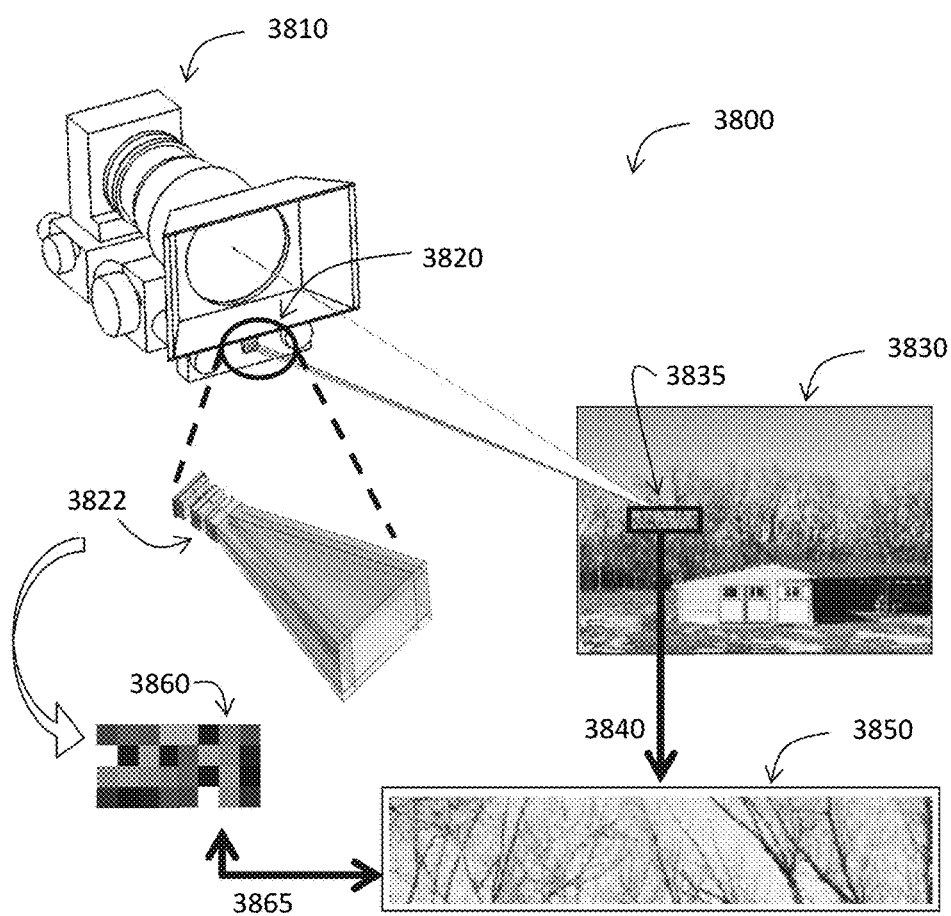
FIG. 38 depicts a high resolution imaging system coupled to a coded localization system.

FIG. 38 shows another embodiment of the invention in system 3800 that depicts a high resolution imaging system 3810 coupled to a coded localization system 3820. In one embodiment the coupling consists of boresighting systems 3810 and 3820. In one embodiment high resolution imaging system 3810 forms high resolution image 3830 while coded localization system 3822 forms coded vector space 3860 from an arrangement of coded localization sensors 3822 that form system 3820. In one embodiment coded vector space 3860 is compared via process 3865 to sub-image 3850 extracted via process 3840 from region 3835 in primary high resolution image 3830. In one embodiment process 3865 localizes the feature set contained within 3860 to the high resolution image 3830. In another embodiment feature set 3860 and high resolution image 3830 are used to form a range map of scene contained in image 3830.

Figure 39:
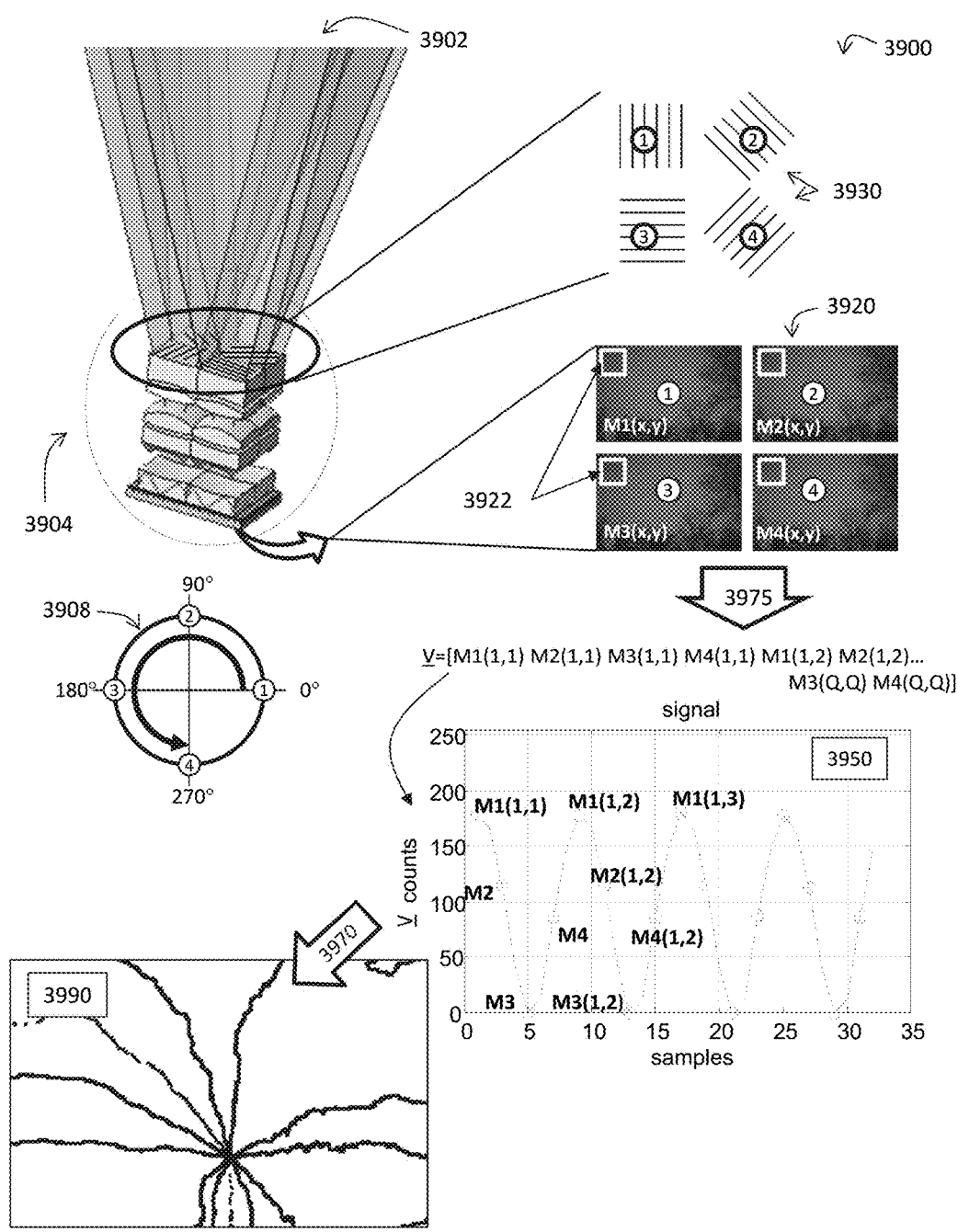
FIG. 39 shows an embodiment of a device for a polarization sky compass utilizing the coded designs.

FIG. 39 shows an embodiment of a device for a polarization sky compass utilizing the coded designs and processing systems disclosed herein to estimate polarization patterns in the sky when obscured by an unknown medium as disclosed previously in FIG. 4. System 3900 consists of coded localization imaging system 3904 containing a 2×2 arrangement of imaging channels with overlapping fields of view 3902. Each imaging channel contains a linear polarizer 3930 oriented at a certain angle to a fixed reference. In this embodiment the angles are selected to form a $2\pi$-symmetric sampling of the unit circle 3908, which enables the data processing disclosed. In this case the angles or samples numbered 1 through 4 are shown as linear polarizer angles 3930, corresponding locations on the unit circle 3908 at 90 degree phase intervals of rotation (which corresponds to 45 degree interval rotations of the physical polarizer acting as an analyzer), and resulting images 3920 that are formed by system 3904. The processing for the 2×2 system as introduced in FIG. 3 is shown in graph 3950 where each sample is stacked to form a vector $\underline{V}$ by process 3975 which collects overlapping pixel samples from a Q×Q sized window 3922 through the stack of 4 images 3920. In this embodiment, $\underline{V}$=[M1(1,1)  M2(1,1)  M3(1,1)  M4(1,1)  M1(1,2)  M2(1,2) . . . M3(Q,Q) M4(Q,Q)], where only the first few samples are shown in Graph 3950. In these samples the number of the image or data "M" corresponds to the unit circle angle 1 through 4, and the (x,y) location corresponds to an image location. To extend graph 3950 to a usable amount of data, a Q×Q window 3922 in each image is selected for collecting data. At each image location in (x,y) within the Q×Q window the pixel intensity at that location is collected for each of the images M1 to M4 and arranged in sequence, forming a 4×Q×Q long vector similar to the long vector of samples 1530 in FIG. 15. Q is selected in this example to be large (>10) since the clouds forming the obscuring medium are considered to be very dense and highly attenuating of the sky polarization signal. As shown earlier in FIG. 15, the vector $\underline{V}$ is then Fourier transformed to form sinusoidal peak locations similar to 1545. Sliding the Q×Q window across the entire image in x,y via process 3970 and extracting the angle of the Fourier component from V yields the angle of partial polarization 3990 as derived from the sky images 3920. The magnitude and phase of a particular set of points from the Fourier Transform can be also calculated through an efficient sum-of-products method. The point of convergence of the angles in 3990 represents the anti-sun in this example. With the heading of the anti-sun, and knowing the time of day and geographic location, the device provides a highly accurate compass heading angle for use with vehicle control, personal navigation, and other systems requiring accurate heading estimates. This compass does not rely on magnetic fields and can be used on heavy machinery in the presence of large amounts of iron products that normally disrupt a magnetic compass.

Figure 40:
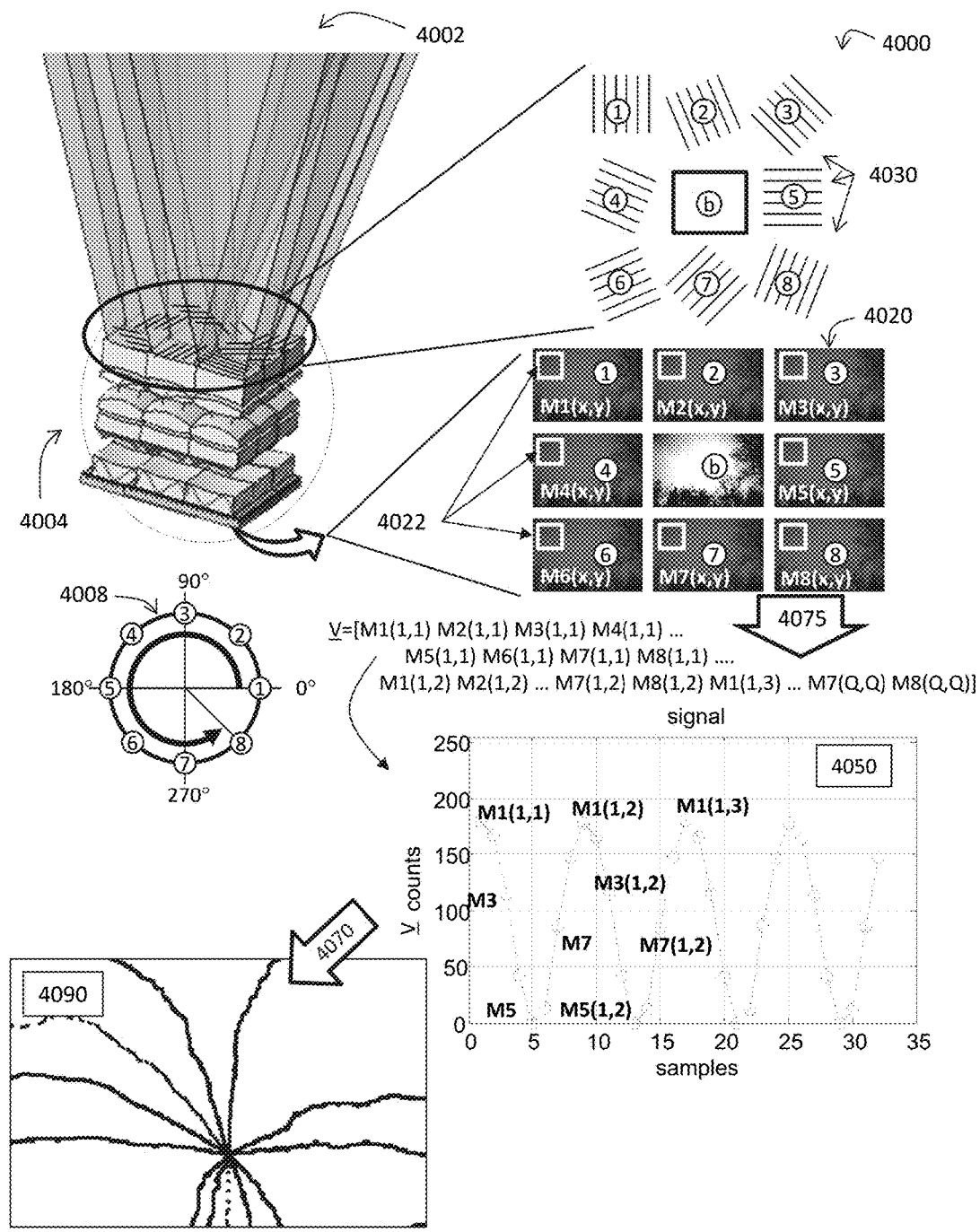
FIG. 40 shows another embodiment of a device for a polarization sky compass utilizing the coded designs.

FIG. 40 shows another embodiment of a device for a polarization sky compass utilizing the coded designs and processing systems disclosed herein to estimate polarization patterns in the sky when obscured by an unknown medium as disclosed previously in FIG. 4. System 4000 has a coded localization imaging system 4004 containing a 3×3 arrangement of imaging channels with overlapping fields of view 4002. Eight of the imaging channels contain a linear polarizer 4030 oriented at a certain angle to a fixed reference. In this embodiment the angles are selected to form a 2π symmetric sampling of the unit circle 4008, which enables the data processing disclosed. One channel is uncoded to form a clear image and is labeled 'b' in the image set 4020. In this case the angles or samples numbered 1 through 8 are shown as polarizer angles 4030, corresponding locations on the unit circle 4008 at 45 degree phase intervals(which corresponds to 22.5 degree interval rotations of the physical polarizer), and resulting images 4020 that are formed by system 4004. The processing for the 3×3 system as introduced in FIG. 3 is shown in graph 4050 where each sample is stacked to form a vector $\underline{V}$ by collecting overlapping pixel samples through the stack of 8 images. In this embodiment, V=[M1(1,1) M2(1,1) M3(1,1) M4(1,1) M5(1,1) M6(1,1) M7(1,1) M8(1,1), M1(1,2) M2(1,2) . . . M7(1,2) M8(1,2) M1(1,3) . . . M7(Q,Q) M8(Q,Q)], where only the first few samples are shown in Graph 4050. In these samples the number of the image or data "M" corresponds to the unit circle angle 1 through 8, and the (x,y) location corresponds to an image location. To extend graph 4050 to a usable amount of data, a Q×Q window 4022 in each image is selected for collecting data. At each image location in (x,y) within Q×Q window 4022 the pixel intensity at that location is collected for each of the images M1 to M8 and arranged in sequence, forming a 8×Q×Q long vector similar to vector 1530 in FIG. 15. Q is selected in this example to be large (>10) since the clouds forming the obscuring medium are considered to be very dense and highly attenuating of the sky polarization signal. The vector $\underline{V}$ is then Fourier transformed to form sinusoidal peak locations as in the previous example in FIG. 39. This is a similar processing to the system in FIG. 39 except that the 3×3 configuration allows capturing twice as many angles of the process as evident in graph 4050. More samples in angle enables higher SNR, or reducing Q for more spatial resolution without sacrificing SNR. Sliding Q×Q window 4022 across the entire image in x,y with process 4070 and extracting the angle of the Fourier transform of the data yields the angle of partial polarization 4090. The angle of the partial polarization is the angle of the complex vector of the Fourier component defined by an 8 sample period, as derived from the sky images 4020. Since Q is the same as in FIG. 39 the result 4090 has a higher SNR and less noisy than 3990 in FIG. 39. The point of convergence of the angles in 4090 represents the anti-sun in this example. With the heading of the anti-sun, and knowing the time of day and geographic location, the device provides a highly accurate compass heading angle for use with vehicle control, personal navigation and other uses of heading estimates. This compass does not rely on magnetic fields and can be used on heavy machinery in the presence of large amounts of iron products that normally disrupt a magnetic compass.

Figure 41:
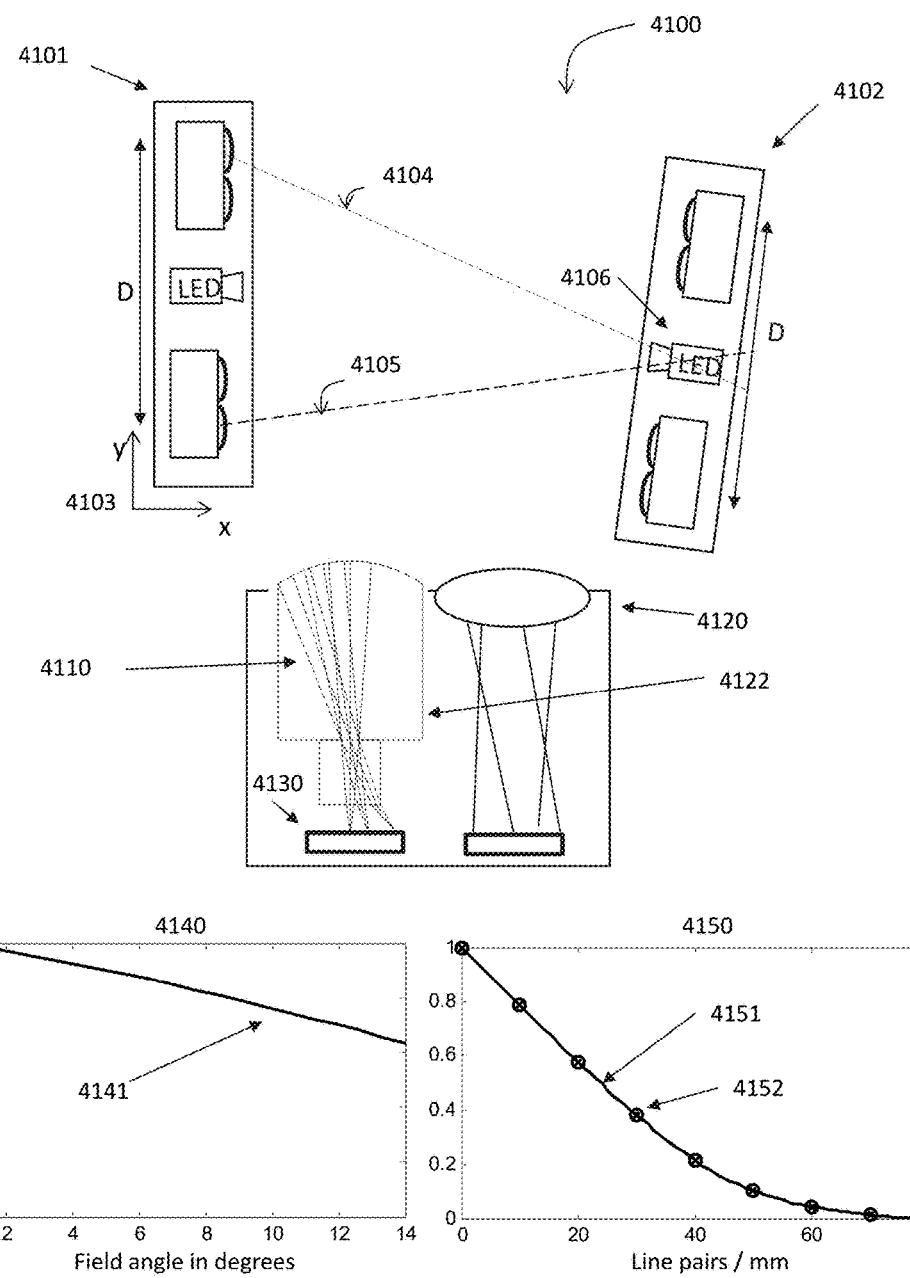
FIG. 41 describes a high-speed localization system that has milli-radian estimation precision, small size and low cost.

FIG. 41 describes a high-speed localization system that has milli-radian estimation precision, small size and low cost. Two systems 4101 and 4102 are mounted on a device, such as an arm or boom of a controlled system, where the relative distance and angle of the set of parallel systems is needed. Each system consists of two sets of coded high-speed angle estimation sensors light meter, and an illumination device, such as an LED. The optics form space-variant measurements by using specialized relative illumination 4110. The sensors and illumination LEDs can operate in narrow UV, IR or visible wavelengths ensuring that there are no other sources possible in the field of view of the systems. The field of view of the LED and the collection optics 4122 for the coded estimation systems and light meters 4120 is sufficient to cover the expected relative motion of the parallel systems. This particular example has a FOV of 60 degrees, or + and −30 degrees. The coded estimation system has a specially designed relative illumination—vs.—field angle as shown in 4140. The relative illumination 4141 varies from 1.0 when the object is on-axis to 0.8 when the object is at 30 degrees. The estimate of the object angle given the measurement v1 at high speed single pixel detector 4130 measuring $v_1$ is $v_1$*K1+K2, where K1 and K2 depend both on the total amount of power reaching the aperture of the estimation system, the efficiency of the detector and the particular code. By measuring and calibrating the total power reaching the aperture, with the light meters, the constants K1 and K2 can be found. By repeated measurements of the received power, through the light meter, any changes in power due to electrical fluctuations, large distance variations, atmospheric conditions, etc. can be accounted for.

The prescription for the optical system in FIG. 41 is as follows (in Zemax Lens units) where CSBR is Cesium Bromide and KCL is Potassium Chloride, both of which can be compression molded:

| Surface 1 | Surface 2 (stop) | Surface 3 |
| --- | --- | --- |
| Material = CSBR | Material = KCL | Material = Air |
| Radius = 4.001137 | Radius = infinity | Radius = −0.671541 |
| Thickness = 5.88603 | Thickness = 2.134825 | Thickness = 0.979269 |

-continued

| Surface 1 | Surface 2 (stop) | Surface 3 |
|---|---|---|
| Semi-dia = 2.37714 | Semi-dia = 0.288709 | Semi-dia = 0.99885 |
| Conic = 0.366887 | | Conic = −5.234306E4 |
| $4^{th}$ = −1.394775E−3 | | $4^{th}$ = −0.034597 |
| $6^{th}$ = −2.470589E−5 | | $6^{th}$ = −0.041182 |
| $8^{th}$ = −1.963808E−5 | | $8^{th}$ = −0.014880 |

The MTF of this specialized imaging system is very high as shown in 4150. The diffraction-limited values are given by 4152 and the on-axis MTF is given by 4151. The off-axis MTFs are similar.

The particular single pixel sensor, LED and optical configuration in FIG. 41 has a combined SNR of 1/500, or one part in 500, for an on-axis object. The uncertainty of the angle estimate is then given by approximately [30 degrees/500/0.2 variation] or about 5 milli-radians. Using larger collection optics, a higher power LEDs or more efficient detectors can increase the angular precision even more. Knowing the baseline separations D and coordinates of the two corresponding coded estimation systems, from 4103, results in two estimated linear equations representing the equations to the object 4106 ($x_3, y_3$) from the two ends of the baseline. Combining the two estimated equations for lines 4104 and 4105 via $y_3 = m_1 x_3 + b_1 = m_2 x_3 + b_2$ results in an estimate of the distant source ($x_3, y_3$), as well as the distance and relative angle to the LED. As there are parallel estimation systems, 4102 can also be used to calculate the relative range and angle to the LED of 4101. Small variations of the two estimates due to noise can be averaged out reducing the uncertainty of the final measurements. Any large discrepancies in estimated range and angles from 4101 and 4102 indicate something is wrong with one or the other system or that some external effect, like a distance second source, like the sun, is interfering with the measurements. By watching the relative received power from the light meters many of the discrepancies can be understood and corrected.

A step-by-step algorithm is:
1. Calibrate coded pixel sensor with light meter: $V_1 * K1 - K2$ =estimated angle
2. Estimate equation of line to LED relative to system baseline D and coordinate system
3. Estimate equation to LED for corresponding estimation system ($y_2$)
4. Determine orientation of system ($x_3, y_3$) via $y_3 = m_1 x_3 + b_1 = m_2 x_3 + b_2$
5. Compare/average orientation estimate with symmetric system. Exploit symmetry.

Figure 42:
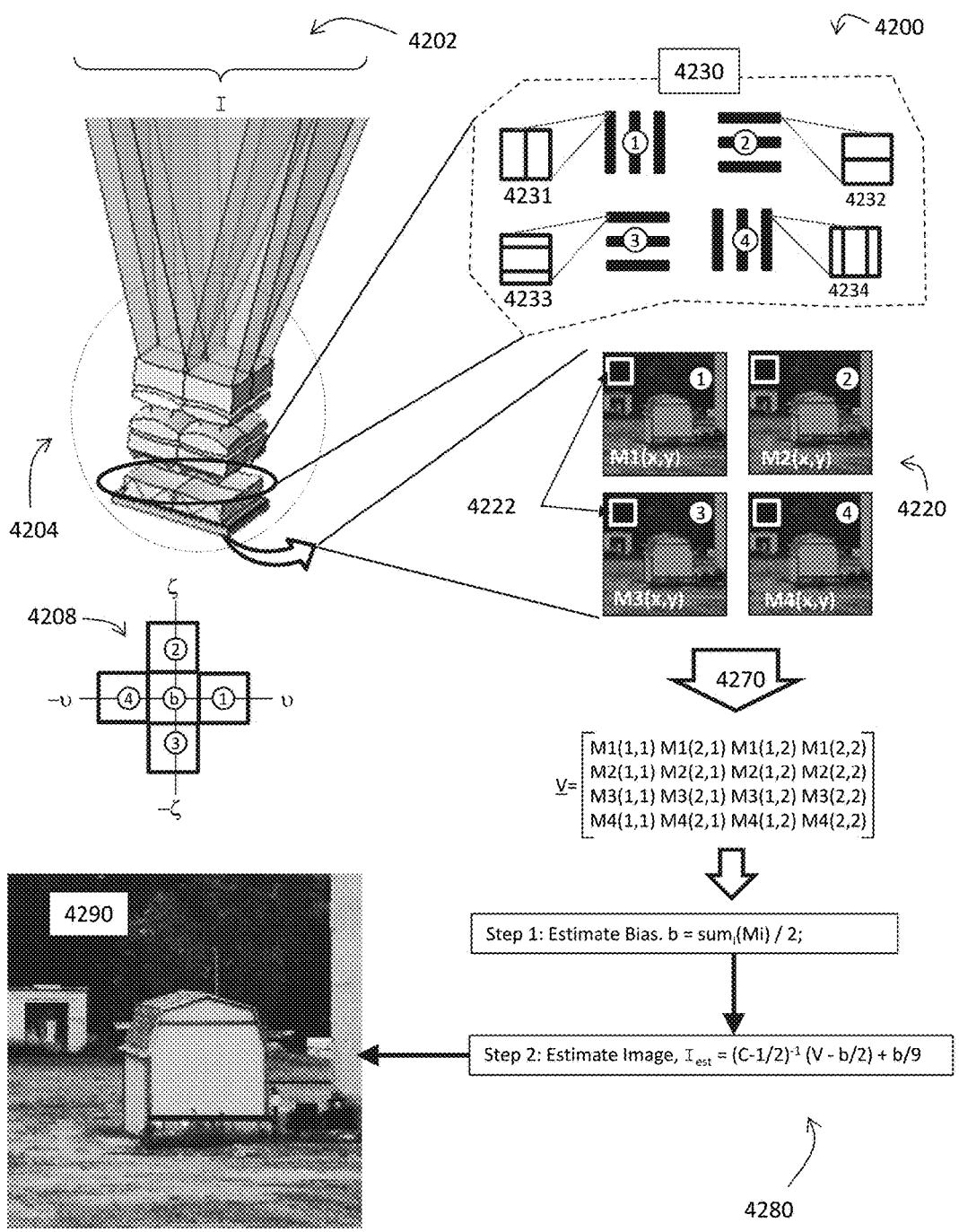
FIG. 42 shows a preferred embodiment of a device for imaging using the coded designs and processing systems.

FIG. 42 shows a preferred embodiment of a device for imaging using the coded designs and processing systems disclosed herein. System 4200 consists of coded localization imaging system 4204 containing a 2×2 arrangement of imaging channels with overlapping fields of view 4202 and imaging model M=C*I where M is a matrix of sampled data, C is a matrix that describes the code space, and I is a matrix of the object intensity values, and where * denotes matrix multiplication.

Each imaging channel contains a pixel-level grayscale intensity code 4230 based on a biased sinusoid and cosine with a phase shift of 135 degrees and orientation of 0 and 90 degrees. For w=i*(2/pixel size) and f=135 deg, the codes C1 to C4 are for channels 1 to 4 are:

$$C1 = \tfrac{1}{2} \sin(w^*x + f) + \tfrac{1}{2}$$

$$C2 = \tfrac{1}{2} \cos(w^*y + f) + \tfrac{1}{2}$$

$$C3 = C2^T$$

$$C4 = C1^T$$

Where the period is chosen so that with the independent variables x and y one period of sinusoidal codes occupies one pixel width. The independent variable extends to all pixels in the particular channels. When the independent variables x and y are chosen so that they are integer multiples of +(pixel size/2) and −(pixel size/2) each pixel is e modified by two grayscale values as shown in 4231, 4232, 4233, and 4234 where the phase and amplitude for a single pixel for each code is shown. For example, 4231 shows a close view of the code pattern over a single pixel where the right half of the pixel is clear and the left half of the pixel has an attenuating grayscale value over it. In this example the angles are selected to form a symmetric sampling of the phase and amplitude of spatial frequency space 4208, which enables the data processing disclosed. The samples numbered 1 through 4 are shown as gray codes 4230, corresponding locations in frequency space 4208, and resulting images 4220 that are formed by system 4204. Frequency space 4208 shows that the complex sampling achieved in the coded system is 2× what the pixel spatial frequency allows. The unmodified pixel allows the central square labeled "b" in 4208, while the coded pixels push the measured spectral response out by a factor of 2 by using 2 intensity values per pixel. The spectral response is pushed out further to 3× the pixel sampling frequency in the next example FIG. 43. The response of the central square "b" is not sampled in this case, but is achieved by averaging all of the 4 coded channels together. In contrast in FIG. 43 the actual bias value or native pixel resolution is sampled using a clear channel.

The coded pixels of system 4200 essentially sample the complex amplitude at spatial frequencies higher than the maximum spatial frequency defined by physical pixels. While any one of corresponding coded pixel pairs 4231/4234 or 4233/4232 can yield an estimate of the magnitude of the spatial frequency regions defined by 4208, the pairs of codes are needed to determine both the magnitude and phase of the spatial frequency regions. In an embodiment, coded localization systems provide measurement vectors that represent the complex Fourier spatial frequency components beyond the spatial frequency limits of the detector pixels.

The processing for the 2×2 system in FIG. 42 as introduced in FIG. 6 and FIG. 23 is shown as forming a vector $\underline{V}$ by collecting adjacent pixel samples through the stack of 4 coded images. In this example, process 4270 takes 4×Q×Q samples from each Q×Q window 4222, with 2 grayscale values (or codes) per pixel Q=2, and the matrix $\underline{V}$ is:

$$\underline{V} = \begin{bmatrix} M1(1,1) & M1(2,1) & M1(1,2) & M1(2,2) \\ M2(1,1) & M2(2,1) & M2(1,2) & M2(2,2) \\ M3(1,1) & M3(2,1) & M3(1,2) & M3(2,2) \\ M4(1,1) & M4(2,1) & M4(1,2) & M4(2,2) \end{bmatrix}$$

In these samples the number of the image or data "M" corresponds to the frequency domain regions 1 through 4 and the number of channels, and the (x,y) location corresponds to a coded image location. One important property of the set of codes 4230 is that the sum of all the 2D codes is a constant. The sum of the code measurements can then be used as direct estimate of the baseband spatial frequency value denoted by "b" in 4208. As described in 4280, an estimate of the bias or baseband pixel value is determined by a weighted sum of the coded pixel values. This estimated bias is then used to remove the bias from the measured data matrix M. By removing the bias from the measurement the code matrix (C−½) can be bipolar and composed ideally of orthogonal sinusoids. Without the factor of ½, or bias, the code matrix the components are orthogonal sinusoids with an ideal inverse that has the minimum effect of noise. In effect, the ideal code matrix (C−½) is a complex Fourier Transform and the inverse matrix is the complex inverse Fourier Transform of a linear combination of the measured data.

The vector V is transformed in 4280 using a model of the inverse of the codes (C−½) to form an estimate of pixels in the full resolution image with reconstruction model: $I_{est}=(C-½)^{-1}(V-b/2)+b/9$ where the value b is given by $sum_i(Mi)/2$. Ideally $(C-½)^{-1}$ is the 2D inverse Fourier Transform matrix.

Sliding the Q×Q window across the entire image in x,y and extracting the intensity estimate by multiplying $(C-½)^{-1}$ with a scaled version of the data matrix $\underline{V}$ plus the bias yields the full resolution image 4290. This enables angle coded systems that were designed for localization tasks to also provide full resolution imagery.

Figure 43:
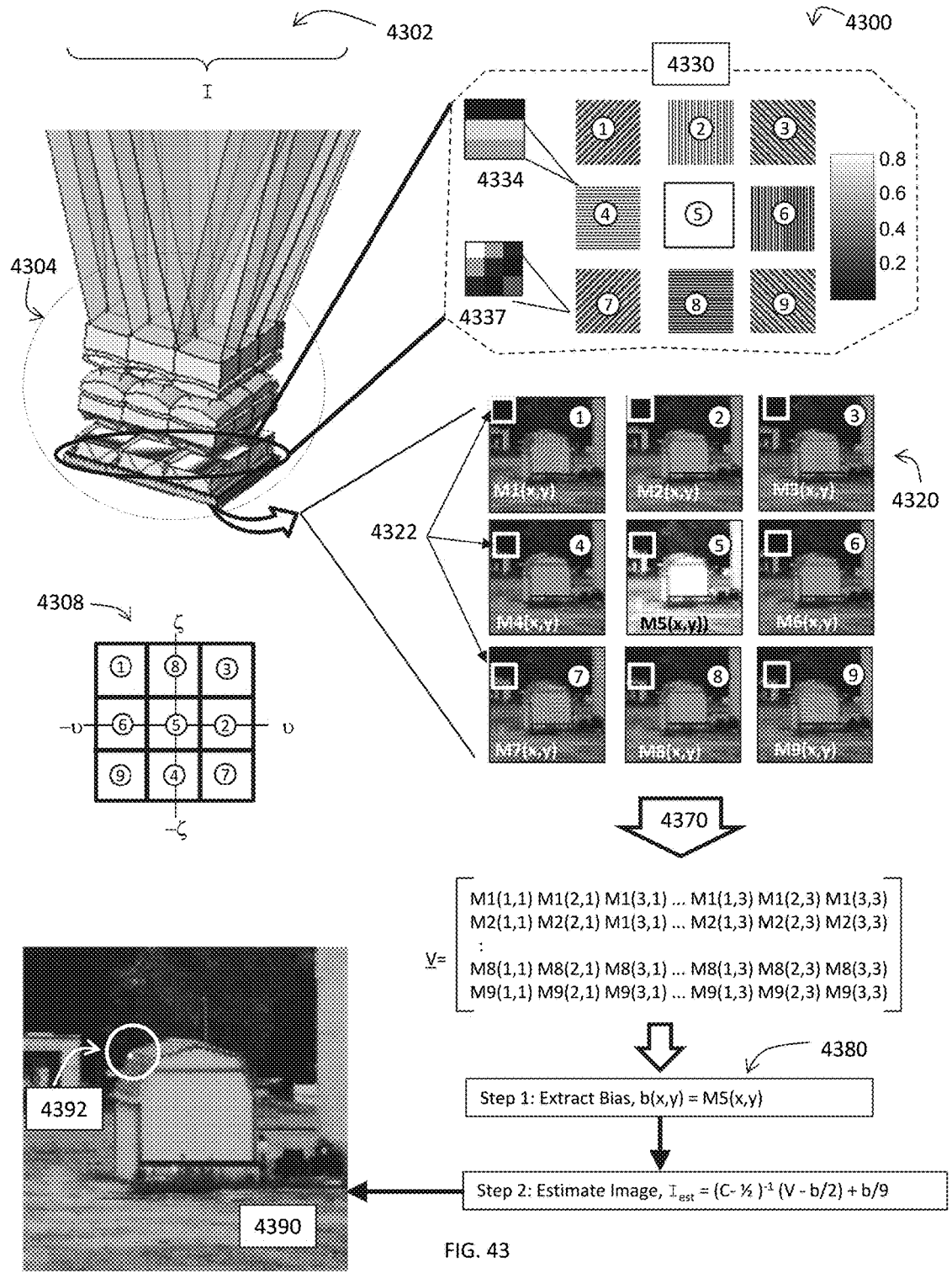
FIG. 43 shows a preferred embodiment of a device for imaging using the coded designs and processing systems.

Furthermore, in a coded localization system 4200 viewing a single point source object within the field of view, each pixel can estimate the angle to the object, as demonstrated earlier in FIG. 41, due to the intensity coding. This provides the system in FIG. 42 (with many pixels) the capability to estimate range with sub-pixel accuracy to point objects as well as form the final image. As described in FIG. 41, multiple coded pixels with a known baseline can perform range estimation, hence the system in FIG. 42 with a multitude of pixels and codes can form range estimates as in FIG. 41 as well as form full resolution images as in FIG. 42. Ranging to point or other known sources such as retro-reflectors or active sources such as LEDs, and simultaneously imaging the surrounding environment with precise registration to the point source is critical for surveying, mapping, and localizing remote objects in targeting applications. FIG. 43 shows a preferred embodiment of a device for imaging using the coded designs and processing systems disclosed herein. System 4300 consists of coded localization imaging system 4304 containing a 3×3 arrangement of imaging channels with overlapping fields of view 4302. Eight of the nine imaging channels contain a pixel-level grayscale intensity code 4330 based on a biased sinusoid and cosine with a phase shift of π/12 radians and orientations of 0, 45, 90, and 135 degrees and one channel is clear. In this embodiment the codes are selected to form a symmetric sampling of the complex frequency space 4308, which enables the data processing disclosed. In this case the angles or samples numbered 1 through 9 are shown as gray codes 4330, corresponding locations in complex frequency space 4308, and resulting images 4320 that are formed by system 4304. Each pixel is modified by three grayscale values as shown in 4334 and 4337 where the phase and amplitude for a single pixel for each code is shown. For example, 4334 shows a close view of the code pattern over a single pixel where the top ⅓ of the pixel is heavily attenuated, the middle ⅓ is the least attenuated, and the bottom ⅓ is attenuated at yet a third grayscale value. Pixel code 4337 also shows only three intensity values, this time arranged in a diagonal structure to fill out the frequency space 4308 diagonal frequency content as indicated by squares 1, 3, 7, and 9, which correspond to the diagonal sampling codes in 4330. For w=π(2/pixel size) and f=π/12, the codes C1 to C9 for channels 1 to 9 are:

$C1=½ \sin(w^*x+f)+½$, at −45 degrees rotation $C2=½ \sin(w^*x+f)+½$, at 0 degrees rotation $C3=½ \sin(w^*x+f)+½$, at 45 degrees rotation $C4=½ \sin(w^*x+f)+½$, at 90 degrees rotation $C5=1$ $C6=½ \cos(w^*x+f)+½$, at 0 degrees rotation $C7=½ \cos(w^*x+f)+½$, at −45 degrees rotation $C8=½ \cos(w^*x+f)+½$, at 90 degrees rotation $C9=½ \cos(w^*x+f)+½$, at 45 degrees rotation Where the independent variable x is chosen to be three samples across a pixel and extend to all pixels in each channel. The period of the sinusoids is equal to the dimension of one pixel in this example. The period of the sinusoids can be integer multiples of the pixel period or can correspond to any other higher or lower spatial frequency that is supported by the imaging optics and code fabrication. The processing 4370 for the 3×3 system is similar to that in FIG. 42 and is shown as forming a vector $\underline{V}$ by collecting adjacent pixel samples through the stack of 9 images 4320 in Q×Q window 4322. In this embodiment, Q=3 and:

$$\underline{V} = \begin{bmatrix} M1(1,1) & M1(2,1) & M1(3,1) & \cdots & M1(1,3) & M1(2,3) & M1(3,3) \\ M2(1,1) & M2(2,1) & M2(3,1) & \cdots & M2(1,3) & M2(2,3) & M2(3,3) \\ \vdots & \vdots & \vdots & \ddots & \vdots & \vdots & \vdots \\ M8(1,1) & M8(2,1) & M8(3,1) & \cdots & M8(1,3) & M8(2,3) & M8(3,3) \\ M9(1,1) & M9(2,1) & M9(3,1) & \cdots & M9(1,3) & M9(2,3) & M9(3,3) \end{bmatrix}.$$

In these samples the number of the image or data "M" corresponds to the frequency domain regions 1 through 9 and the number of channels, and the (x,y) location corresponds to an image location. While any one of the corresponding codes channels, such as ⅖, ⅜, ⅐ can be used to directly sample the magnitude of the spatial frequency regions in 4308, the set is needed to sample and estimate both the magnitude and phase of the specific spatial frequency regions. The spatial frequency regions can be adjusted to essentially spatial frequency that the optical system and code fabrication will allow.

An increased resolution image is formed by first estimating the bias, or baseband component for each pixel. This can be done through the values of the clear channel, denoted as channel 5. The 8 codes can also be designed so that their sum is a constant in 2D, such as in FIG. 42. Both the clear channel values and the estimated bias values from the sum of the codes can be combined to reduce the effects of noise. The measurement vector V is then scaled and transformed using a model of the inverse of the codes (C−½), plus a scale value of the bias, to form an estimate of pixels in the full resolution image. Sliding the Q×Q window 4322 across the entire image in x,y and extracting the intensity estimate by multiplying $(C-\frac{1}{2})^{-1}$ with $(\underline{V}-b/2)$, and adding b/9, yields the full resolution image 4390. Ideally the inverse of $(C-\frac{1}{2})$ is the inverse 2D Fourier Transform matrix, which has the minimum effect on measurements in noise. This enables angle coded systems that were designed for localization tasks to also provide high quality full resolution imagery. Result 4390 also contains a point source of interest 4392. Ranging to this point source of interest is discussed in detail in FIG. 44.

Figure 44:
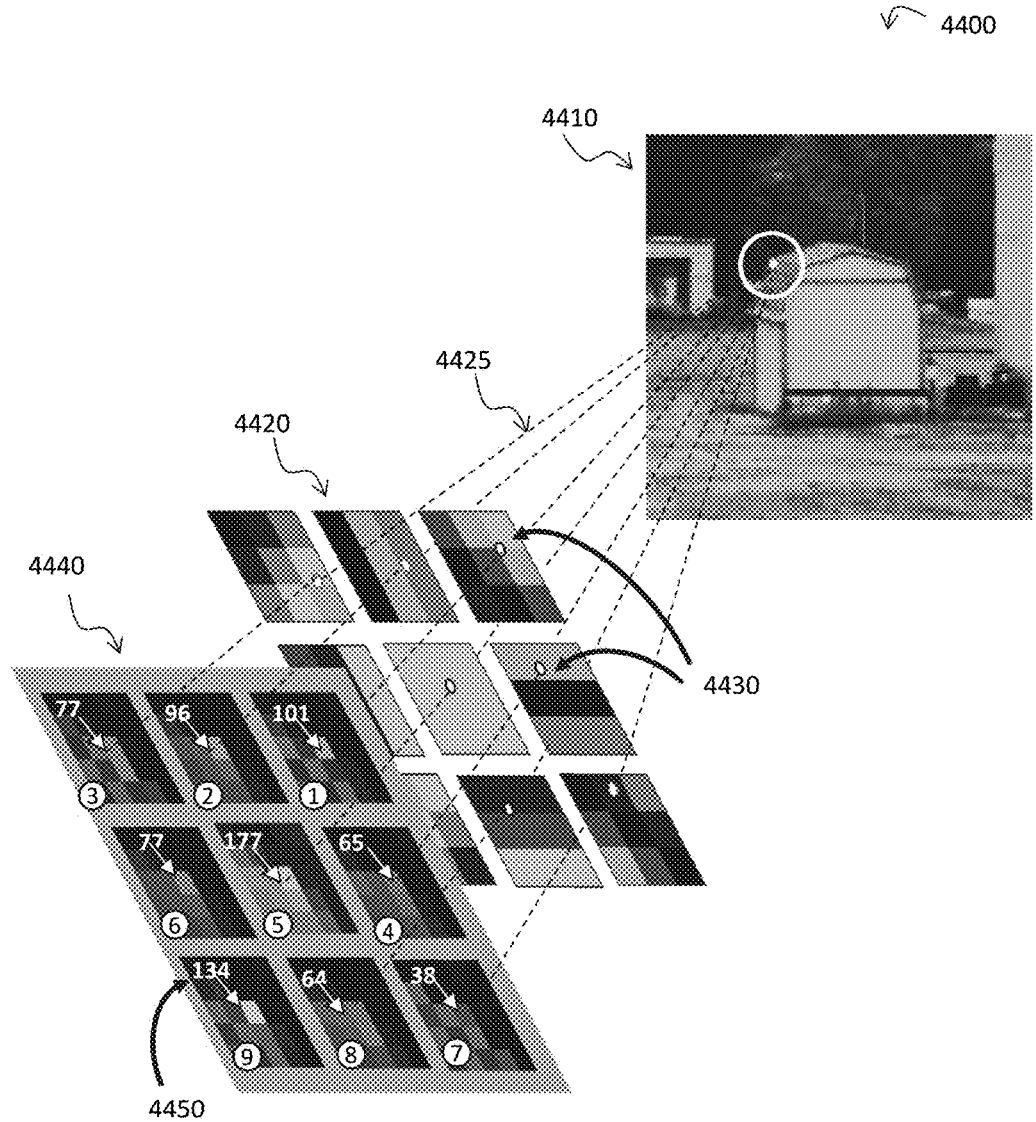
FIG. 44 is an embodiment of the invention disclosing ranging using groups of single pixels.

FIG. 44 is an embodiment of the invention from FIG. 43 disclosing ranging using groups of single pixels. Single pixel range estimation using coding has also been disclosed earlier in FIGS. 18 and 41 and is discussed here in more detail. System 4400 contains 4410, which is a collection of objects including a known source (LED or retro-reflector) to be localized in the field of view. System 4304 from FIG. 43 is used as the device. The grayscale intensity code sections of rays from the sampled pixels capturing the retro-reflector pass through are shown as 4420. The particular region of the code the rays pass through determine the attenuation of the object intensity value as detected on the detector and are shown as small circles 4430. Small region of sampled data M1(x,y) to M9(x,y) centered on retro-reflector is also shown as 4440. In 4440 each channel produces a region of pixels surrounding the retro-reflector, numbered 1 through 9 with small circles. The intensity value of the pixels that are centered on the retro-reflector are also given in 4440 and, for channels 1 through 9, they are 101, 96, 77, 65, 177, 77, 38, 64, and 134 respectively, with an arrow indicating the central pixel. Using the detected intensity of any channel in conjunction with the object intensity as measured by channel 5 (the clear channel) allows one to trace a ray 4425 from the central sample in 4440 through the appropriate gray code region in 4420 at an angle that indicates the direction of the point source. The intersection of all the rays 4425 represents the range and x,y location of the point source.

In FIG. 44 the location of the object codes relative to the pixels and optics, as well as the approximate distance to the objects are essentially known. In many cases some or all of these parameters may not be initially known, such as with systems with fabrication errors or mechanical movement due to temperature or vibration effects. The range of the object could also vary. Control of the non-ideal effects due to parameters of the system may be termed calibration. Control of the non-ideal effects due to parameters of the object, like distance, may be termed focusing. The values and orientation of the code matrix C are then adjusted to correspond to the measurements V.

It is likely that the matrix condition number of an ideal code matrix C, or $(C-\frac{1}{2})$ will decrease due to the non-ideal fabrication and assembly effects thereby decreasing the degree of orthogonality of the imaging channels. If the uncertainty of the fabrication and assembly errors that influence the code matrix C are known in advance then the code matrix can be purposely designed to maximize the minimum expected singular value over the range of errors thereby making the final system 4500 relatively insensitive to non-ideal effects from fabrication and assembly. This design can be done by optimizing the code so that after the range of expected errors due to fabrication and assembly, such as through Monte-Carlo statistical trials, the final code matrix after calibration has the maximum minimum singular value and thus the maximum degree of orthogonality.

Figure 45:
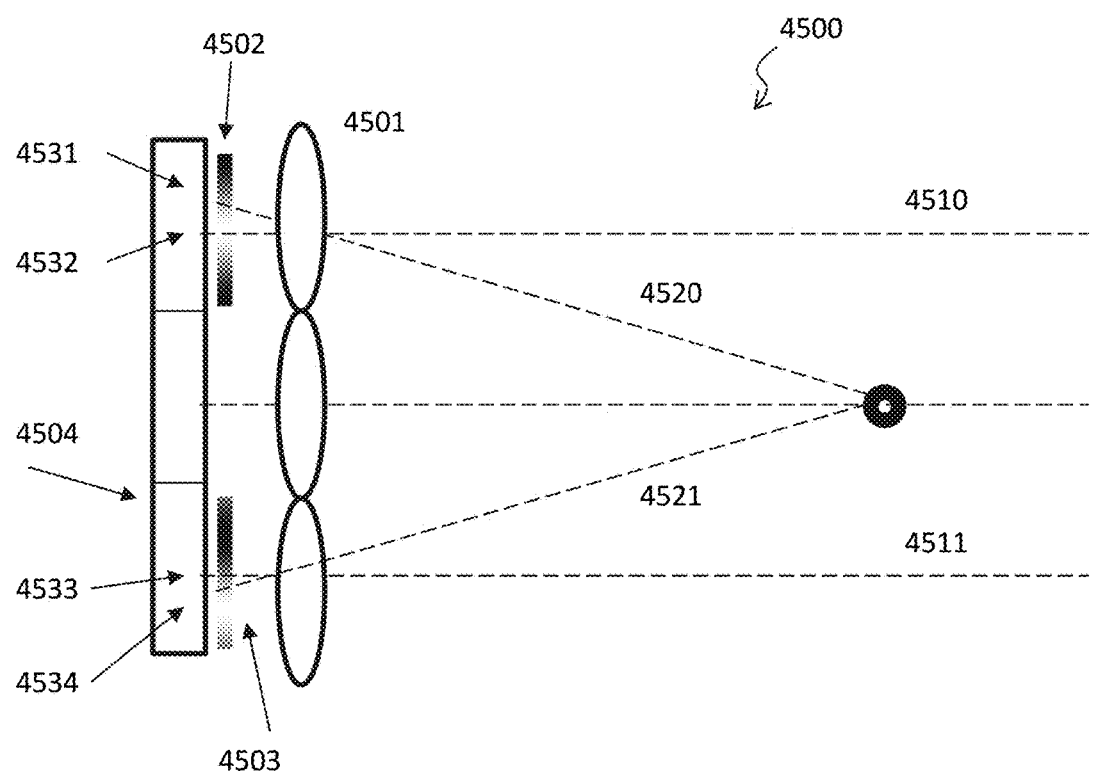
FIG. 45 illustrates focusing and codes as a function of range.

FIG. 45 illustrates focusing and codes as a function of range. The chief rays 4510 and 4511 are from an object whose relative distance is essentially infinity compared to the dimensions of the lens array 4501. The chief rays 4520 and 4521 are related to a relatively close source. The measured values from sensor 4504 change between the distant and close objects as seen by the change in the location of the chief rays 4531/4532 and 4533/4534 at the image planes and through the codes 4502 and 4503. The codes 4502 and 4503 spatially change as a function of position, similarly to the codes of 4420 of FIG. 44. The array of 3 lenses/codes/sensors generally represent the middle row of the system 4400 in FIG. 44 where the central channel has no code. As the object range changes the image formation model, given by the code matrix C, deterministically changes to reflect the actual formed samples. In effect the code matrix C becomes C(range), or the code matrix is a function of the particular object range and the rows and columns of C(range) are shifted to account for the deterministic change in object range of objects at particular spatial locations. In classical imaging systems the distance between the lens and image plane is mechanically moved to change focus. In coded multi-aperture systems electrically varying the code matrix as a function of range, C(range), and then reconstructed the image, as from FIG. 43, effects a change in focus with no physically moving parts.

If the object range is known, and the calibrated code matrix C known, then the proper image formation matrix C(range) can be formed and the corresponding high resolution image or object localization can be performed. If the object range is not known then a series of range values can be used to determine the "best focused" image through the pseudo inverse of $(C(range)-\frac{1}{2})$ acting on the scaled measurements V. By comparing the maximum spatial frequency content of the formed images or maximum MTF, for example, an estimate of object range and a clear image can be formed. When the spatial frequency content is a maximum the object can be considered well focused. This is similar to the processing that is done when mechanically moving the lens in a classical imaging system in order to form auto focus. Range estimation and therefore focus can be performed for every pixel in the image and for every type of object. When the object has a broad range of objects and best-focus is found over all relevant regions in the final images then the coded multi-aperture system forms an extended depth of focus image. Focusing can also be done for a small region of the image and the same estimated range value used for the entire image. By coding each channel as a function of range a focusing can be achieved for objects not at infinity. By coding each channel as a function of range an extended depth of field image can be achieved. By coding each channel as a function of range an estimate of range for points in the image can be achieved.

Figure 46:
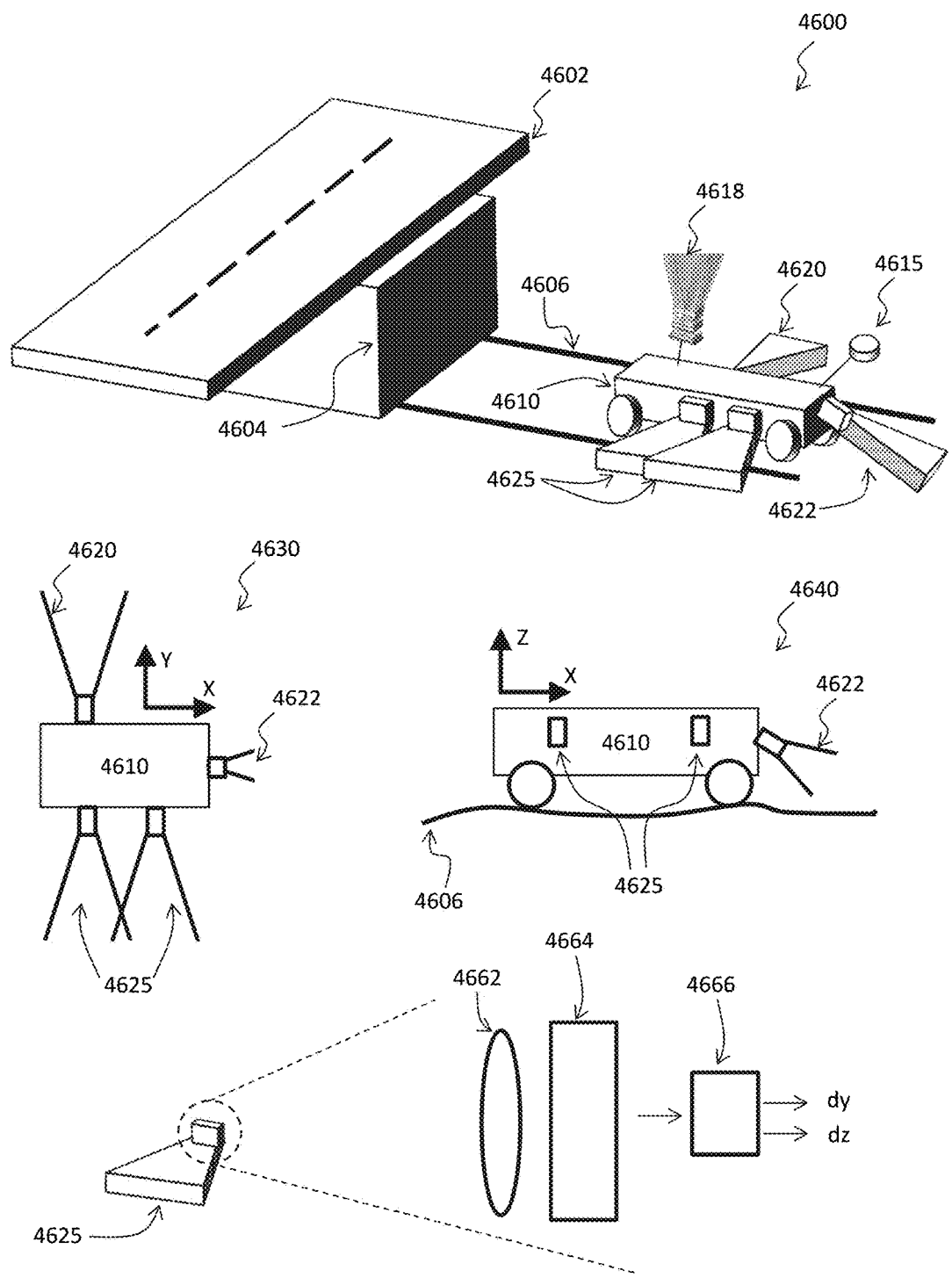
FIG. 46 is an embodiment of a navigation system for dead reckoning.

FIG. 46 is an embodiment of a navigation system for dead reckoning. System 4600 depicts an automated rolling robot cart 4610 that moves along a service pathway 4606 that goes through tunnel 4604 beneath roadway 4602. During operation outside the tunnel the cart navigates by using GPS 4615, which provides location information, and a polarization sky compass 4618 that provides compass heading information. The known sky polarization pattern exhibits symmetry so in this example the polarization compass only views a portion of the sky and uses rules of pattern symmetry to determine the heading angle. The cart is made of iron and moves iron material along the pathway so a magnetic compass is very inaccurate. The polarization sky compass 4618 provides heading information as long as a portion of the sky is present. Inside the tunnel neither GPS nor a view of the sky is available for navigation. Inertial navigation is known and well understood to be failure prone due to drift. Inertial navigation systems include for example accelerometers and rate gyroscopes where the signals are integrated to produce a displacement estimate in x, y, z and roll, pitch and yaw. To alleviate the drift and inaccuracies of inertial systems for dead reckoning within the tunnel, the system 4600 operates using optical motion units 4620, 4622, and 4625, which are configured to determine motion in the field of view as disclosed initially in FIG. 9. In this case the basic concept introduced in FIG. 9 is configured to provide navigation, and is also coupled with other systems disclosed herein to provide numerous benefits over the prior art.

The motion detected by a single system like 4625, containing optics 4662, detector 4664 and optical flow processing engine 4666 is any motion that causes the image to shift and can be detected by the optical flow processor 4666. The number of detector elements in 4664 is preferably small for example 32×32 to enable efficient optical flow processing. Pixels may also be large to enable efficient light capture as image resolution is not often the final goal. A single lens with a 30 degree field of view focused to infinity, a 32×32 detector and a correlation engine based on a digital signal processor (DSP) that spatially correlates images from two points in time to determine the shift in global features is a simple implementation for 4625. Memory onboard the DSP is used to store the images. Another implementation of 4666 is using a classic gradient optical flow algorithm based on an FPGA. Since the gradient algorithm is based on the assumption that a point of light does not change intensity as it moves using a coded intensity mask on the detector is not an option for this algorithm. As described in FIG. 9 one embodiment of the invention is to arrange several optical flow engine devices around a rigid body, in this case the rigid body is the automated cart 4510. The rigid framework of the cart couples the motion detected in the disparate units 4620, 4622, and 4625 to a motion model for translation and rotation of the cart. For example 4630 is a top view of the system 4600 with cart 4610. Axes are shown as Y and X in the plane of the drawing. When the cart moves forward in the middle of the tunnel the optical motion units 4620 and the pair 4625 will all observe the same dx value. If the cart is not going straight forward but is for example drifting to one side the dx values observed will increase on one side of the cart and decrease on the other side of the cart. For example samples indicating a straight forward motion may look like: $dx_{4620}$=[1 2 2 3 3] and $dx_{4625}$: [1 2 2 3 3], i.e. the steps in dx are identical, and in this example the cart is speeding up since the dx values are increasing. An increasing drift toward 4620 may look like: $dx_{4620}$=[1 1 2 2 3] and $dx_{4625}$: [1 1 2 1 1], with the drift beginning around the $4^{th}$ sample as seen in the difference of the two signals, i.e. $dx_{4620}$−$dx_{4625}$=[0 0 0 1 2]. The cart's control system can now take corrective action to steer and avoid the drift. If the cart remains off center then the difference will remain non zero but will be constant for a straight forward trajectory. The cart's control system may also choose to re-center itself by driving $dx_{4620}$−$dx_{4625}$ back to zero in this case. The optical motion unit provides dead reckoning for navigation.

Vertical motion is indicated by dz in 4620 and 4625 according to the side view 4640. Pitch, roll, and yaw can also be measured. A change in difference of dz values between 4620 and 4625 indicates a rolling action. Pitching in this example is indicated by a non-zero difference in dz values from the pair of sensors 4625. Yawing is determined by a difference in dx values for the pair of sensors 4625, although weakly so. Yawing is also measured with more precision by using the sensor 4622 on the tail of the cart. 4622 is shown in side view 4640 and being angled down to view the surface 4606. The sensor 4622 will measure forward motion as dx, and lateral motion as dy. Motion in Z will also affect 4622 depending on the angle viewing the ground, and height can be determined in this case by dz measurements.

Since the optical motion units are based on imaging systems they can also capture simple images and document the tunnel in this application. Images captured may be coded images as previously described to enable sub-pixel ranging. Details about the surfaces and algorithm results may also be provided to the cart as previously described in FIG. 9. Knowledge about SNR from the details can be used in the guidance algorithm to reject sensors that become dirty or do not see sufficient texture to perform optical flow calculations in this example.

Figure 47:
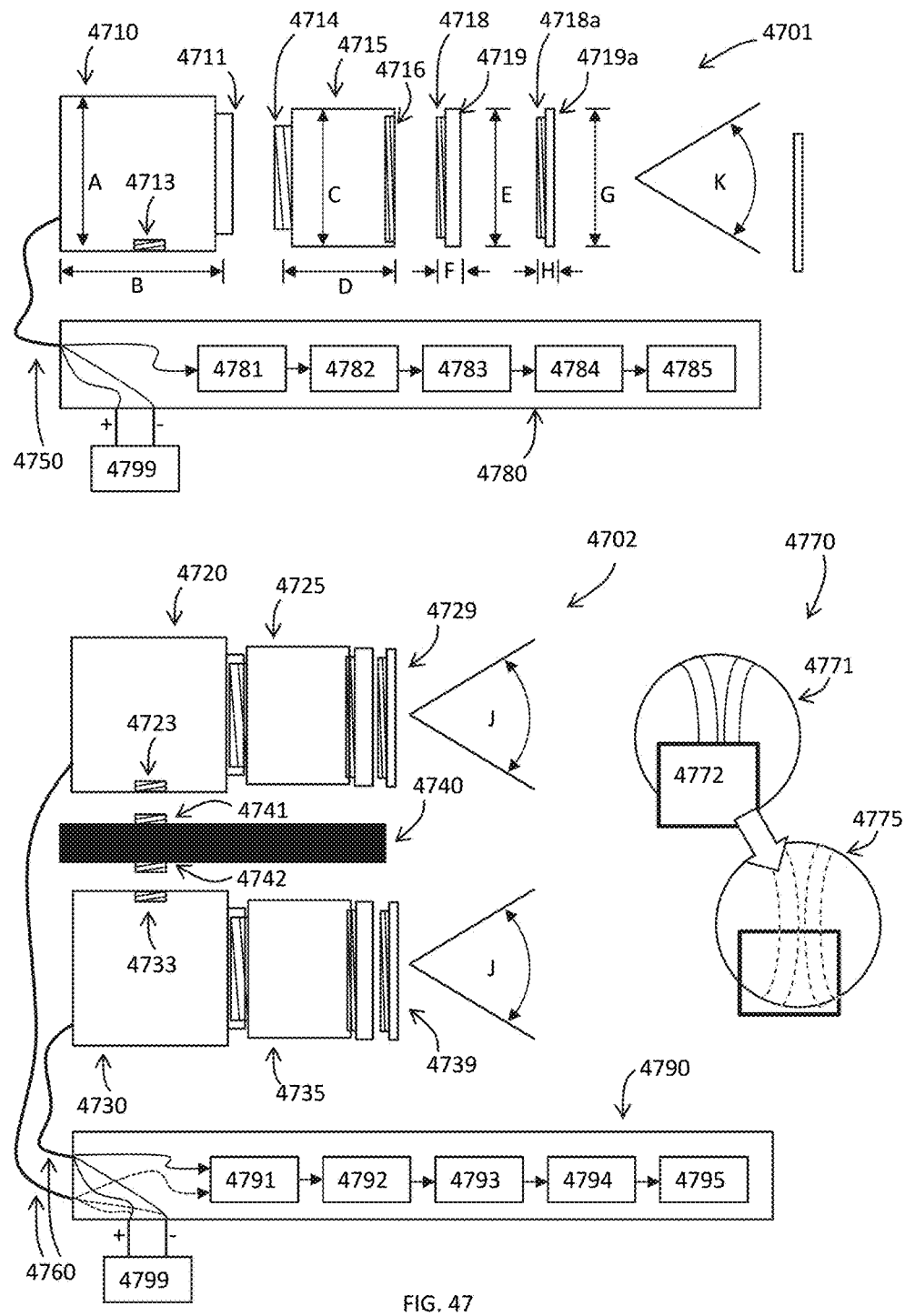
FIG. 47 illustrates a polarization compass, in an embodiment.

FIG. 47 is an embodiment of a polarization compass. Arrangement 4701 is a temporal sampling polarization compass consisting of a commercially available CMOS industrial USB3-connected camera 4710 with nominal body dimensions A=35 mm, B=35 mm. Also with industry standard "C/CS" lens mount bezel 4711 and industry standard ¼"-20TPI threaded mounting hole 4713 in the center of the camera body. The sensor in camera 4710 is a 1.3MPixel On Semi VITA1300 CMOS, ½" sensor format, 4.8 µm pixel size with global shutter generating 1280×1024 pixels at a maximum of 150 frames/sec. Lens 4715 with nominal dimensions C=34 mm, D=32 mm and industry standard "C/CS" lens mount thread 4714 screws into industry standard "C/CS" lens mount bezel 4711. Lens 4715 may be a Schneider Optics Cinegon f/1.4, focal length 8 mm compact C-mount lens with a nominal field of view K=60 degrees and a front thread 4716 to accept metric thread M3 0.5×0.5 filters 4719 and 4719a that have M3 0.5×0.5 mating thread 4718. Filter 4719 in this arrangement is a linear polarizer with 95% efficiency, 30% transmission and nominal dimensions of E=32 mm, F=10 mm, for example NT46-574 from Edmund Optics. Filter 4719a is a blue band pass filter, for example a Hoya B-440 or equivalent with a pass band between 395 nm to 480 nm and nominal dimensions of G=32 mm, H=5 mm, for example NT46-547 from Edmund Optics, that mounts to filter 4719 with lens mount thread 4718a. The blue filter 4719a blocks red and green light, which are not well polarized from striking the polarizer filter 4719. Linear polarizer 4719 is on the outside of the lens since it is easy to mount there with the M3 0.5×0.5 thread, and also because polarizers reflect or absorb light and if the polarizer were between the lens 4715 and the camera 4710 it may induce stray light into the imaging path or heat into the sensor both of which will degrade the signal quality. Also each field of view may not be able to image the full sky due to obstructions such as 4772 in scenario 4770. In this case the sky polarization pattern that is visible 4771 is known to have at least one axis of symmetry. In this case the dotted lines in 4775 represent the polarization pattern reconstructed for the full field of view using rules of symmetry about a horizontal line. This enables the device to form full polarization patterns of the sky in the presence of obstructions, and also determine heading angle using knowledge of sky polarization symmetry without requiring a fully unobstructed view.

Camera 4710 is powered via the USB3 cable 4750, which is plugged into laptop 4780. Laptop 4780 is for example powered by battery 4799 and is using an Intel Core i5 CPU at 2.5 GHz with 4 GB of RAM and a 32-bit operating system. Laptop 4780 is running algorithm consisting of signal processing blocks disclosed earlier. The algorithm first samples data in 4781 by interacting with the user to rotate the polarizer 4718 while taking pictures with camera 4710 and lens 4715 with filters 4719 and 4719*a*. The polarization angles the users selects are sampled around the unit circle in a uniform fashion as disclosed earlier. The user is encouraged to sample as quickly as possible to avoid temporal issues from moving clouds, trees, birds, and airplanes for example. Camera 4710 should also be mounted to a tripod or other fixed structure using mounting hole 4713 to avoid camera motion during subsequent exposures. The algorithm next sorts the data in 4782 as disclosed earlier for polarization processing, collecting samples across k for Mk(x,y) image values. Example code in 4782 for stacking the data in a Q×Q window with 8 polarization samples into a Q×Q×8 length vector $\underline{V}$ is:

for y=1:Q, for x=1:Q, for a=1:8, V(k)=M(y,x,a); k=k+1; end, end, end, where the third dimension in M is the image value, and is indexed similar to how Matlab software naturally arranges 3D matrices.

The Q×Q region is panned across the image set in x,y to form a full field of view polarization angle and magnitude result. The algorithm then Fourier transforms the vector V in 4783 by using a standard FFT (fast Fourier transform) technique, producing Q*Q complex values representing the spectral content of the vector $\underline{V}$. The spectral content, call it $\underline{S}$, is arranged in a vector with the DC value first followed by the positive frequency coefficients with increasing frequency index, and then the negative frequency coefficients. The coefficient of interest is in the first half of $\underline{S}$ so the algorithm in 4784 then selects the frequency data of interest from $\underline{S}$ by taking the magnitude and phase angle of the coefficient at index Q*Q*8/8+1, or $\underline{S}$(Q*Q*8/8+1), where the ⅛ is due to the user taking 8 images in the sampling portion 4781. The algorithm then displays the magnitude and angle for this Q×Q region in 4785 and the Q×Q region is panned across the image set in x,y to form a full field of view polarization angle and magnitude result.

Arrangement 4702 is a spatially sampling polarization compass and shares many of the features of the arrangement 4701 by using four cameras and lenses and filters in a 2×2 arrangement (only two are shown as 4702 presents a side view, the other two cameras and lenses and filters are behind the ones shown). Camera 4720 and 4730 are identical to 4710, with lenses 4725 and 4735 identical to 4715, and filter set 4729 and 4739 identical to 4719+4719*a* except that the linear polarizers 4729 and 4739 are at 45 degrees to each other. The four cameras therefore sample at 0 deg, 45 deg, 90 deg, 135 deg and images will be taken simultaneously by the algorithm described below. In this arrangement the cameras 4720 and 4730 are also mounted to a common rigid plate 4740 with ¼"-20TPI mounting studs 4741 and 4742 that mate to mounting holes 4723 and 4733. Plate 4740 is for example 60 mm×60 mm×10 mm thick aluminum plate. Cameras 4720 and 4730 are powered by USB3 cables 4760 from laptop battery 4799 and also send data back to the computer over cable 4760. The two other cameras and cables are not shown. In this arrangement the algorithm in laptop 4790 (this laptop is identical to laptop 4780) is based on spatial sampling and not temporal sampling. The algorithm first samples data in 4791 by interacting with the user to take a simultaneous image using all four cameras. Fields of view J are overlapping and of similar dimensions to field of view K described earlier. By taking simultaneous images the temporal sampling problems described earlier (motion of objects and the sampling rig) are largely alleviated at least to the extent of the shutter exposure time for the system. The remaining portions of the algorithm 4792, 4793, 4794, and 4795 are similar to those disclosed for the temporal sampling system, 4782, 4783, 4784 and 47895, respectively. In this case with 4 samples, example code in 4792 for stacking the data in a Q×Q window with 4 polarization samples into a Q×Q×4 length vector $\underline{V}$ is:

for y=1:Q, for x=1:Q, for a=1:4, V(k)=M(y,x,a); k=k+1; end, end, end

In 4793 the spectral content $\underline{S}$ of the vector $\underline{V}$ is again formed. The algorithm in 4794 selects the frequency data of interest from $\underline{S}$ by taking the magnitude and phase angle of the coefficient at index Q*Q*4/4+1, or $\underline{S}$(Q*Q*4/4+1), where the ¼ is due to the arrangement 4702 producing 4 images in the sampling portion 4781. Those skilled in the art can see that a temporal sampling arrangement 4701 is easily extended to a spatial sampling arrangement 4702, and that 4702 can be easily extended to include 8 camera+lens+filter subsystems, where polarizer angles would be optimally arranged at 22.5 degrees instead of 45 degrees, providing a finer sampling around the unit circle as compared to 4 images.

In another embodiment the cameras 4710, 4720, and 4730 contain built-in processing such as industrial "smart" cameras. Such cameras provide an on-board DSP or FPGA that can perform some basic pre-processing. A pre-processing step that is useful to perform outside of the laptop 4780 or 4790 using such on-board processing is to bin the pixels from the camera prior to transmission to the computer. The binning operation recommended is the summation of neighboring pixels to produce a smaller image where each binned result contains the A/D counts from the adjacent pixels. This summation process averages out the random noise and provides a higher SNR in polarization signal, at the expense of spatial resolution. Since the polarization signal varies slowly across the sky this is a useful technique for extracting low SNR signals such as are caused by clouds and trees, while alleviating the laptop from the burden of receiving and binning pixels. This distribution of processing between an on-board camera processor and the downstream laptop allows the laptop to be replaced by a simple DSP or FPGA and external battery supply. Those skilled in the art can recognize that a laptop performing an algorithm as simple as sorting data in Mk(x,y) and calculating a Fourier transform can be easily replaced with an FPGA or DSP. Those skilled in the art also recognize that since a single spectral coefficient is extracted from the Fourier data, that the FFT algorithm can also be replaced with an inner product of the sinusoid of interest, and will also recognize this as a narrow band pass filtering operation similar to extracting a single sinusoid from a spectral estimate.

Figure 48:
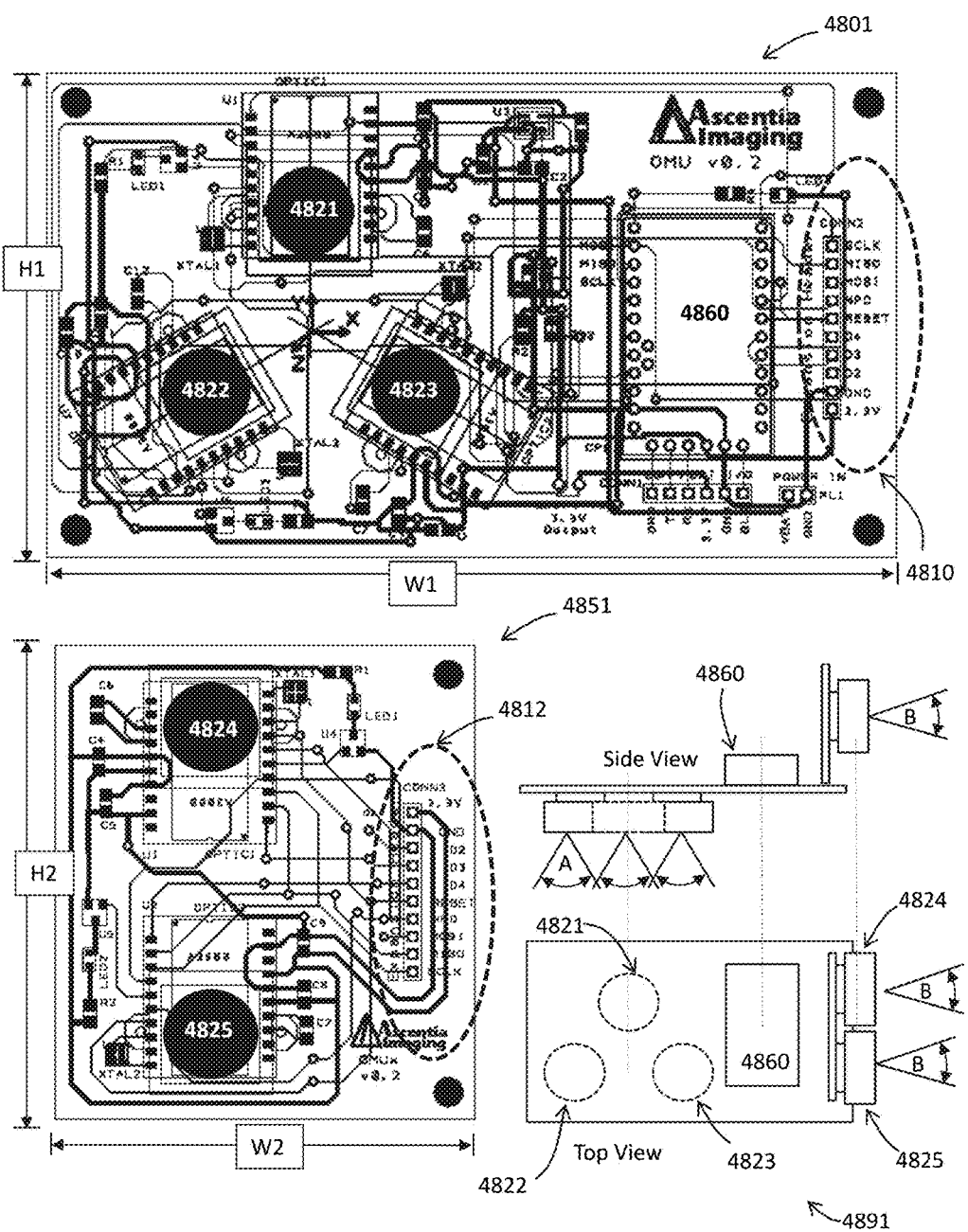
FIG. 48 illustrates an optical motion and motility unit, in an embodiment.

FIG. 48 is an embodiment of an optical motion and motility unit with 5 arms as disclosed in previous figures and consists of two circuit boards 4801 and 4851 that connect at 90 degree angle via connector 4810. Primary circuit board 4801 has dimensions H1=68 mm, W1=118 mm. Extension circuit board 4851 has dimensions H2=68 mm, W2=60 mm. Dark circles show locations of optics 4821, 4822, 4823, 4824 and 4825 on each circuit board. The optics are industry-standard M12 lenses in an aluminum mount that is epoxied to the underside of the circuit board. The primary circuit board optics 4821, 4822, and 4823 have focal lengths 2.2 mm to produce field of view A. The extension board has optics 4824 4825 with 8 mm focal length to produce field of view B. Primary circuit board also contains a micro-controller 4860 based on an 8-bit Atmel ATmega 328 micro controller operating at 3.3V and 8 MHz. The controller 4860 collects dx, dy information from sensors beneath the lenses.

Sensor mounting pads are evident on the circuit board layouts. Each sensor behind the lenses is an Avago ADNS-3080 sensor with 30×30 image array and optical flow engine. The sensors are positioned at 120 degrees to each other on the primary circuit board, and 180 degrees from each other on the extension circuit board. This placement is used to arrange the optical axes as close together as possible on the primary circuit board, with 120 degree rotation providing a full sampling of orthogonal directions for dx, dy sampling disparity, while also providing the widest separation of imaging systems on the extension board for maximum spatial disparity of the optical axes. This enhances differentiation of moving objects passing by the sensor pair, for example while performing range profiling as demonstrated in FIG. 32, while still allowing electrical routing on a simple double-sided FR4 circuit board. The optical mounts are epoxied to one side of the circuit board and the lenses provide aerial images through a hole in the circuit board. The sensors for each lens are mounted on the opposite side of the circuit board as the lenses with the sensor facing the hole, and view the aerial image through the hole in the circuit board. The side view and top view in graphic 4891 further illustrate the locations of the components for the assembled system. In this configuration the system operates as an optical motion and motility unit with 5 arms, with three sensors looking downward and two sensors looking outward, as previously disclosed in FIG. 21. With the physical construction of FIG. 48 it can be seen that building an optical motility and motion detection system is fairly straightforward now that the concept has been fully described. This system is powered by 3 AAA batteries connected in series, or 4.5V, and provides 3.3V at 500 mA to the controller and all sensors using a voltage regulator on the primary circuit board. This system also transmits via serial port from the micro dx, dy, dz raw data, processed data, and raw or processed image data. Processing for example is the decomposition of the dx, dy, dz signals from individual sensors into a global motion for the rigid body (the rigid body in this case is the primary circuit board+extension board) following the type of decomposition disclosed previously in FIG. 9 and provided in the ATMega code example below based on the Arduino programming language. In this code example the globals gx1, gy1, gx2, gy2, gx3, gy3 are the accumulated global x,y location of each of the optics 4821, 4822, 4823 respectively, where the accumulation is the accumulation of decomposed dx and dy motions over time. Furthermore, the decomposition of the vectors depends on the present global angle 'gT' in the code below, so this angle is also updated at each cycle.

```
define r30(30*PI/180)/30 deg in radians define r60(60*PI/180)/60 deg in radians gx1+=(float)dx1*cos(gT)-(float)dy1*sin(gT);

gy1+=(float)dx1*sin(gT)+(float)dy1*cos(gT);

gx2+=-(float)dx2*cos(r60+gT)+(float)dy2*cos(r30-
   gT);

gy2+=-(float)dx2*sin(r60+gT)-(float)dy2*sin(r30-
   gT);

gx3+=-(float)dx3*cos(r60-gT)-(float)dy3*cos(r30+
   gT);

gy3+=(float)dx3*sin(r60-gT)-(float)dy3*sin(r30+gT);

//update the global angle float theta01=a tan 2(gy2-gy1,gx2-gx1)+60*PI/180;

float theta02=a tan 2(gy3-gy1,gx3-gx1)+120*PI/180;

float theta12=a tan 2(gy3-gy2,gx3-gx2)-180*PI/180;

//average angles using real/imag to avoid wrapping
   problems float re=cos(theta01)+cos(theta02)+cos(theta12);

float im=sin(theta01)+sin(theta02)+sin(theta12);

gT=a tan 2(im,re);
```

Figure 49:
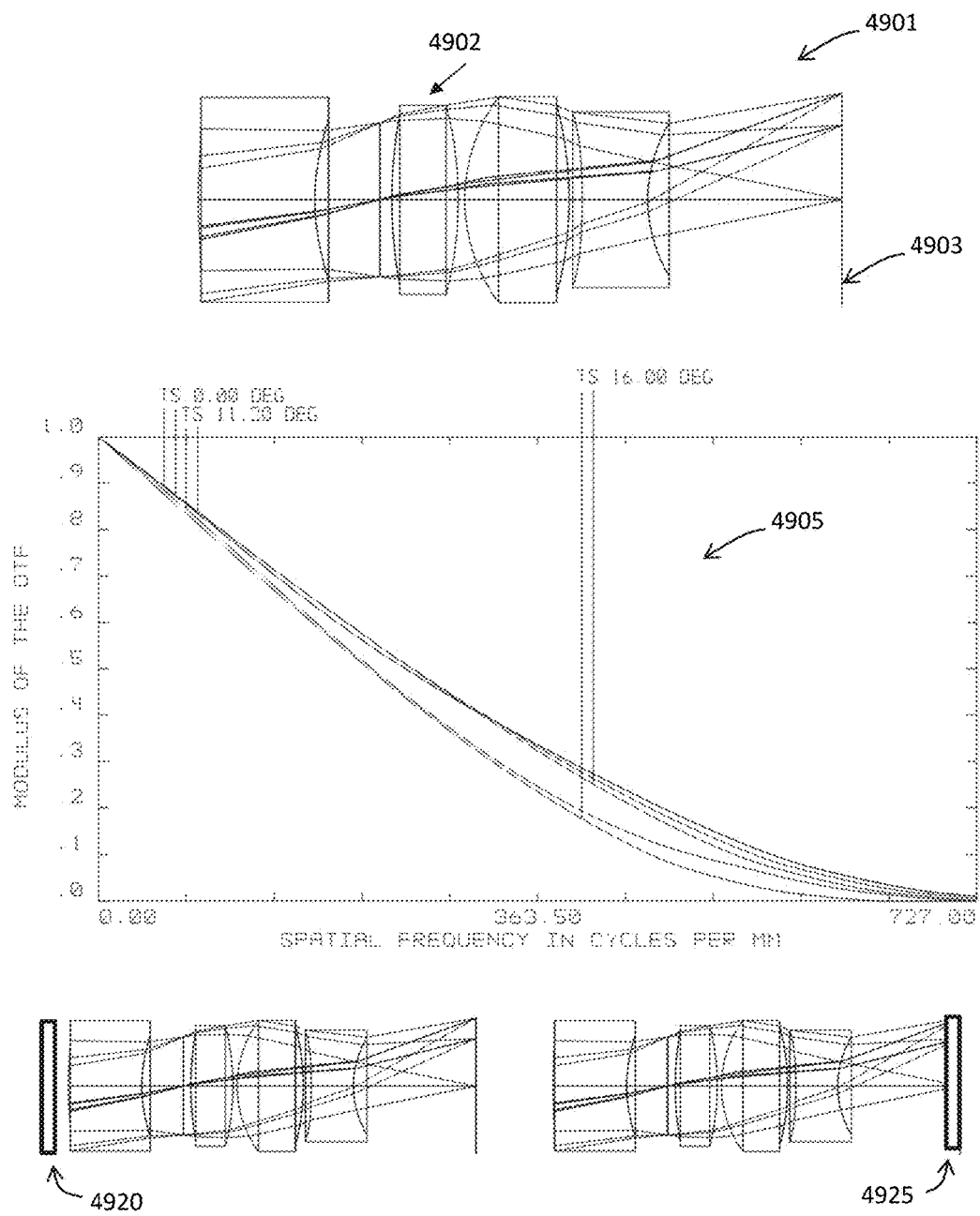
FIG. 49 illustrates details of the imaging systems of FIGS. 39-43.

The global motion for the other two optics 4824 and 4825 follow a similar construction, except that the global angle constants are 0 and 180 deg, not 60, 120, and 180 as shown in the code above, and the extension board will use a different global theta rather than 'gT', call it 'xT' for extension board. If the primary circuit board 4801 is held horizontal to the ground and the extension circuit board 4851 is facing forward or rearward in a moving vehicle, then 'gT' represents yaw angle and 'xT' represents roll angle when the sensors are viewing the world outside the vehicle. If the primary circuit board 4801 is held horizontal to the ground and the extension circuit board 4851 is facing to the side in a moving vehicle, then 'gT' again represents yaw angle and 'xT' represents pitch angle FIG. 49 is an embodiment of the invention showing details on the imaging systems previously described in 3904 FIG. 39, 4004 FIG. 40, 4204 FIG. 42, and 4304 FIG. 43. Lens layout 4901 with detector 4903 is for a single channel of the 2×2 and 3×3 imaging systems shown earlier. The material 4902 is known as Zeonex 480R. The material 4902b is Zeonex E48R. The prescription for the optical system in 4901 is as follows (in Zemax Lens units):

| Surface 1 | Surface 2 | Surface 3 (stop) |
|---|---|---|
| Material = Polystyr | Radius = 6.268815 | Radius = infinity |
| Radius = 21.112468 | Thickness = 1.980373 | Thickness = 0.362479 |
| Thickness = 3.506021 | Semi-dia = 2.468438 | Semi-dia = 2.331975 |
| Semi-dia = 3.08 | Conic = −1.004726 | |
| Conic = −36.22703 | $4^{th}$ = −2.175187E-3 | |
| $4^{th}$ = −1.154485E-3 | $6^{th}$ = 3.003577E-5 | |
| $6^{th}$ = −2.186555E-5 | $8^{th}$ = 1.582201E-6 | |
| $8^{th}$ = 8.787575E-7 | | |

| Surface 4 (Binary 2) | Surface 5 | Surface 6 |
|---|---|---|
| Material = 480R | Radius = −11.519072 | Material = E48R |
| Radius = 14.390332 | Thickness = 0.199356 | Radius = 5.271419 |
| Thickness = 2.0001 | Semi-dia = 2.856551 | Thickness = 3.144312 |
| Semi-dia = 2.589251 | Conic = 0 | Semi-dia = 3.100682 |
| Conic = 0 | | Conic = 0 |
| Diffraction Order = 1 | | |

| Surface 7 | Surface 8 | Surface 9 |
|---|---|---|
| Radius = −11.137381 | Material = Polystyr | Radius = 4.179707 |
| Thickness = 0.388846 | Radius = −30.83006 | Thickness = 5.859802 |
| Semi-dia = 2.834143 | Thickness = 1.999658 | Semi-dia = 2.303156 |
| Conic = 0 | Semi-dia = 2.63680 | Conic = −3.473208 |
| | Conic = 43.8999648 | $4^{th}$ = 2.954178E-3 |
| | $4^{th}$ = −3.868053E-3 | $6^{th}$ = −2.756575E-5 |
| | $6^{th}$ = 1.012411E-4 | $8^{th}$ = 1.218266E-5 |
| | $8^{th}$ = 4.367926E-7 | |

The MTF of this specialized imaging system is very high as shown in graph 4905. To produce the coded localization polarization compass disclosed herein, a linear polarizer is added to the front of each channel as in 4920. To produce a coded localization system with a grayscale pixel-scale code, the intensity code for each channel is placed on top of the detector array as in 4925. This code may be lithographically printed on the sensor cover glass, or may be printed on a substrate and bonded to the sensor cover glass such as a 5 micron thick photographic film, or resist, substrate commercially available by companies such as Canyon Materials or Jenoptik.

Figure 50:
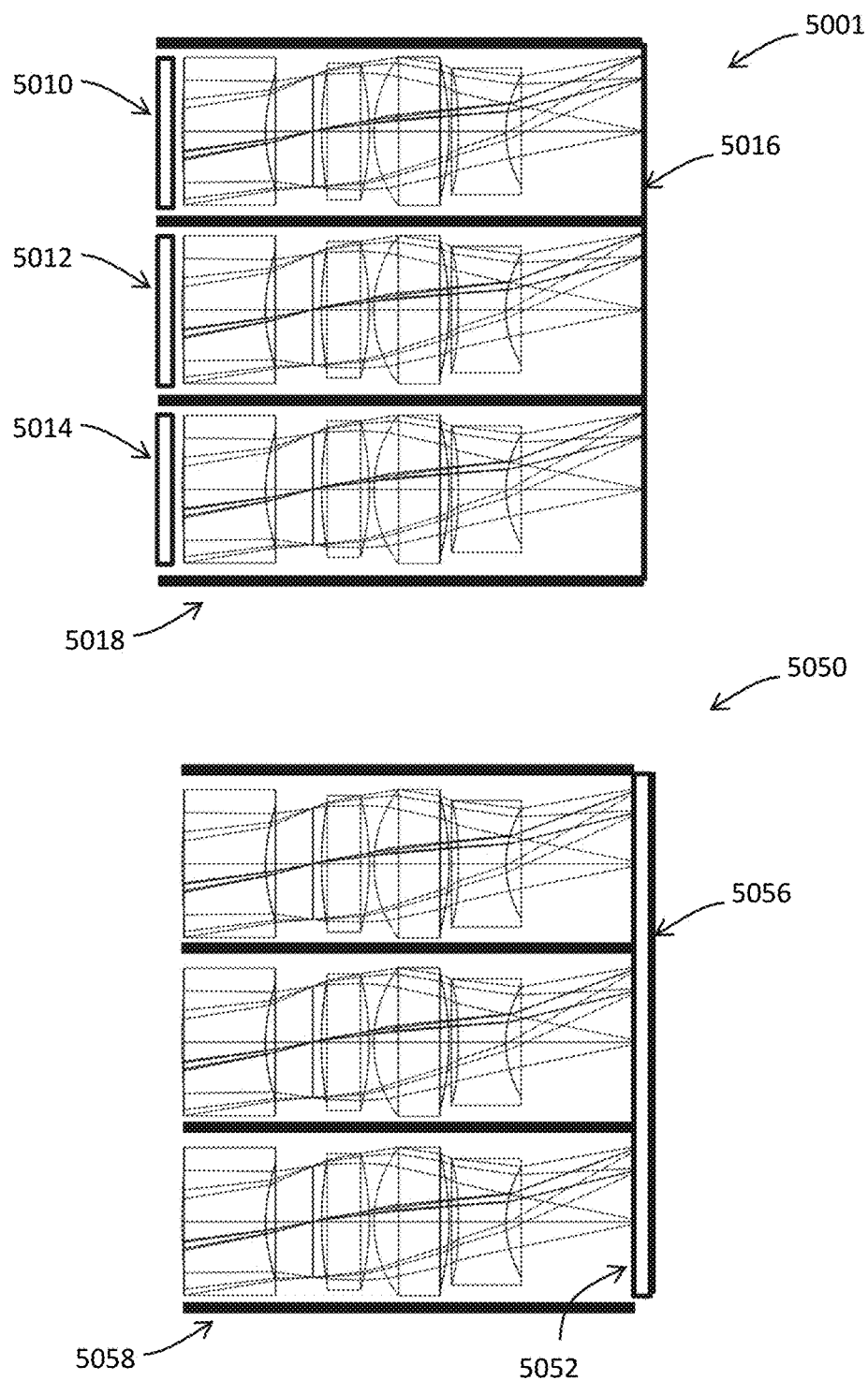
FIG. 50 illustrates 2×2 and 3×3 systems, using a single sensor as a detector element for all channels, in an embodiment.

FIG. 50 is an embodiment of the 2×2 and 3×3 systems using a single sensor as a detector element for all channels. Only a side view is shown in FIG. 50. The detector 5016 and 5056 are for example very large APS (digital SLR) style sensors, or large 5Mpix to 14MPix commercially available CMOS image sensors. These sensors are on the order of 20 mm or larger in size (height and width dimensions), so 3×3 or 2×2 channels with diameters of nominally 6 mm/channel will easily fit across a single large format sensor. Baffling to control stray light is included in this system as 5018 and 5058 and is inherent in the lens holders or wafer scale elements for each of the imaging channels. In configuration 5001, each channel is provided a linear polarizer 5010, 5012, 5014 at 22.5 degree angles to each other to form a polarization compass as disclosed previously. In configuration 5050 each channel is imaged through a continuous substrate with grayscale intensity codes 5052. The grayscale codes vary beneath each imaging channel as described earlier in FIGS. 42 and 43 for sampling the two dimensional frequency space. Configuration 5001 is a polarization compass and configuration 5050 is a coded localization system for performing sub-pixel location estimates.

What is claimed is:

1. A navigation system for a repositionable object, comprising:
    a first optical motion unit having a first plurality of optical channels and configured to capture information from a first portion of a moving scene;
    a second optical motion unit having a second plurality of optical channels and configured to capture information from a second portion of the moving scene, the second optical motion unit being displaced from the first optical motion unit by a first distance in a first direction; and
    a processing subsystem configured to determine a two dimensional change in motion of the scene based upon data output from the first and second motion units and the first direction and distances;
    each of the first plurality of optical channels and the second plurality of optical channels including:
        a detector configured to receive electromagnetic energy incident thereon and propagating from the moving scene; and
        a localization code that is (i) configured to optically modify the electromagnetic energy passing therethrough to the detector, (ii) one of an amplitude mask, a phase mask, an aperture pattern, and a polarizer, and (iii) different from the localization code of each other optical channel of the plurality of optical channels.

2. The navigation system of claim 1, the first and second portion of the moving scene being at least partially overlapping.

3. The navigation system of claim 1, the first and second optical motion units being rigidly positioned with respect to each other such that the first distance and the first direction are unchanging.

4. A method for controlling motion of a repositionable object, comprising:
    determining a present heading of the repositionable object by capturing information from a moving scene using a plurality of optical channels each collocated with the repositionable object and having a detector and a localization code configured to optically modify electromagnetic energy passing therethrough from the scene to the detector, each localization code (a) being one of an amplitude mask, a phase mask, an aperture pattern, and a polarizer, and (b) differing from the respective localization code of each other of the plurality of optical channels;
    determining a current location of the repositionable object using a satellite navigation system;
    determining a desired heading for the repositionable object by comparing the current location of the repositionable object with a desired destination; and
    adjusting the heading of the repositionable object from the present heading to the desired heading.

5. The method of claim 4, the step of determining a current location further comprising determining a relative position of the repositionable object with respect to a known position of a reference object.

6. The method of claim 5, the reference object being located on a surface upon which the repositionable object is traveling.

7. A navigation system for a repositionable object, comprising:
    a plurality of optical channels arranged to cooperatively capture information from a moving scene, each of the optical channels being collocated with the repositionable object and having (i) a detector and (ii) a localization code configured to optically modify electromagnetic energy passing therethrough from the moving scene to the detector, the localization code being one of an amplitude mask, a phase mask, an aperture pattern, and a polarizer, and differing from the localization code of each other of the plurality of optical channels;
    a receiver configured to communicate with a satellite navigation system; and
    a digital signal processor configured to:
        determine a present heading of the repositionable object from the information captured by the plurality of optical channels;
        determine a current location of the repositionable object using the receiver; and
        determine a desired heading for the repositionable object by comparing the current location of the repositionable object with a desired destination.

8. The navigation system of claim 7, wherein in the step of determining location, the digital signal processor is further configured to determine a relative position of the repositionable object with respect to a known position of a reference object.

9. The navigation system of claim 8, the reference object being located on a surface upon which the repositionable object is traveling.

* * * * *